US012168240B2

(12) United States Patent
Toh et al.

(10) Patent No.: US 12,168,240 B2
(45) Date of Patent: Dec. 17, 2024

(54) DISPENSER SYSTEM

(71) Applicant: Colgate-Palmolive Company, New York, NY (US)

(72) Inventors: Kiat-Cheong Toh, Forest Hills, NY (US); Mark Bartlett, North East, PA (US); Peter Fallat, II, Topeka, KS (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 18/299,980

(22) Filed: Apr. 13, 2023

(65) Prior Publication Data

US 2023/0294119 A1 Sep. 21, 2023

Related U.S. Application Data

(62) Division of application No. 17/303,687, filed on Jun. 4, 2021, now abandoned, which is a division of (Continued)

(51) Int. Cl.

*B05B 11/00* (2023.01)
*A47K 5/12* (2006.01)

(Continued)

(52) U.S. Cl.

CPC ........ *B05B 11/1047* (2023.01); *A47K 5/1201* (2013.01); *A47K 5/1205* (2013.01);

(Continued)

(58) Field of Classification Search

CPC . B05B 15/30; B05B 11/3047; B05B 11/0064; B05B 11/0097; B05B 11/3001;

(Continued)

(56) References Cited

U.S. PATENT DOCUMENTS 3,995,772 A * 12/1976 Liautaud ............ B65D 83/0055 222/83.5
4,322,019 A 3/1982 Smith (Continued)

FOREIGN PATENT DOCUMENTS

CN 103608122 2/2014
CN 104176380 12/2014

(Continued)

OTHER PUBLICATIONS

International Search Report and the Written Opinion of the International Searching Authority issued in International Application PCT/US2018/065901 mailed May 31, 2019.

*Primary Examiner* — Charles P. Cheyney

(57) ABSTRACT

A system for dispensing a personal care fluid, such as a hand soap or the like. The system includes a dispenser and a refill cartridge. The dispenser includes a dispenser body having a refill cavity and a dispenser lid configured to be coupled to the dispenser body. There may be a pump sub-system mounted to the dispenser lid, or alternatively the personal care fluid may be dispensed by squeezing the dispenser and refill cartridge. The refill cartridge is configured for slidable insertion into and removal from the refill cavity of the dispenser body. The personal care fluid system is designed so that a user can readily and easily change out/replace the refill cartridge for use with a common dispenser, dispenser lid, and pump sub-system.

4 Claims, 44 Drawing Sheets

Related U.S. Application Data application No. 16/221,661, filed on Dec. 17, 2018, now Pat. No. 11,033,920.

(60) Provisional application No. 62/611,719, filed on Dec. 29, 2017, provisional application No. 62/611,710, filed on Dec. 29, 2017.

(51) Int. Cl.

| | |
|---|---|
| ***B05B 11/10*** | (2023.01) |
| ***B05B 15/30*** | (2018.01) |
| *A45D 34/00* | (2006.01) |

(52) U.S. Cl.

CPC .......... *A47K 5/1208* (2013.01); *A47K 5/1211* (2013.01); *B05B 11/0008* (2013.01); *B05B 11/0038* (2018.08); *B05B 11/0054* (2013.01); *B05B 15/30* (2018.02); *A45D 34/00* (2013.01); *A45D 2034/005* (2013.01); *B05B 11/0064* (2013.01); *B05B 11/0097* (2013.01); *B05B 11/1001* (2023.01); *B05B 11/1067* (2023.01)

(58) Field of Classification Search

CPC ............. B05B 11/3067; B05B 11/0038; B05B 11/0008; B05B 11/0054; A47K 5/1201; A47K 5/1205; A47K 5/1208; A47K 5/1211

USPC .. 222/105, 95, 386.5, 82, 321.7–321.9, 325, 222/383.1, 383.2, 383.3, 384, 385, 165

See application file for complete search history.

(56) References Cited

U.S. PATENT DOCUMENTS

| | | | | |
|---|---|---|---|---|
| 4,469,250 | A * | 9/1984 | Evezich | B65D 83/0055 222/83.5 |
| 4,760,937 | A | 8/1988 | Evezich | |
| 4,909,416 | A * | 3/1990 | Evezich | B65D 1/32 222/105 |
| 5,004,123 | A * | 4/1991 | Stoody | B05B 11/026 222/105 |
| 5,097,867 | A | 3/1992 | Frigiere et al. | |
| 5,152,427 | A | 10/1992 | Pope et al. | |
| 5,156,299 | A | 10/1992 | De Caluwe et al. | |
| 5,343,901 | A | 9/1994 | Meshberg | |
| 5,421,485 | A * | 6/1995 | Furuta | B05B 11/026 222/105 |
| 5,620,113 | A | 4/1997 | Meshberg | |
| 5,642,838 | A * | 7/1997 | Stoody | B05B 11/026 222/105 |
| 5,875,936 | A | 3/1999 | Turbett et al. | |
| 6,126,042 | A | 10/2000 | Meshberg | |
| 6,419,393 | B1 * | 7/2002 | Shibata | B65D 75/008 222/82 |
| 6,427,870 | B2 | 8/2002 | De Laforcade | |
| 6,510,965 | B1 | 1/2003 | Decottignies et al. | |
| 6,651,845 | B1 * | 11/2003 | Schroeder | B67B 7/28 222/105 |
| 6,889,873 | B1 | 5/2005 | Leboucher | |
| 6,983,864 | B1 | 1/2006 | Cagle | |
| 6,988,496 | B1 | 1/2006 | Eicher et al. | |
| 7,490,743 | B2 | 2/2009 | Herzog | |
| 7,770,762 | B2 * | 8/2010 | Arghyris | B05B 11/00442 222/215 |
| 7,832,595 | B2 | 11/2010 | Lickstein | |
| 7,950,388 | B2 | 5/2011 | Kunze et al. | |
| 8,038,040 | B2 | 10/2011 | Dennis | |
| 8,376,192 | B2 | 2/2013 | Maddy | |
| 8,408,429 | B2 | 4/2013 | Dennis | |
| 8,434,645 | B2 | 5/2013 | Crawford et al. | |
| 8,499,970 | B2 | 8/2013 | Yoo | |
| 8,905,017 | B2 | 12/2014 | Hausmann et al. | |
| 9,211,993 | B2 | 12/2015 | Tom et al. | |
| 10,086,391 | B2 | 10/2018 | Toh et al. | |
| 10,144,022 | B2 | 12/2018 | Toh et al. | |
| 10,370,167 | B2 | 8/2019 | Benson et al. | |
| 10,391,509 | B2 | 8/2019 | Toh et al. | |
| 10,974,885 | B2 * | 4/2021 | Yamauchi | B05B 11/026 |
| 2007/0020032 | A1 * | 1/2007 | Abbas | B43K 5/189 401/188 A |
| 2011/0024452 | A1 | 2/2011 | Moretti | |
| 2011/0108581 | A1 | 5/2011 | Dennis | |
| 2011/0220682 | A1 | 9/2011 | Lim | |
| 2017/0144176 | A1 * | 5/2017 | Toh | B05B 11/0008 |
| 2017/0173615 | A1 | 6/2017 | Toh et al. | |
| 2020/0023391 | A1 * | 1/2020 | Cesare | B65D 75/5883 |

FOREIGN PATENT DOCUMENTS

| | | | |
|---|---|---|---|
| EP | 3081312 | 10/2016 | |
| JP | H1035707 | 2/1998 | |
| WO | 2010/083419 | 7/2010 | |
| WO | WO-2015178917 A1 * | 11/2015 | B05B 11/0008 |

* cited by examiner

DISPENSER SYSTEM

CROSS-REFERENCE TO RELATED APPLICATIONS

The present application is a divisional of U.S. application Ser. No. 17/303,687, filed Jun. 4, 2021, which is a divisional of U.S. application Ser. No. 16/221,661, filed Dec. 17, 2018, now U.S. Pat. No. 11,033,920, which claims priority to U.S. Provisional Application Ser. No. 62/611,710, filed Dec. 29, 2017 and U.S. Provisional Application Ser. No. 62/611,719, filed Dec. 29, 2017, the entireties of which are incorporated herein by reference.

BACKGROUND

Pump style soap dispensers have been in use for quite some time. Dispensers of this type are used until the soap is completely used up or sufficiently depleted so that it can no longer be pumped to the outlet for use. At such time, these dispensers are discarded and replaced with a new dispenser. In these conventional systems, the entire dispenser is discarded together as a single unit, which results in more waste than is necessary. Alternatively, users may refill their dispensers by manually pouring an additional amount of the soap or other liquid from a large refill container into the dispenser. This process typically results in at least some of the liquid product being spilled onto the countertop or floor, thereby creating an undesirable mess. A final problem with existing dispensers is that a significant amount of the product cannot be evacuated from the container. Thus, there is a need for a convenient and mess-free system that allows for replenishment of the liquid product that can be easily achieved by persons of all ages and dexterity and that enables some components of the system to be used with multiple replenishment cartridges, thereby reducing waste. Furthermore, there is a need for a dispenser of liquid product that enables a greater amount, and preferably all, of the liquid product to be dispensed for use.

BRIEF SUMMARY

The invention is directed to a system for dispensing a personal care fluid, such as a hand soap or the like. The system includes a dispenser and a refill cartridge. The dispenser includes a dispenser body having a refill cavity and a dispenser lid configured to be coupled to the dispenser body. There may be a pump sub-system mounted to the dispenser lid, or alternatively the personal care fluid may be dispensed by squeezing the dispenser and refill cartridge. The refill cartridge is configured for slidable insertion into and removal from the refill cavity of the dispenser body. The personal care fluid system is designed so that a user can readily and easily change out/replace the refill cartridge for use with a common dispenser, dispenser lid, and pump sub-system.

In one aspect, the invention may be a system for dispensing a personal care fluid, the system comprising: a dispenser comprising: a dispenser body comprising a refill cavity having a top end; a dispenser lid; and a pump sub-system mounted to the dispenser lid, the pump sub-system comprising a first dip tube, a dispensing orifice, and a pump; a refill cartridge configured for slidable insertion and removal from the refill cavity via the top end of the refill cavity, the refill cartridge comprising: a cartridge body comprising a fluid cavity; a store of the personal care fluid in the fluid cavity; and a second dip tube extending along an outer surface of the cartridge body from a bottom opening that is fluidly coupled to a bottom of the fluid cavity to a top opening at the top end of the cartridge body; the dispenser lid configured to be alterable between: (1) a first state in which the top end of the refill cavity is open so that the refill cartridge can be slid into the refill cavity; and (2) a second state in which the dispenser lid is coupled to the dispenser body to enclose the top end of the refill cavity and the second dip tube is operably mated with the first dip tube so that the store of the personal care fluid can be dispensed from the dispensing orifice upon actuation of the pump.

In another aspect, the invention may be a refill cartridge containing a personal care fluid for a dispensing system, the refill cartridge comprising: a cartridge body comprising an outer surface and an inner surface that defines a fluid cavity; a store of a personal care fluid in the fluid cavity; and a dip tube extending along the outer surface of the cartridge body from a first end to a second end, the dip tube comprises a first opening in the first end and a second opening in the second end, and wherein the first opening is fluidly coupled to the fluid cavity.

In another aspect, the invention may be a system for dispensing a personal care fluid, the system comprising: a dispenser comprising: a dispenser body comprising a refill cavity having an open bottom end; and a locking element rotatably coupled to the dispenser body and located within an upper portion of the refill cavity, the locking element comprising an opening having a non-circular shape; a refill cartridge configured for slidable insertion and removal from the refill cavity via the open bottom end of the refill cavity, the refill cartridge comprising: a cartridge body comprising a fluid cavity; a store of the personal care fluid in the fluid cavity; and a locking collar coupled to the cartridge body, the locking collar having a non-circular shape; wherein the locking element is configured to be alterable between: (1) a first state in which the cartridge body can be inserted into the refill cavity of the dispenser body until the locking collar of the refill cartridge extends through the opening of the locking element; and (2) a second state in which the locking element and the locking collar are in locking engagement to prevent the refill cartridge from being removed from the refill cavity of the dispenser body.

In yet another aspect, the invention may be a system for dispensing a personal care fluid, the system comprising: a dispenser comprising: a dispenser body comprising an inner surface defining a refill cavity having a top end, one or more protuberances extending from the inner surface of the dispenser body; and a dispenser lid alterable between a first state in which the top end of the refill cavity is open and a second state in which the dispenser lid is coupled to the dispenser body to enclose the top end of the refill cavity; a refill cartridge configured for slidable insertion and removal from the refill cavity via the top end of the refill cavity, the refill cartridge comprising: a cartridge body comprising a fluid cavity; a store of the personal care fluid in the fluid cavity; and a cartridge lid closing a top end of the fluid cavity, the cartridge lid comprising a flange portion that extends beyond an outer surface of the cartridge body; wherein the refill cartridge is located within the refill cavity of the dispenser body with the flange portion of the cartridge lid resting on the one or more protuberances of the dispenser body.

In one aspect, the invention may be a system for dispensing a personal care fluid, the system comprising: a dispenser comprising: a dispenser body comprising a refill cavity having a top end; a dispenser lid; and a pump sub-system mounted to the dispenser lid, the pump sub-system comprising a first dip tube, a dispensing orifice, and a pump; a refill cartridge configured for slidable insertion and removal from the refill cavity via the top end of the refill cavity, the refill cartridge comprising: a cartridge body comprising a fluid cavity; a store of the personal care fluid in the fluid cavity; and a second dip tube extending into the store of the personal care fluid; the dispenser lid configured to be alterable between: (1) a first state in which the top end of the cavity is open so that the refill cartridge can be slid into the refill cavity; and (2) a second state in which the dispenser lid is coupled to the dispenser body to enclose the top end of the refill cavity and the second dip tube is operably mated with the first dip tube so that the store of the personal care fluid can be dispensed from the dispensing orifice upon actuation of the pump.

In another aspect, the invention may be a refill cartridge containing a personal care fluid for a dispensing system, the refill cartridge comprising a cartridge body comprising a fluid cavity and an upper edge defining an opening into the fluid cavity, the cartridge body extending along a cartridge axis and comprising at least one downwardly facing shoulder; a store of the personal care fluid in the fluid cavity; and a fluid delivery component disposed within the fluid cavity, the fluid delivery component comprising: a basket comprising a basket cavity having an open top end; and a dip tube extending downward from the basket and into the store of the personal care fluid, the dip tube comprising a passageway that extends from the basket cavity and terminates at a fluid inlet orifice; and a cartridge lid coupled to the cartridge body to seal the opening into the fluid cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
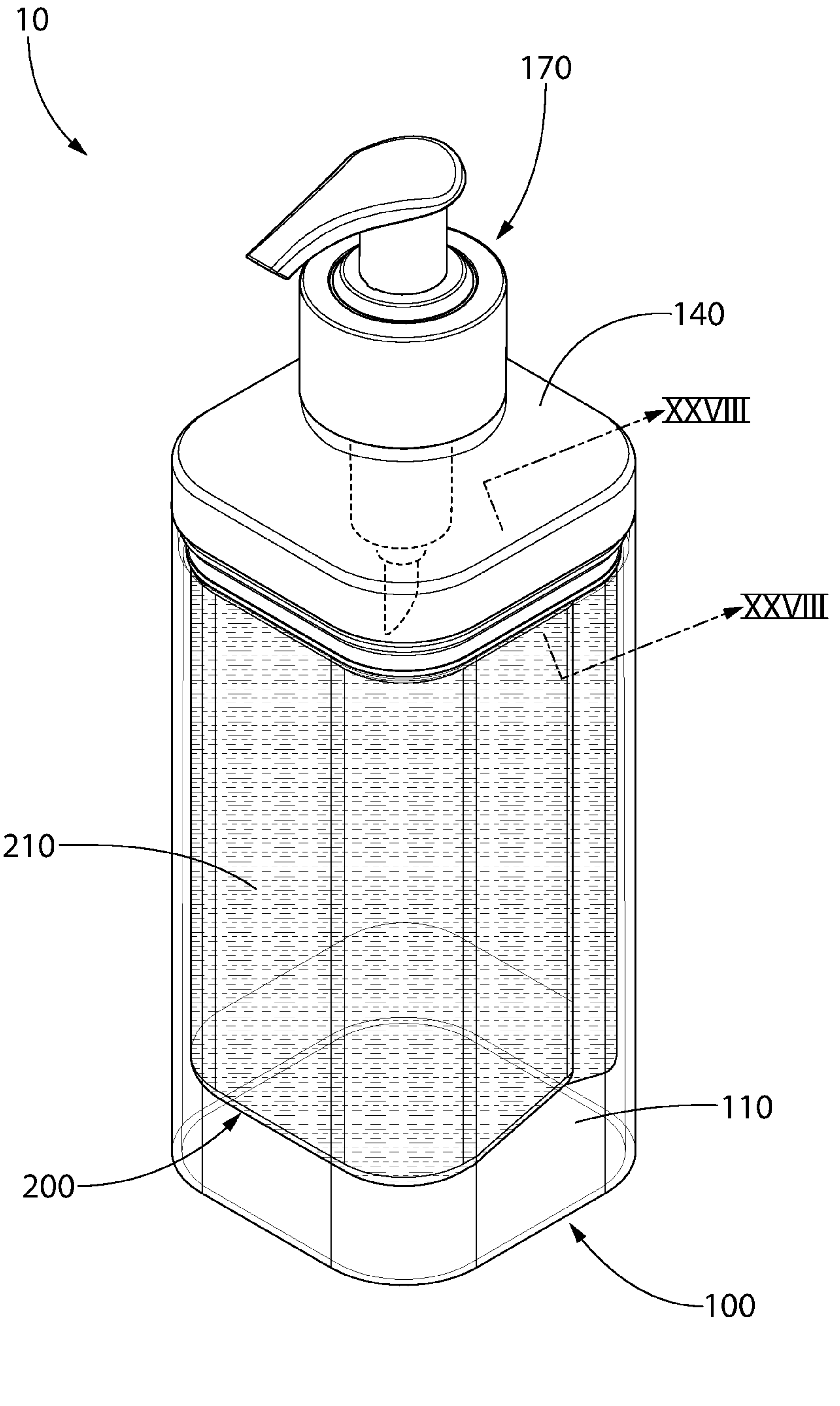
FIG. 1 is a perspective view of a system for dispensing a personal care fluid in an assembled state in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 2:
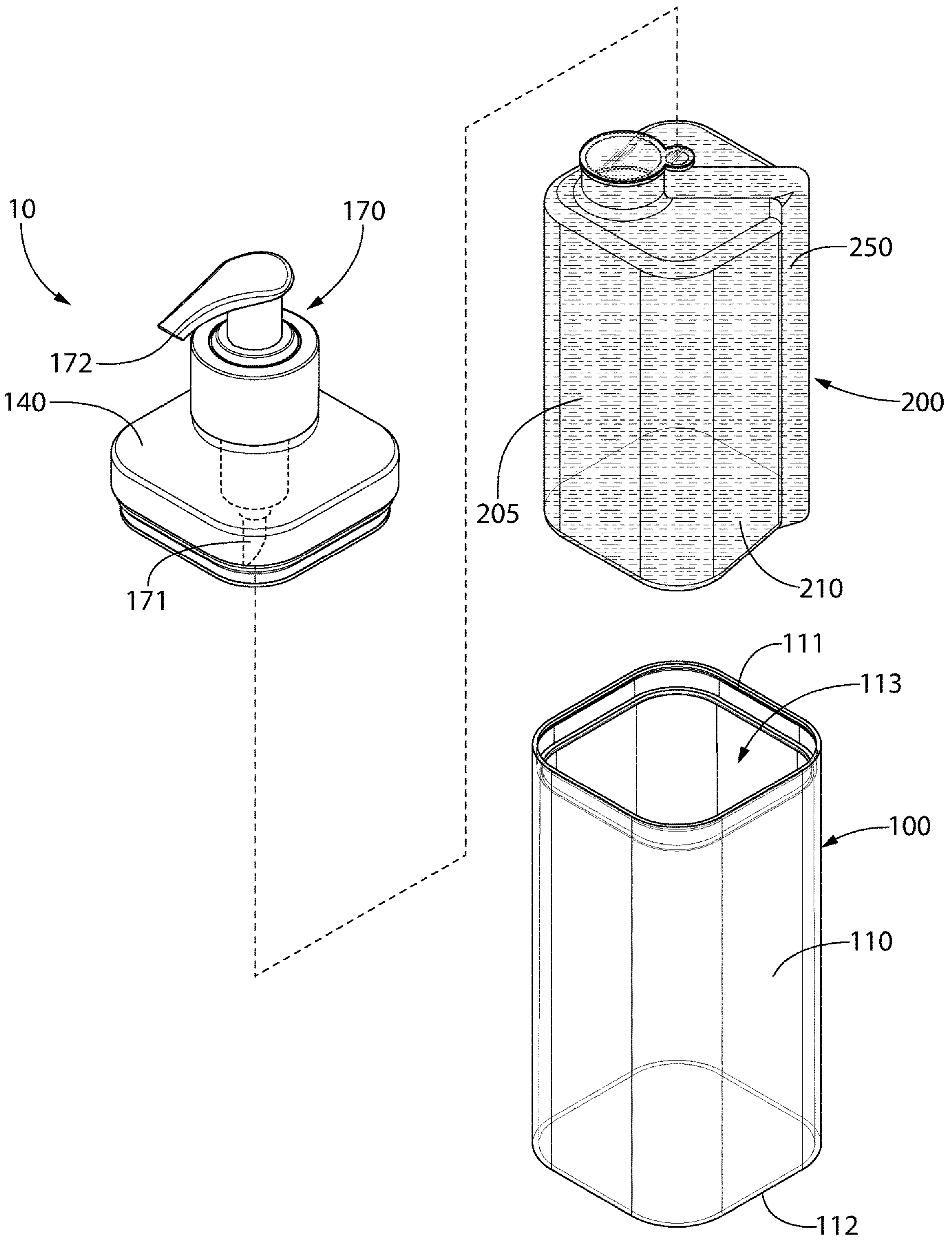
FIG. 2 is a perspective view of the system of FIG. 1 in a disassembled state with a dispenser body, a refill cartridge, and a dispenser lid/pump sub-system detached from one another.

Referring first to FIGS. 1 and 2, a system 10 for dispensing a personal care fluid is illustrated in an assembled state (FIG. 1) and a disassembled state (FIG. 2). The system 10 comprises several parts or components that, when assembled, operate as a unit to dispense a personal care fluid for use by a user in a desired manner. More specifically, the system 10 comprises a dispenser 100 and a refill cartridge 200. The dispenser 100 comprises a dispenser body 110 having a refill cavity 113, a dispenser lid 140, and a pump sub-system (or pump assembly) 170 and the refill cartridge 200 comprises a cartridge body 210. In the exemplified embodiment, the dispenser body 110 and the cartridge body 210 are both transparent, although this is not required in all embodiments. Furthermore, in the exemplified embodiment the dispenser body 110 has an open top end 111 and an open bottom end 112, both of which form a passageway into the refill cavity 113. Of course, the invention is not to be so limited and in other embodiments the dispenser body 110 may have a closed bottom end and an open top end.

The pump sub-system 170 comprises a first dip tube 171, a dispensing orifice 172, and a pump (not illustrated). The first dip tube 171 may terminate at a distal end that is pointed, sharpened, or otherwise configured to penetrate a film covering the refill cartridge 200 so that assembly of the system 10 will automatically open the refill cartridge 200 in preparation for its use. The refill cartridge 200 comprises the cartridge body 210 and a second dip tube 250. The cartridge body 210 contains a store of a personal care fluid 205. When the system 10 is fully assembled, the first and second dip tubes 171, 250 operably mate with one another to enable the system 10 to dispense the personal care fluid 205 from the dispensing orifice 172. The personal care fluid may be hand soap, a hair application product such as shampoo, conditioner, mousse, or gel, lotion, sanitizer, dentifrice or other oral fluids used for treatment of the oral cavity, or any other fluid that a user may desire to dispense for personal use. In one embodiment, the personal care fluid may be a liquid soap without limitation to the specific type of soap or its end use.

As shown in FIG. 2, the refill cartridge 200 is configured for slidable insertion into and removal from the refill cavity 113 of the dispenser body 100. The dispenser lid 140 with the pump sub-system 170 mounted thereon can then be placed atop of the dispenser body 110 and the refill cartridge 200. In some embodiments, the dispenser lid 140 has features that mate with features of the dispenser body 110 to couple the dispenser lid 140 to the dispenser body 110. Thus, the dispenser lid 140 may be coupled to the dispenser body 110 via mating screw threads, interference fit, snap latch, or the like. In some embodiments (such as those that include mating screw threads), the dispenser lid 140 is rotated relative to the dispenser body 110 to couple the dispenser lid 140 to the dispenser body 110. In other embodiments (such as those that include interference fit or snap latch), the dispenser lid 140 need only be translated axially onto the dispenser body 110 to couple those two components together.

The refill cartridge 200 is located within the refill cavity 113 of the dispenser body 110 and is placed there prior to coupling the dispenser lid 140 to the dispenser body 110. In certain embodiments, the dispenser body 110 may comprise protuberances that protrude from its inner surface inwardly into the refill cavity 113 for supporting the refill cartridge 200 therein. In that regard, the cartridge body 210 of the refill cartridge 200 may have depressions or be otherwise shaped so that as the refill cartridge 200 is inserted into the refill cavity 113 of the dispenser body 110, the protuberances protruding form the inner surface of the dispenser body 110 nest within the depressions of the cartridge body 210 and mate with shoulders at the ends of the depressions to suspend the refill cartridge 200 within the refill cavity 113. In such embodiments, a portion of the cartridge body 210 (i.e., the shoulders) rests atop of the protuberances of the dispenser body 110. This maintains the cartridge body 210 within the refill cavity 113 of the dispenser body 110 even in embodiments in which the dispenser body 110 has open top and bottom ends 111, 112. The dispenser body 110 may also comprise coupling elements protruding from the inner surface that mate with coupling elements on the dispenser lid 140 to facilitate coupling of the dispenser lid 140 to the dispenser body 110.

Thus, the dispenser body 110 forms an outer container of the system 10 and the refill cartridge 200 forms an inner container of the system 10. The refill cartridge 200 can be replaced when the personal care fluid 205 contained therein is depleted or when it is desired to swap the personal care fluid 205 out for a different personal care fluid. For example, if a user no longer enjoys the scent of a particular soap, the user can remove the refill cartridge 200 that is currently located in the refill cavity 113 of the dispenser body 100 and replace it with a different refill cartridge having a different personal care fluid therein. The dispenser 100 (including the dispenser body 110, the dispenser lid 140, and the pump sub-system 170) is typically reused with multiple refill cartridges 200.

Figure 3:
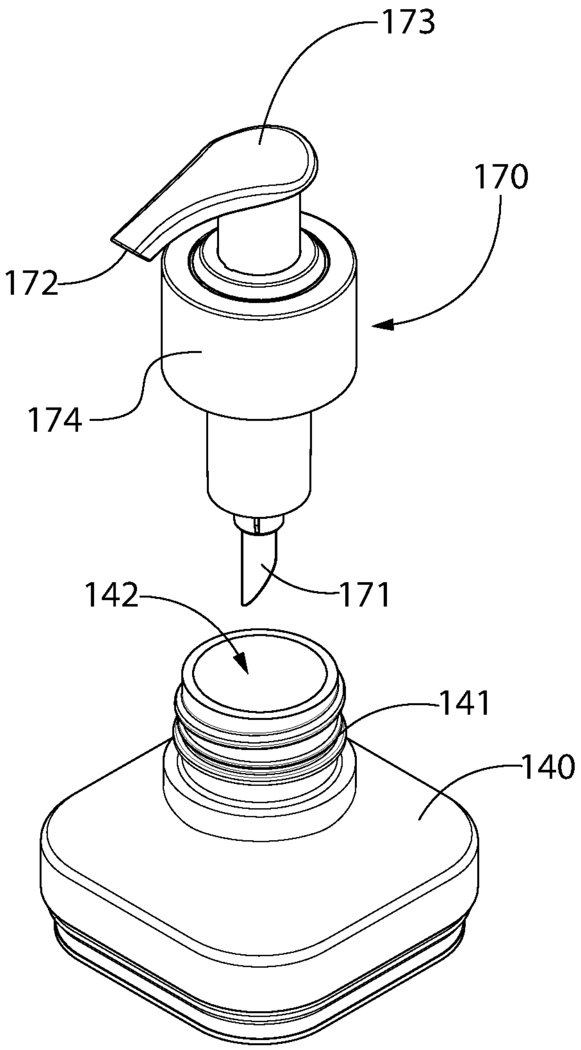
FIG. 3 is a perspective view of the dispenser lid and pump sub-system of FIG. 1 in a disassembled state.

Referring to FIG. 3, the dispenser lid 140 and the pump sub-assembly 170 are illustrated. The dispenser lid 140 comprises a neck 141 having an opening 142 in its top end. In the exemplified embodiment, the neck 141 has threads thereon. The pump sub-assembly 170 comprises an actuator 173 and a collar 174. Internally and not shown, the pump sub-assembly 170 comprises a dosage chamber, a valve located upstream of the dosage chamber, and a spring that facilitate biasing the actuator 173 into the non-actuated state after it has been actuated and released. When the system 10 is fully assembled, a user actuates the actuator 173 by pressing downwardly on the actuator 173. This action causes any of the fluid in the dosage chamber to be dispensed through the dispensing orifice 172. Upon release of the actuator 173, the actuator is biased back into the non-actuated state. During this biasing of the actuator 173, the valve opens and an additional amount of the personal care fluid flows from the fluid cavity where it is stored into the dosage chamber in preparation for dispensing the next time that the actuator 173 is actuated. The internal features of the pump sub-assembly 170 are general conventional and would be understood by persons skilled in the art.

The collar 174 has an inner surface with threads thereon that mate with the threads of the neck 141 of the dispenser lid 140 so that the pump sub-assembly 170 can be coupled to the dispenser lid 140. Specifically, the dip tube 171 is inserted into and through the opening 142 in the top end of the neck 141 of the dispenser lid 140 until the collar 174 of the pump sub-assembly 170 engages the neck 141 of the dispenser lid 140. The collar 174 is then rotated relative to the neck 141 to couple the pump sub-assembly 170 to the dispenser lid 140. Of course, other techniques for coupling the pump sub-assembly 170 to the dispenser lid 140 may be possible in other embodiments, such as friction fit, lock/key, boss/detent engagement, or the like. The first dip tube 171 extends from a bottom of the dispenser lid 140 so that it is configured for engagement with the second dip tube 250 of the refill cartridge 200 as described herein.

Figure 4:
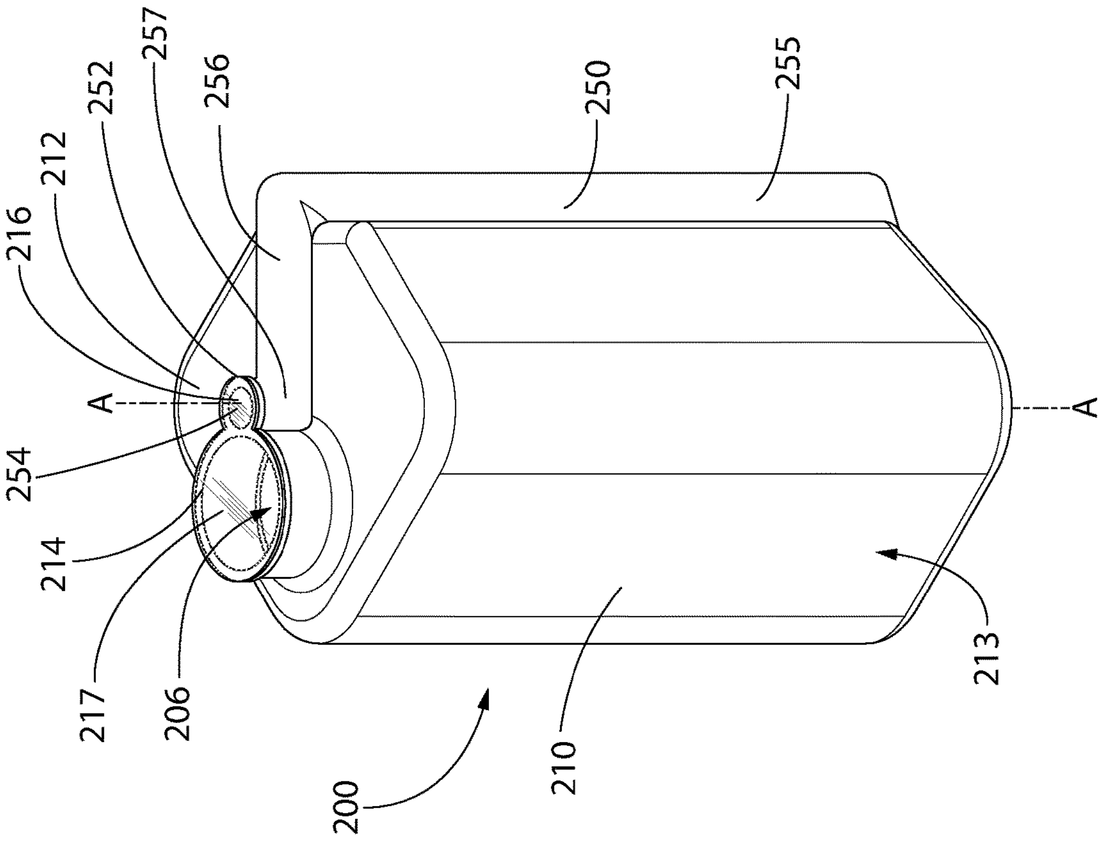
FIG. 4 is a perspective view of the refill cartridge of FIG. 2.
Figure 5:
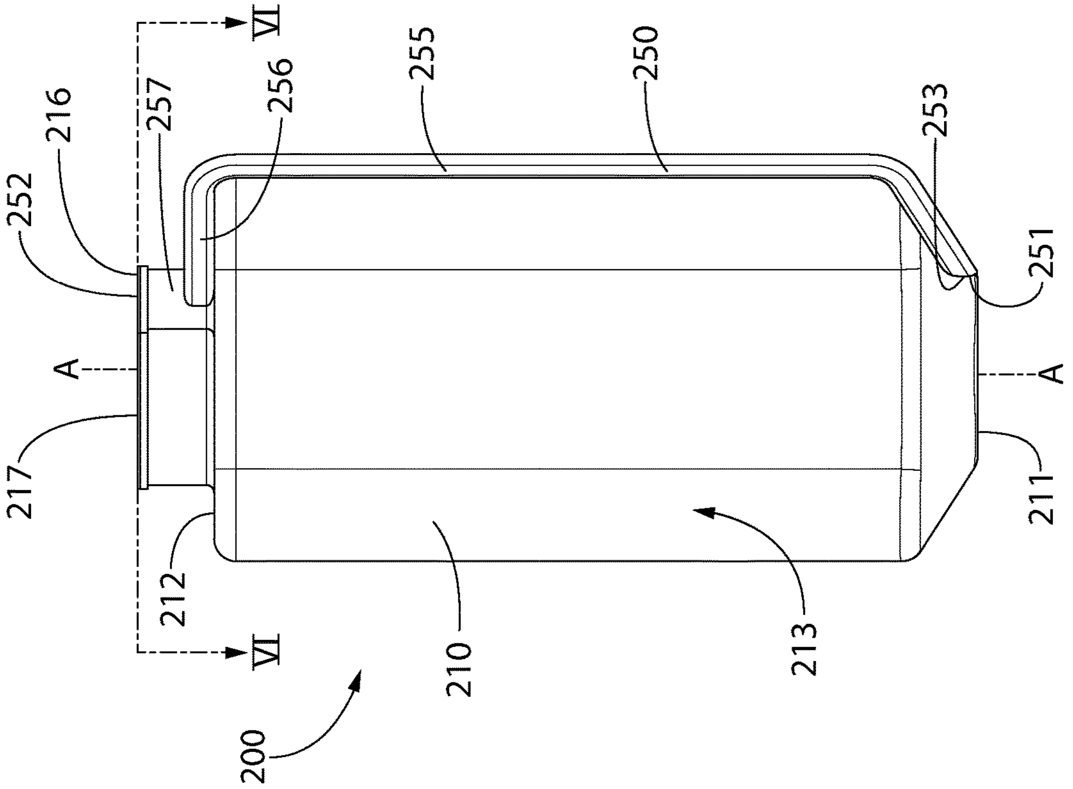
FIG. 5 is a front view of the refill cartridge of FIG. 2.
Figure 6:
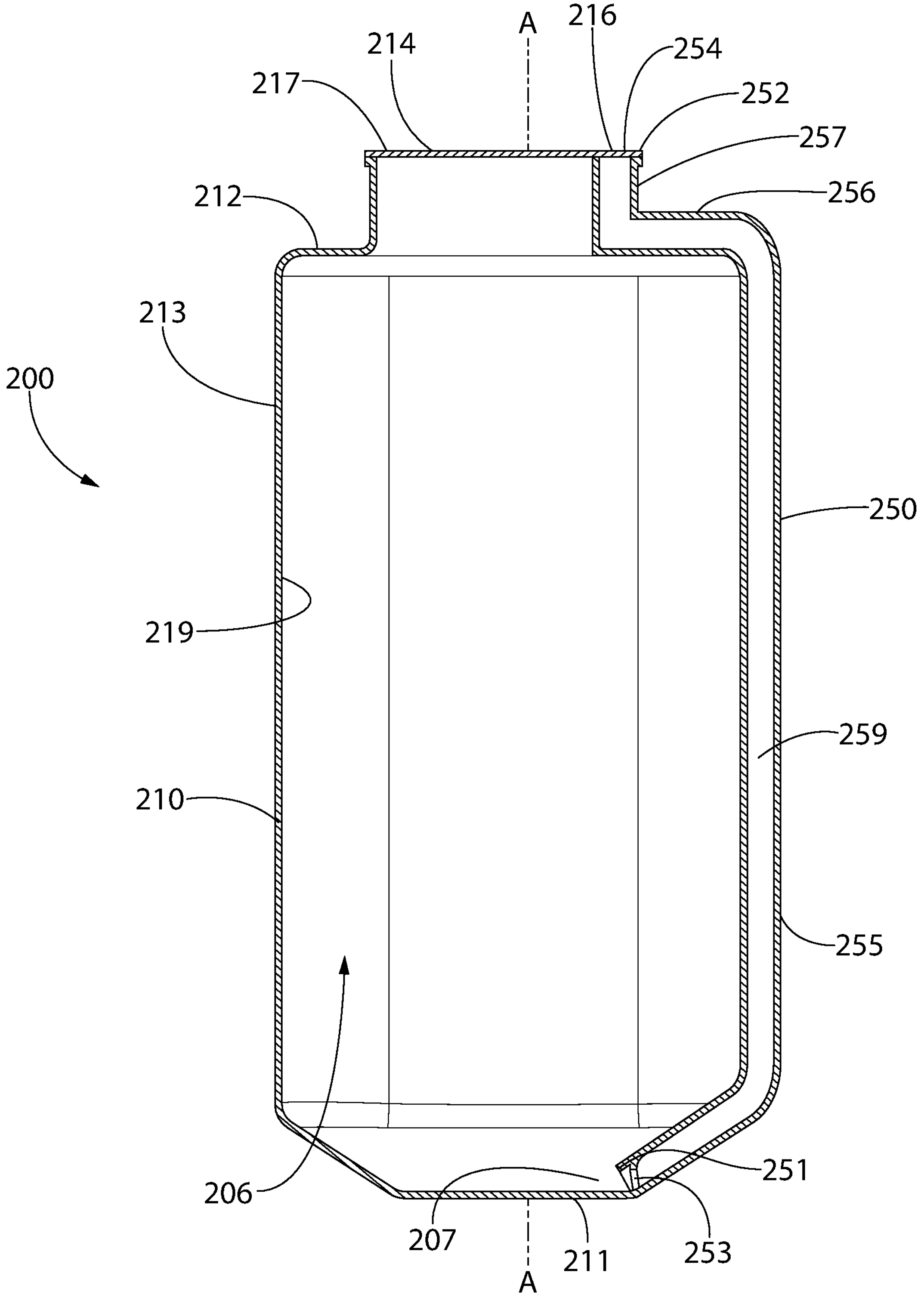
FIG. 6 is a cross-sectional view taken along line VI-VI of FIG. 5.

Referring to FIGS. 4-6 concurrently, the refill cartridge 200 will be further described. The refill cartridge 200 may be manufactured using an extrusion blow molding process. The cartridge body 210 of the refill cartridge 200 extends along a longitudinal axis A-A from a bottom end 211 to a top end 212. Furthermore, the cartridge body 210 comprises an outer surface 213 and an inner surface 219 that defines a fluid cavity 206 within which the store of the personal care fluid 205 is located. The cartridge body 210 comprises a first opening 214 in the top end 212 that provides a passageway into the fluid cavity 206. The first opening 214 is offset from the longitudinal axis A-A of the cartridge body 210.

The refill cartridge 200 also comprises the second dip tube 250 as mentioned above. In this embodiment, the second dip tube 250 is integrally formed with the cartridge body 210 as a single, unitary structure. Thus, the second dip tube 250 is not a separate component that is inserted into or otherwise coupled to the cartridge body 210, but rather it is formed as a part of the cartridge body 210. The second dip tube 250 extends along the outer surface 213 of the cartridge body 210 and defines a fluid passageway 259 that extends from a first end 251 of the second dip tube 250 to a second end 252 of the second dip tube 250. The second dip tube 250 comprises a bottom opening 253 in the first end 251 and a top opening 254 in the second end 252. The bottom opening 253 is fluidly coupled to a bottom portion 207 of the fluid cavity 206 and the top opening 254 is located at the top end 212 of the cartridge body 210. In the exemplified embodiment, the top opening 254 of the second dip tube 250 is located on the longitudinal axis A-A of the cartridge body 210.

During use, the fluid is drawn from the bottom portion 207 of the fluid cavity 206 into the passageway 259 of the second dip tube 250 via the bottom opening 253 of the second dip tube 250, through the passageway 259 of the second dip tube 250 to the top opening 254 of the second dip tube 250. From the top opening 254 of the second dip tube 250, the fluid flows into the first dip tube 171 of the pump sub-assembly 170, through the pump sub-assembly 170 as described above, and out the dispensing orifice 172.

The second dip tube 250 comprises a first portion 255, a second portion 256, and a third portion 257. The first portion 255 extends from the bottom end 251 of the second dip tube 250 to the top end 212 of the cartridge body 210. The first portion 255 of the second dip tube 250 extends generally vertically along the outer surface of the cartridge body 210. The second portion 256 extends horizontally along the top end 212 of the cartridge body 210 to a central location that is aligned with the longitudinal axis A-A. The third portion 257 extends vertically from the top end 212 of the cartridge body 210 to the second end 252 of the second dip tube 250. The second dip tube 250 is only fluidly coupled to the fluid cavity 206 via the bottom opening 253 in the first end 251 of the second dip tube 250. The remainder of the fluid passageway 259 defined by the second dip tube 250 is fluidly isolated/separated from the fluid cavity 206 (best seen in FIG. 6). Thus, the personal care fluid 205 in the fluid cavity 205 can only flow into the second dip tube 250 via the bottom opening 253 in the first end 251 of the second dip tube 250.

In the exemplified embodiment, once the fluid cavity 206 is filled with the personal care fluid 205, the top opening 254 of the second dip tube 250 is closed or otherwise sealed by a first cartridge lid 216 and the first opening 214 of the cartridge body 210 is closed or otherwise sealed by a second cartridge lid 217. In the exemplified embodiment, the first and second cartridge lids 216, 217 are a puncturable film. Furthermore, in the exemplified embodiment the first and second cartridge lids 216, 217 are integrally formed, although they could be separate puncturable films in other embodiments. In some embodiments the first cartridge lid 216 that seals that top opening 254 of the second dip tube 250 may be a puncturable film while the second cartridge lid 217 that seals the first opening 214 of the cartridge body 210 may be plastic lid or the like. Such a plastic lid may be detachably (or permanently) secured to the cartridge body 210 in such a manner so as to seal the first opening 214 after the fluid cavity 206 is filled with the personal care fluid 205.

Referring to FIG. 2, assembly of the system 10 will be briefly described. First, the refill cartridge 200 is placed into the refill cavity 113 of the dispenser body 110. As noted above, the refill cartridge 200 may be suspended within the refill cavity 113 via engagement between features on the inner surface of the dispenser body 110 and features on the outer surface of 213 of the cartridge body 210. Such features may also prevent the cartridge body 210 from rotating relative to the dispenser body 110 and may ensure that the cartridge body 210 is positioned within the refill cavity 113 of the dispenser body 110 in a particular relative orientation.

Next, the dispenser lid 140 with the pump sub-assembly 170 pre-mounted thereon is coupled to the dispenser body 110 to close the open top end 111 of the dispenser body 110. As noted previously, the first dip tube 171 protrudes from a lower end of the dispenser lid 140. Thus, as the dispenser lid 140 is moved towards the dispenser body 110 for coupling thereto, the first dip tube 171 will contact the first cartridge lid 216 and will eventually puncture the first cartridge lid 216 as the dispenser lid 140 continues to be moved axially towards the dispenser body 110. The dispenser lid 140 is then coupled to the dispenser body 110 using any of the techniques described above, such as interference fit, mating threads, snap-latch, or the like. When the dispenser lid 140 is coupled to the dispenser body 110, the first dip tube 171 nests within the third portion 257 of the second dip tube 250.

Once fully assembled, the first dip tube 171 of the pump sub-system 170 is fluidly coupled to the second dip tube 250. In fact, the first and second dip tubes 171, 250 may be hermetically sealed. Once assembled, the personal care fluid can be pumped from the refill cartridge 200 to the dispensing orifice 172 in the pump sub-system 170 for dispensing into a user's hand or the like by pressing downwardly on the actuator 173 in the direction of the axis A-A and then releasing the actuator 173. This action, which is the conventional operation for dispensing containers of this type, pumps the personal care fluid to the dispensing orifice 172. Of course, use of the pump sub-assembly 170 for dispensing is only one dispensing technique. In other embodiments, the fluid may be dispensed by squeezing the dispenser and cartridge bodies 110, 210 and/or by tipping the system 10 upside-down to pour the fluid out from an opening in the top of the apparatus.

Figure 8:
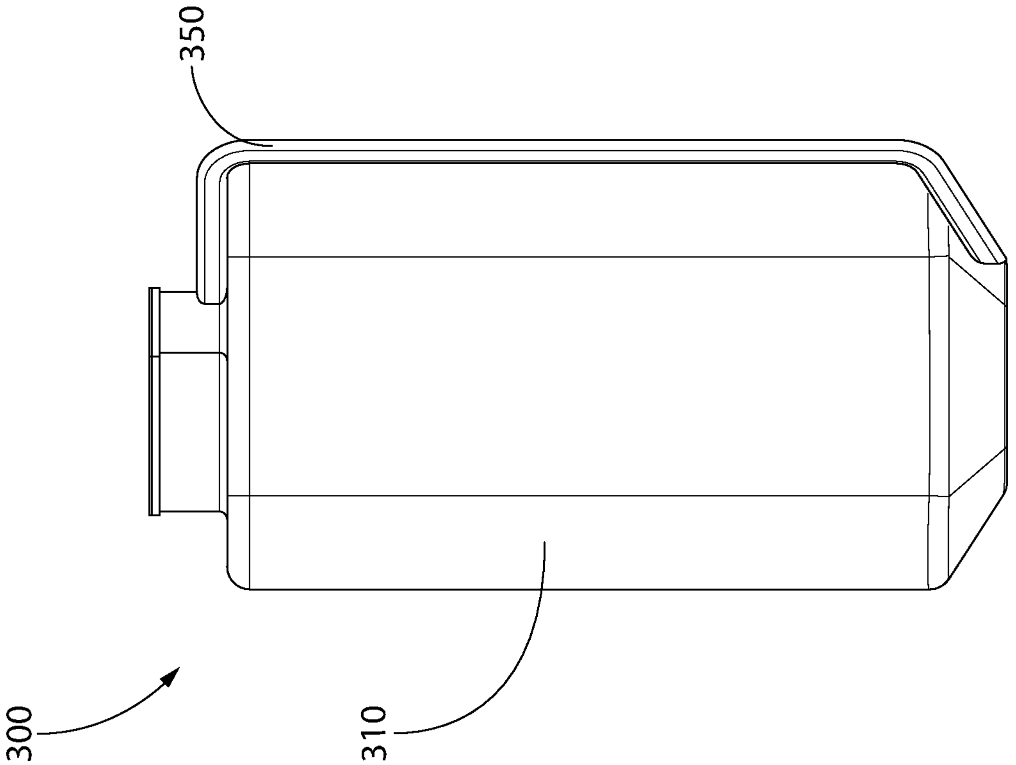
FIG. 8 is a front view of the refill cartridge of FIG. 7.
Figure 7:
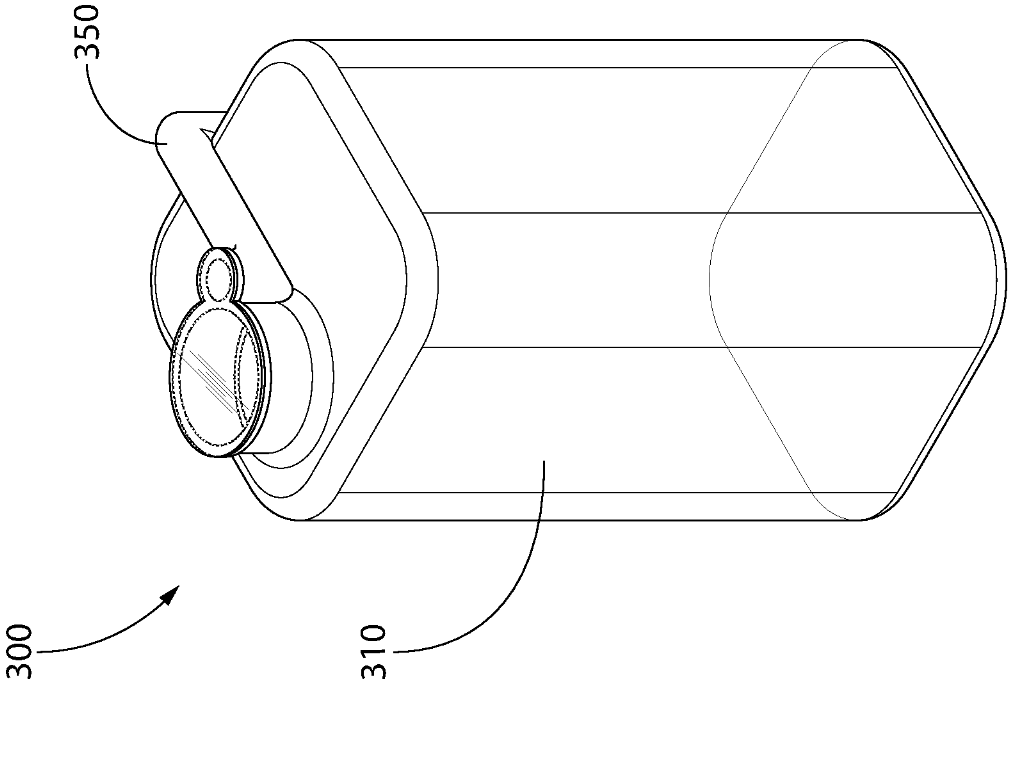
FIG. 7 is a perspective view of an alternative embodiment of a refill cartridge.

FIGS. 7 and 8 illustrate an alternative embodiment of a refill cartridge 300 in accordance with the present invention. The refill cartridge 300 comprises a cartridge body 310 and a second dip tube 350. The refill cartridge 300 is identical to the refill cartridge 200 described above except with regard to the shape of the cartridge body 310 and the specific location/positioning of the second dip tube 350 along the outer surface of the cartridge body 310. FIGS. 7 and 8 adequately illustrate the modification and further description will not be provided herein, it being understood that the description of the refill cartridge 200 provided above is entirely applicable except for the clear structure modifications shown in the drawings.

Figure 9:
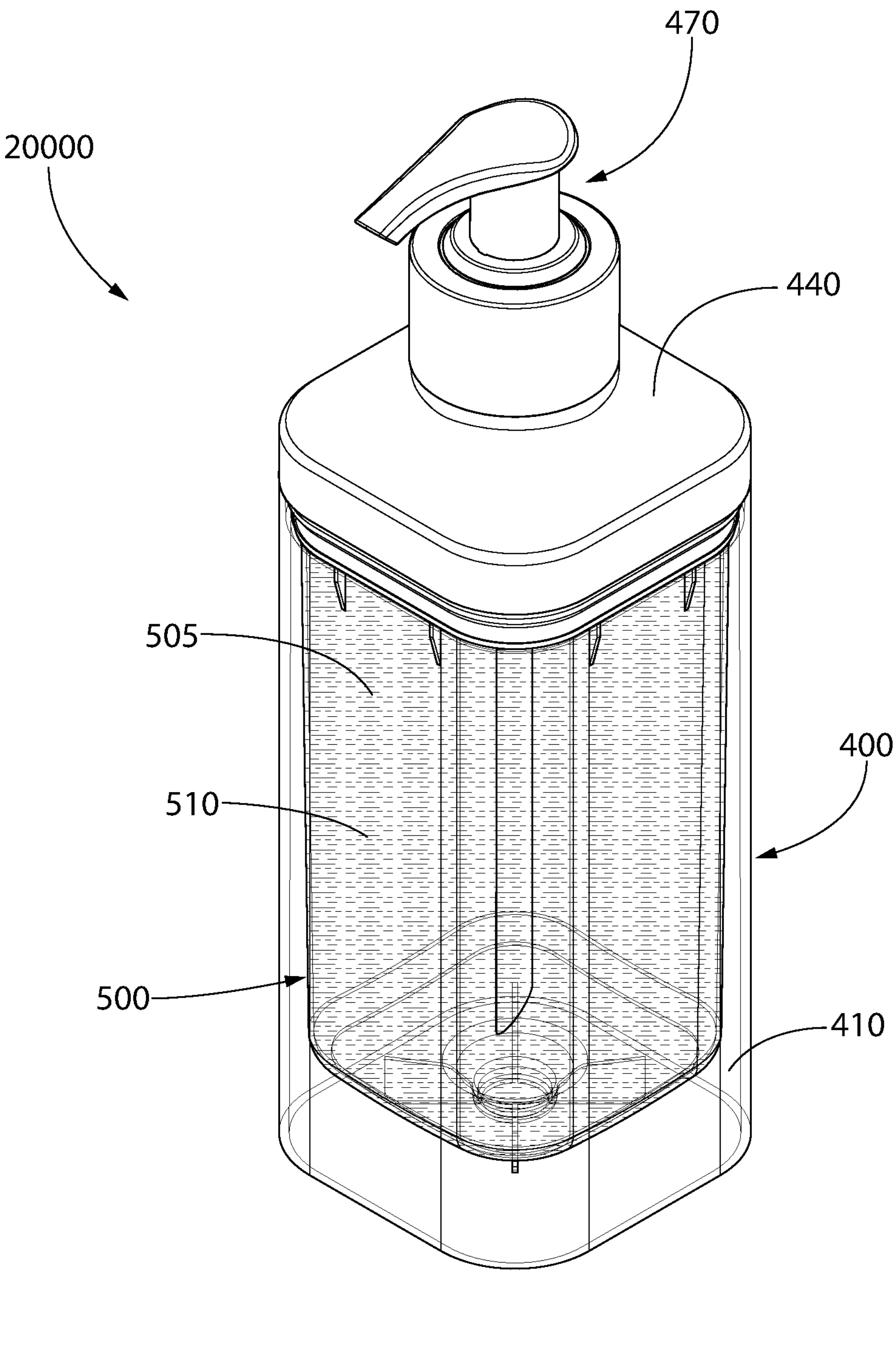
FIG. 9 is a perspective view of a system for dispensing a personal care fluid in an assembled state in accordance with another embodiment of the present invention.
Figure 10:
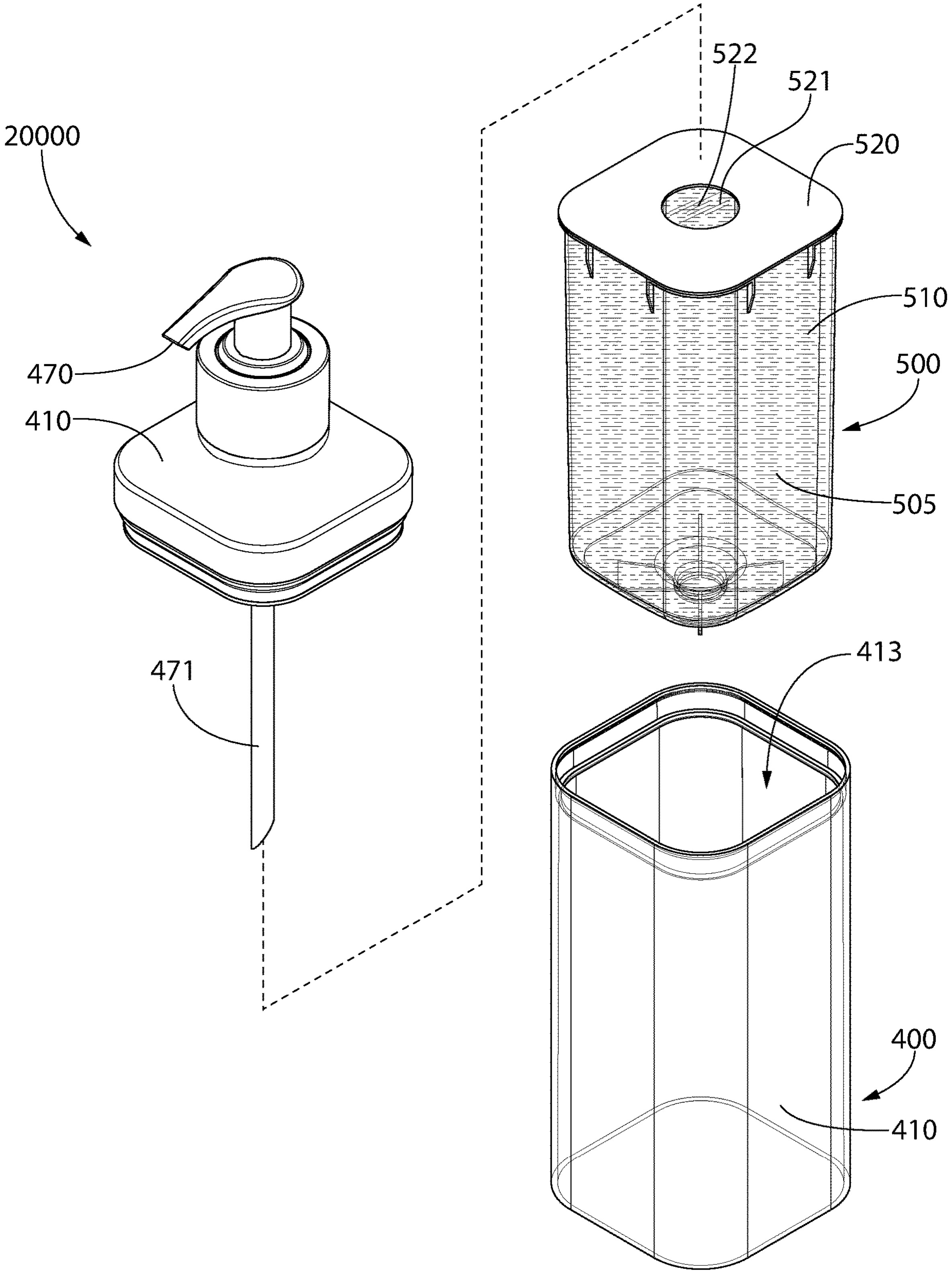
FIG. 10 is a perspective view of the system of FIG. 9 in a disassembled state with a dispenser body, a refill cartridge, and a dispenser lid/pump sub-system detached from one another.
Figure 12:
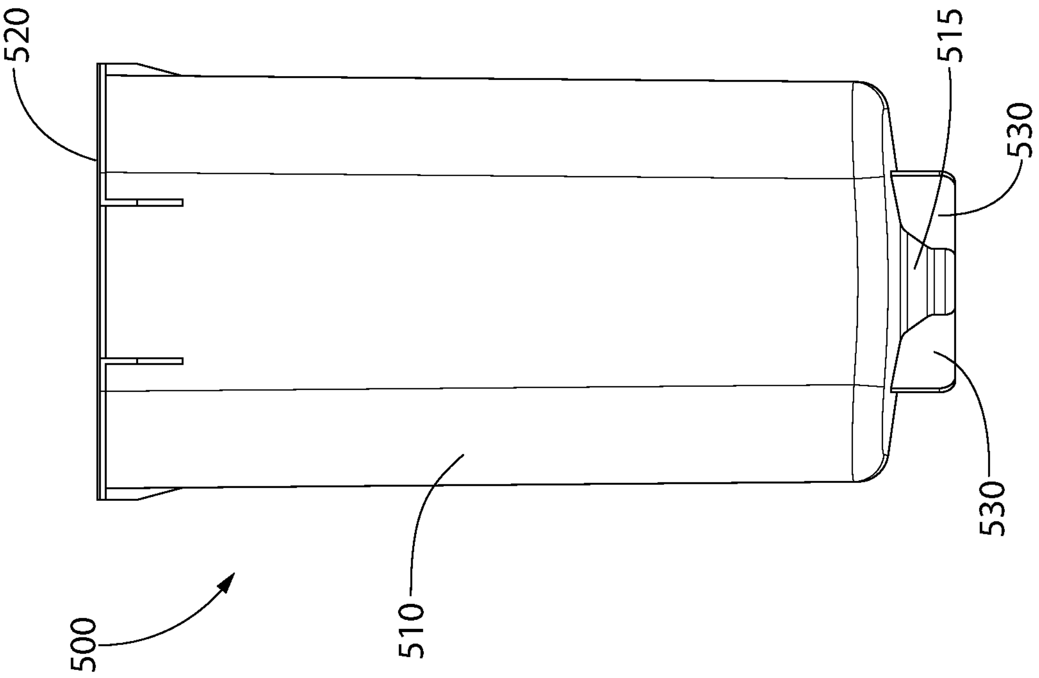
FIG. 12 is a front view of the refill cartridge of FIG. 10.
Figure 11:
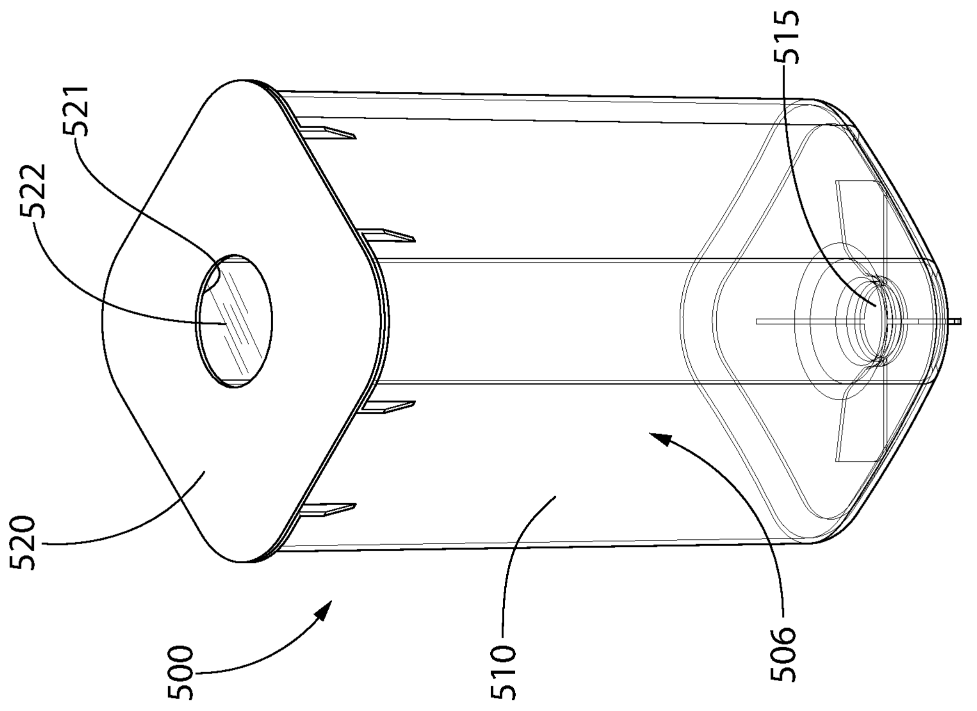
FIG. 11 is a perspective view of the refill cartridge of FIG. 10.

Referring to FIGS. 9-11, another embodiment of a system 20000 for dispensing a personal care fluid is illustrated. The system 20000 comprises a dispenser 400 and a refill cartridge 500. The dispenser 400 comprises a dispenser body 410 having a refill cavity 413 and a dispenser lid 440 that is detachably coupled to the dispenser body 410 to close an open top end of the dispenser body 410. A pump sub-system 470 may be mounted to the dispenser lid 440. The dispenser 400 is essentially identical to the dispenser 100 described above and therefore the description of the dispenser 100 is applicable to the dispenser 400. The difference between the system 20000 and the system 10 previously described is with regard to the structure of the refill cartridge 500.

The refill cartridge 500 comprises a cartridge body 510 defining a fluid cavity 506 that contains a store of the personal care fluid 505. The cartridge body 510 comprises an open top end that is closed by a cartridge lid 520. In the exemplified embodiment, the refill cartridge 500 does not comprise a dip tube, but instead the dip tube 471 of the pump sub-assembly 470 is the only dip tube of the system 20000. However, in other embodiments the dip tube 471 of the pump sub-assembly 470 may form a first dip tube that mates with a dip tube that is integrally formed with the refill cartridge 500. Such a dip tube of the refill cartridge 500 may be integral with the cartridge lid 520 or it may be integral with the cartridge body 510.

The cartridge lid 520 comprises an opening 521 that is covered by a puncturable film 522. Thus, the refill cartridge 500 can be sold as a stand-alone unit that is pre-filled with the personal care fluid 505. The open top end of the cartridge body 510 is sealed by the cartridge lid 520 and the puncturable film 522.

The cartridge body 510 has a funnel-shaped lower end 515. This forces some of the personal care fluid 505 to always be located in the funnel-shaped lower end 515 as the personal care fluid 505 is used up and extracted from the fluid cavity 506 of the cartridge body 510. It is preferable that the dip tube (whether it is the dip tube 471 of the pump sub-assembly 470 or a dip tube that forms a part of the refill cartridge 500) extend into the funnel-shaped lower end 515 of the cartridge body 510 to ensure that virtually all of the personal care fluid 505 can be removed from the cartridge body 510 for use by a consumer. The cartridge body 510 also has fins 530 located on its bottom end. The fins 530 permit the cartridge body 510 to stand upright on a horizontal surface. In that regard, the fins 530 extend radially from the funnel-shaped lower end 515 of the cartridge body 510. Without the fins 530, the cartridge body 510 would be unable to stand upright due to the shape of the funnel-shaped lower end 515 of the cartridge body 510, which is unable to support the entire cartridge body 510 in a balanced manner. The fins 530 provide an additional support structure that enables the container body 510 to stand upright as noted above.

During assembly, the refill cartridge 500 is placed into the refill cavity 413 of the dispenser body 410. Next, the dispenser lid 410 with the dip tube 471 protruding therefrom is translated towards the dispenser body 410 until the dip tube 471 punctures the puncturable film 522 covering the opening 521 in the dispenser lid 520. The dispenser lid 440 is continued to be moved axially until it is coupled to the dispenser body 410 either via friction fit, snap-latch, or via rotating the dispenser lid 440 relative to the dispenser body 410 to engage mating threads between the two components. The dip tube 471 may mate with another dip tube that is formed as a part of the refill cartridge or the dip tube 471 may be the only dip tube of the system 20000, as described herein.

Figure 13:
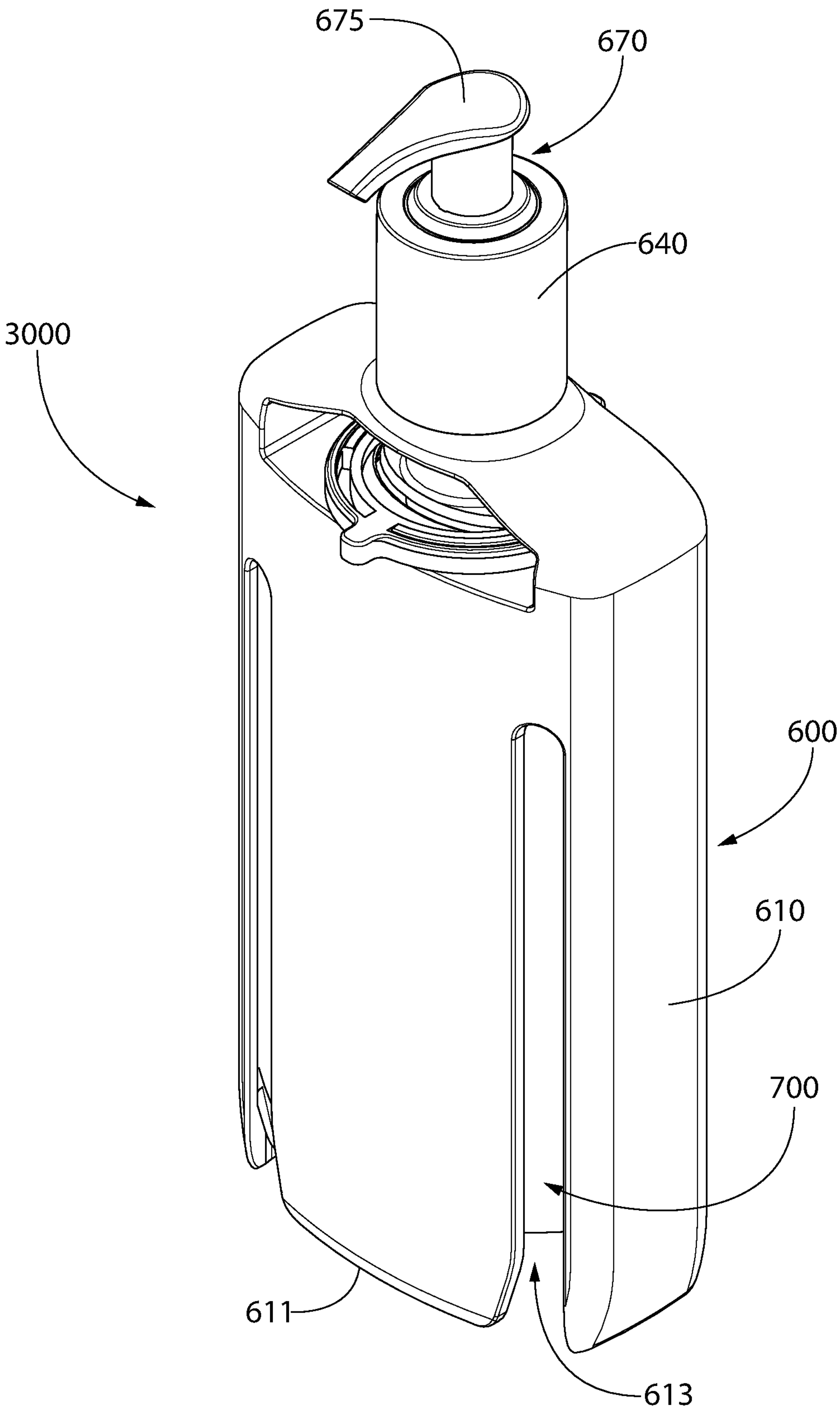
FIG. 13 is a perspective view of a system for dispensing a personal care fluid in an assembled state in accordance with yet another embodiment of the present invention.
Figure 14:
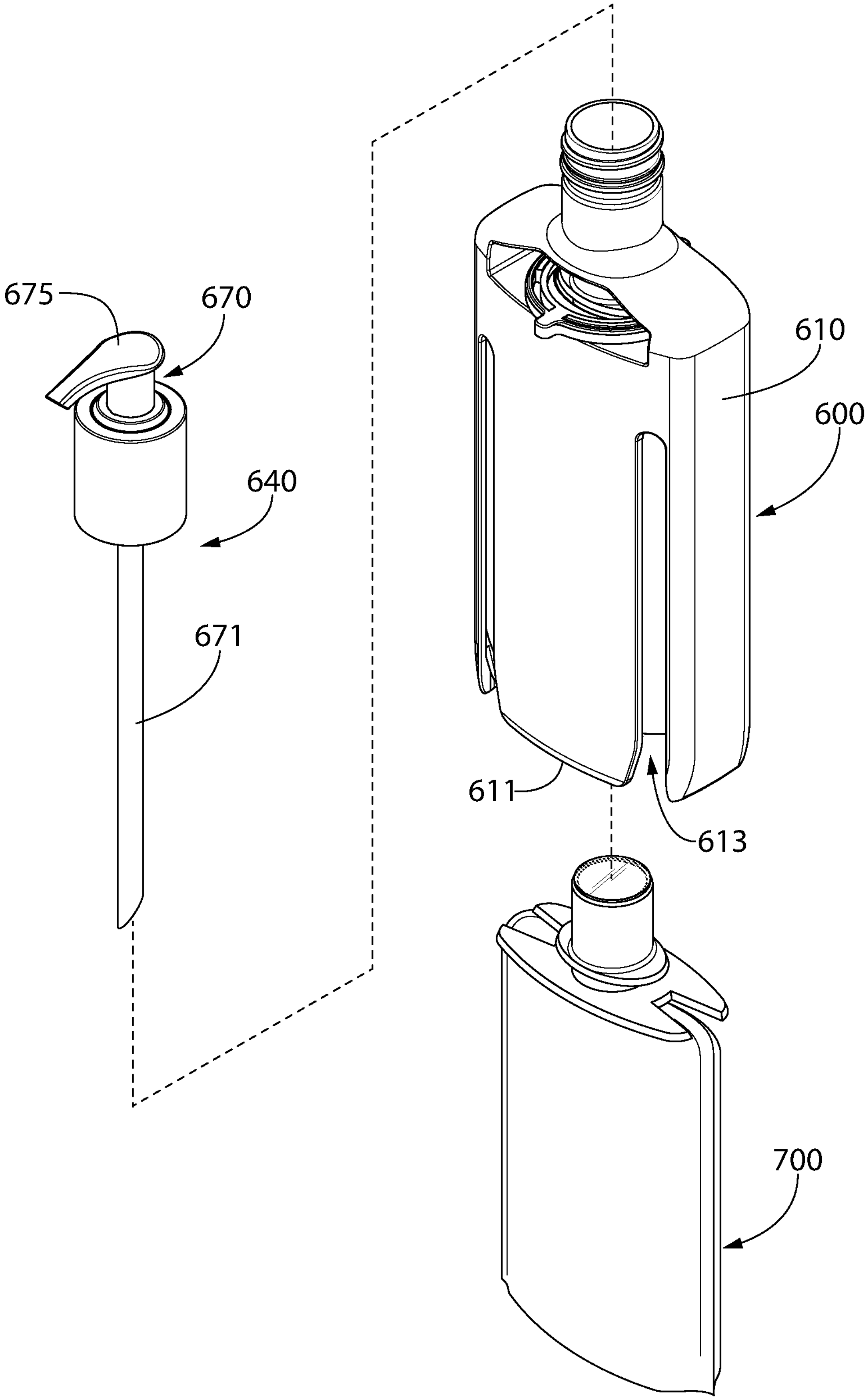
FIG. 14 is a perspective view of the system of FIG. 13 in a disassembled state with a dispenser including a dispenser body and a dispenser lid/pump sub-system and a refill cartridge detached from one another.

Referring to FIGS. 13 and 14, a system 3000 for dispensing a personal care fluid is illustrated in accordance with another embodiment of the present invention. The system 3000 generally comprises a dispenser 600 and a refill cartridge 700. The dispenser 600 comprises a dispenser body 610 and a lid 640. In this embodiment, the lid 640 has a pump sub-assembly 670 mounted thereon, the pump sub-assembly 670 including an actuator 675 and a dip tube 671. sub-assembly 670 may also comprise the additional internal structures, features, and components needed to facilitate pumping of the personal care fluid. However, as will be described hereinafter, the pump sub-assembly 670 is not required in this embodiment because the personal care fluid may be configured to be dispensed by squeezing or pouring. The dispenser body 610 comprises a refill cavity 613 and an open bottom end 611 that provides a passageway into the refill cavity 613. In this embodiment, the refill cartridge 700 is loaded into the refill cavity 613 of the dispenser body 610 via the open bottom end 611.

Figure 15:
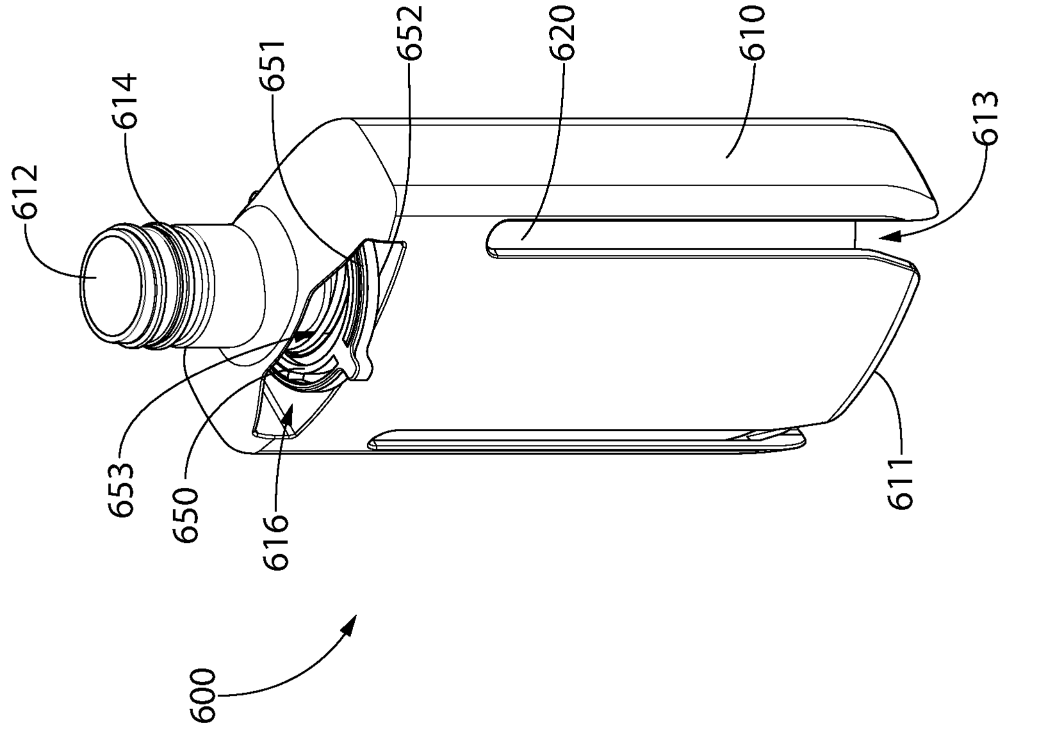
FIG. 15 is a perspective view of the dispenser body of FIG. 14.
Figure 16:
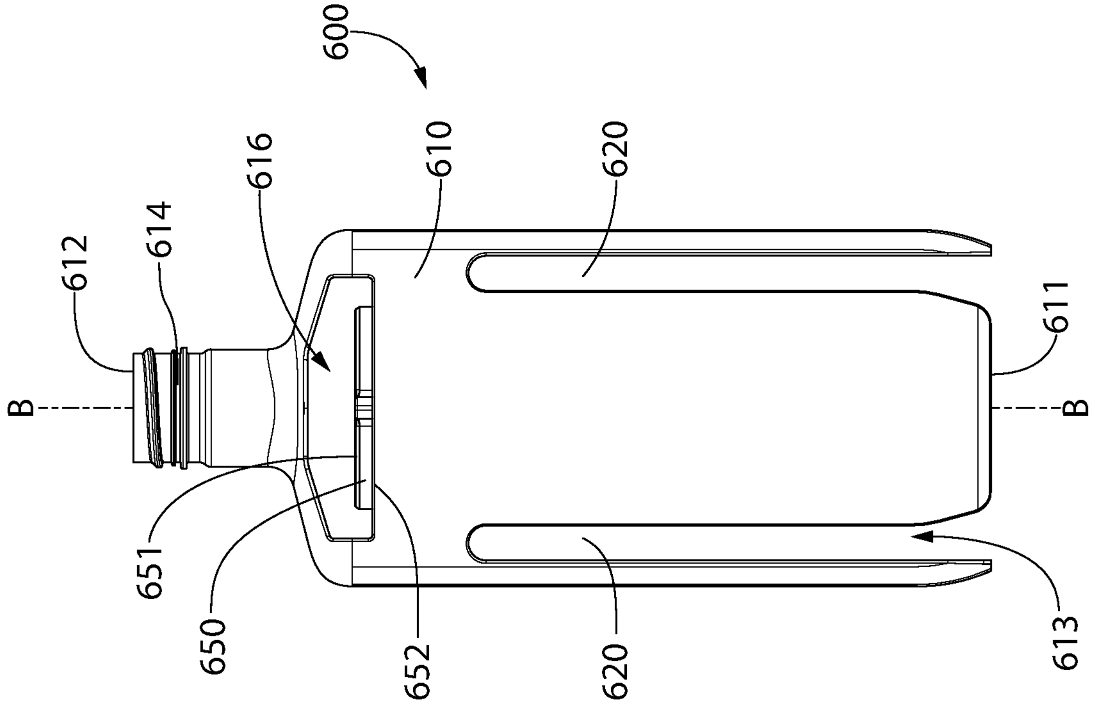
FIG. 16 is a front view of the dispenser body of FIG. 15.
Figure 17A:
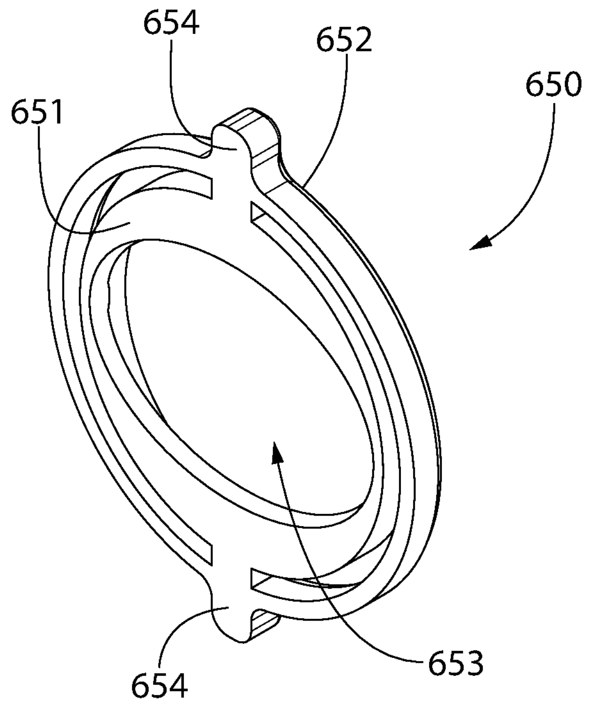
FIG. 17A is a perspective view of a locking element of the dispenser of FIG. 14.
Figure 17B:
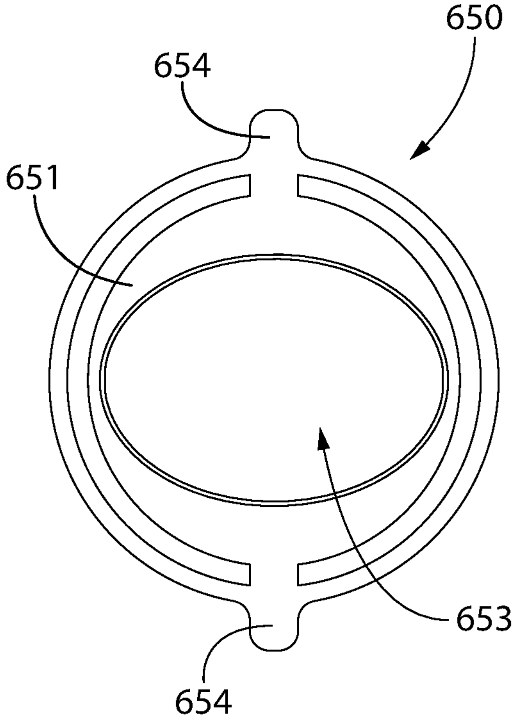
FIG. 17B is a front view of the locking element of FIG. 17A.

Referring to FIGS. 15 and 16, the dispenser body 610 will be further described. The dispenser body 610 extends along a dispenser axis B-B from the open bottom end 611 to an open top end 612. In the exemplified embodiment, the open top end 612 is an opening formed into a neck 614 of the dispenser body 610 to which the dispenser lid 640 is coupled. In the exemplified embodiment, the dispenser body 610 comprises a plurality of slits 620 extending from the open bottom end 611 of the dispenser body 610 towards the neck 614 (although they do not extend all the way to the neck 614 in the exemplified embodiment). Each of the slits 620 is elongated in a direction of the dispenser axis B-B. The dispenser body 610 may be formed of a rigid material such that it does not generally flex when squeezed. However, due to the slits 620, when the dispenser body 610 is squeezed the portions of the dispenser body 610 located between the slits 620 flex inwardly into the refill cavity 613. In some embodiments, the cartridge body 710 of the refill cartridge 700 may be formed of a flexible or resilient material. Thus, when the refill cartridge 700 is located within the refill cavity 613 and the dispenser body 610 is squeezed, the personal care fluid may be dispensed from the refill cartridge 700.

Of course, the slits 620 may be omitted in some embodiments. For example, in embodiments that include the pump sub-system 670, the slits 620 are not needed to dispense the personal care fluid because this can be achieved by activation of the pump sub-system 670. In other embodiments, the pump sub-system 670 and the slits 620 may both be omitted, and dispensing may take place by tipping the dispenser body 610 so that the personal care fluid can be poured out in a conventional manner.

Referring to FIGS. 15-17B, the dispenser 600 also comprises a locking element 650 that is configured to facilitate coupling the refill cartridge 700 to the dispenser body 610. The locking element 650 is located within an upper portion 616 of the refill cavity 613 and is coupled to the dispenser body 610. The locking element 650 is capable of being rotated relative to the dispenser body 610 between locked and unlocked states, as described in more detail below. Rotation of the locking element 650 relative to the dispenser body 610 may occur while the locking element 650 remains coupled to the dispenser body 610. The locking element 650 comprises a first surface 651, a second surface 652 opposite the first surface 651, and a non-circular opening 653 extending through the locking element 650 from the first surface 651 to the second surface 652. In the exemplified embodiment, the non-circular opening 653 is oval shaped, but other shapes are possible so long as the locking element 650 is capable of locking the refill cartridge 700 to the dispenser body 610 as described below.

Figure 18:
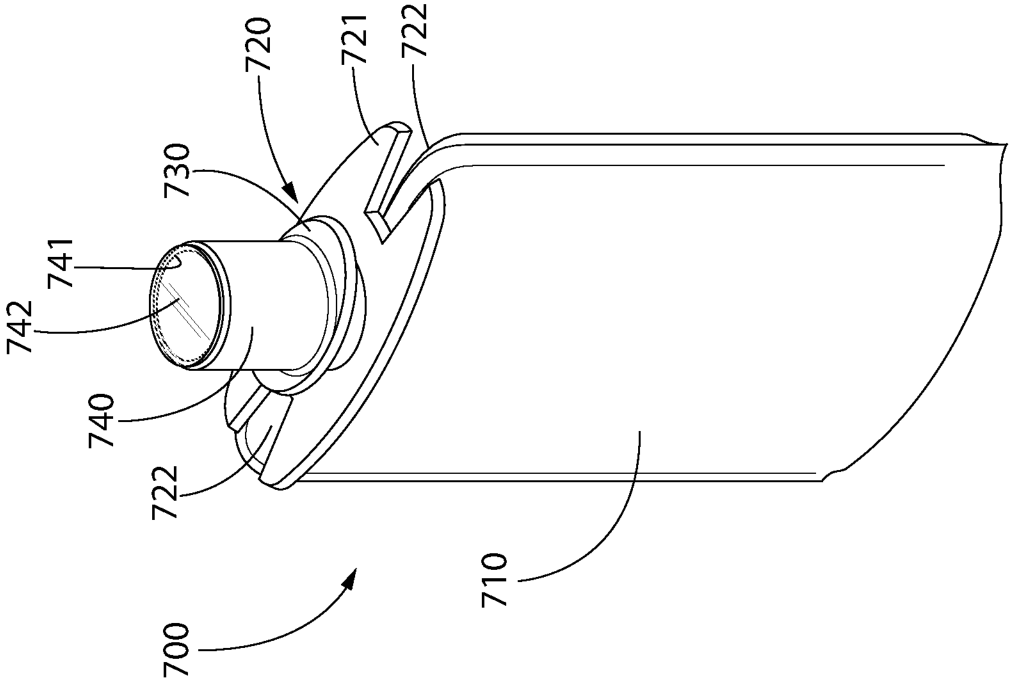
FIG. 18 is a perspective view of the refill cartridge of FIG. 14.
Figure 19:
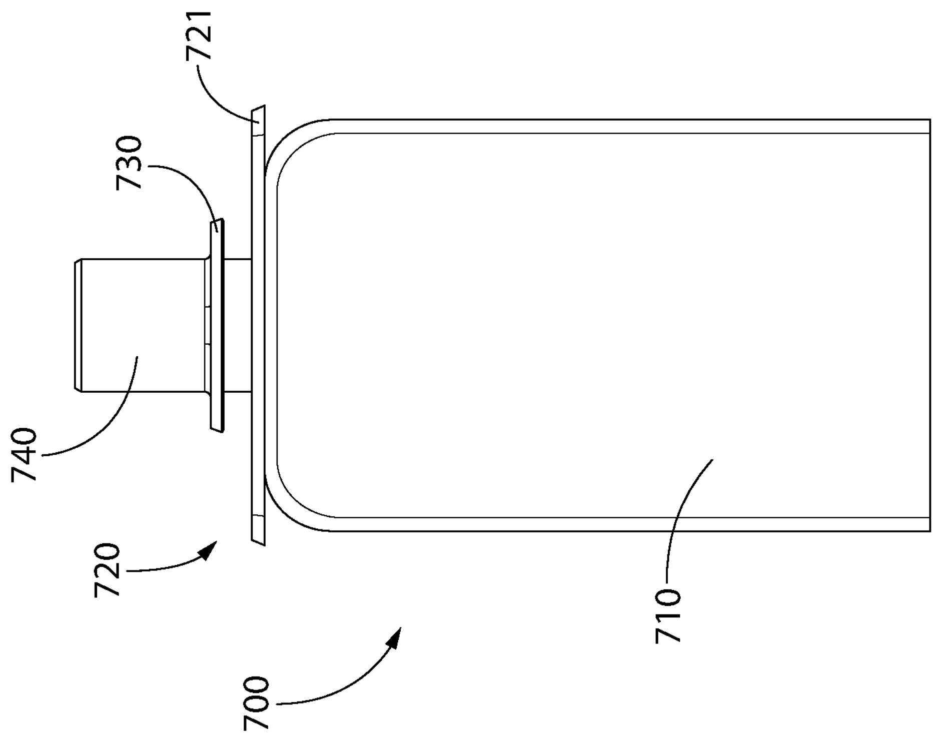
FIG. 19 is a front view of the refill cartridge of FIG. 18.

Referring to FIGS. 18 and 19, the refill cartridge 700 will be further described. The refill cartridge 700 comprises the cartridge body 710 and a coupling element 720 coupled to the cartridge body 710. The cartridge body 710 comprises a fluid cavity that contains a store of the personal care fluid (not illustrated in this embodiment). In this embodiment, the cartridge body 710 is preferably a pouch formed of a flexible material such that the cartridge body 710 can be squeezed to dispense the personal care fluid from the cartridge body 710 for use by a consumer. Such pouches may be formed of BPA free polypropylene and foil or any other materials that will enable the cartridge body 710 to function as disclosed herein. If a user squeezes opposing sides of the cartridge body 710 while the top end of the cartridge body 710 is open, the personal care fluid will be dispensed from the fluid cavity via the open top end of the cartridge body 710.

The coupling element 720 is attached to the top end of the cartridge body 710. The coupling element 720 comprises an alignment collar 721, a locking collar 730, and a neck portion 740 protruding from the locking collar 730. The neck portion 740 terminates in an opening 741 that may be covered or otherwise sealed or closed by a lid or puncturable film 742. The alignment collar 721 comprises notches 722 that are configured to receive protuberances 660 (see FIGS. 21B and 22B) of the dispenser body 610 to ensure that the refill cartridge 700 is properly aligned relative to the dispenser body 610 when the refill cartridge 700 is inserted into the refill cavity 613 of the dispenser body 610. The locking collar 730 has a non-circular shape, which in the exemplified embodiment is an oval. However, the exact shape of the locking collar 730 is not to be particularly limiting so long as it interacts with the locking element 650 of the dispenser 600 to lock the refill cartridge 700 to the dispenser 600 as described herein.

Figure 20:
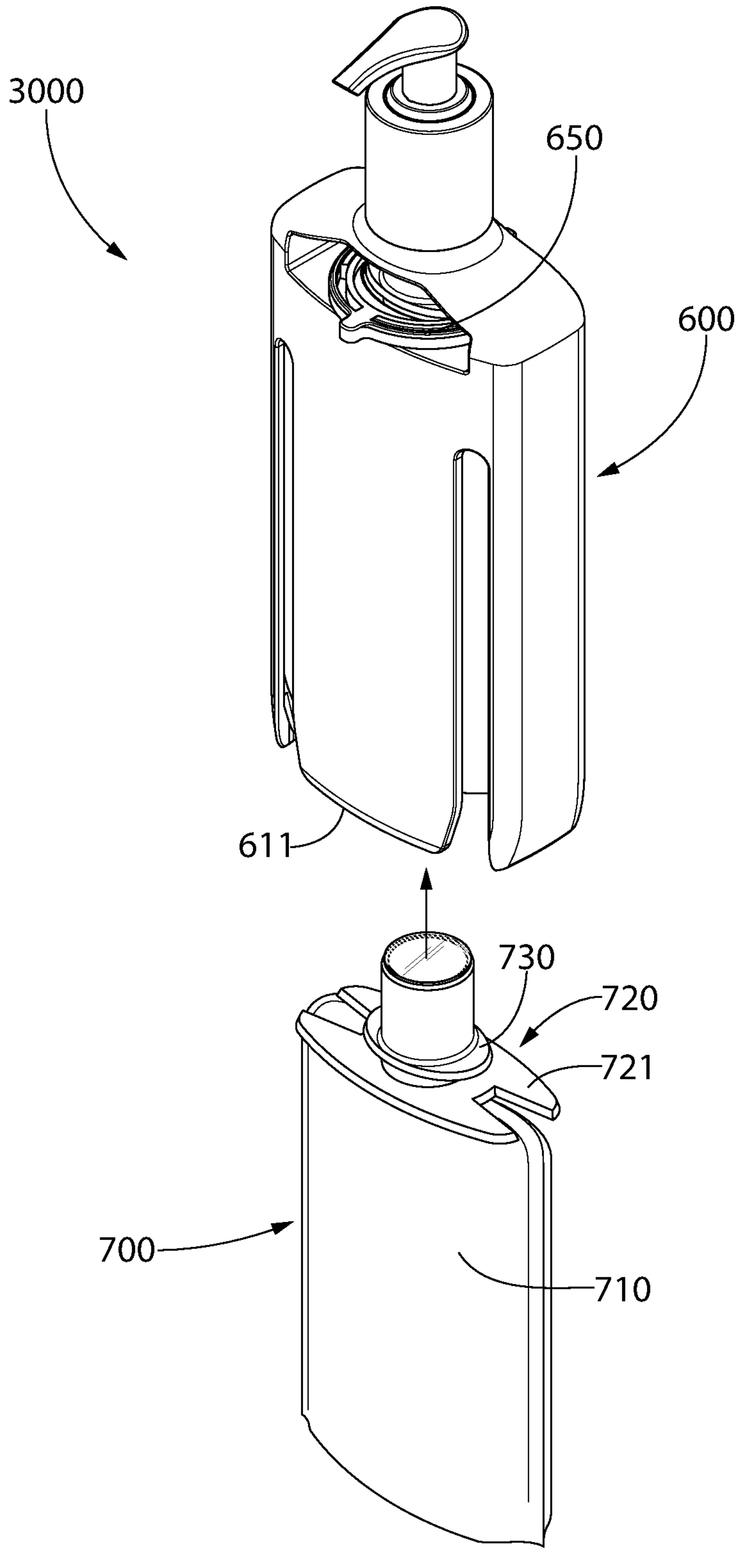
FIG. 20 is a perspective view illustrating the refill cartridge being inserted into the dispenser body.

Referring to FIG. 20, as noted above in this embodiment the refill cartridge 700 is bottom-loaded into the refill cavity 613 of the dispenser body 610 via the open bottom end 611 of the dispenser body 610. FIG. 20 merely illustrates this process. The refill cartridge 700 is inserted into the refill cavity 613 until the neck portion 640 and the locking collar 630 extend through the opening 653 in the locking element 650 and the protuberances 660 of the dispenser body 610 nest within the notches 722 of the coupling element 720.

Figure 21A:
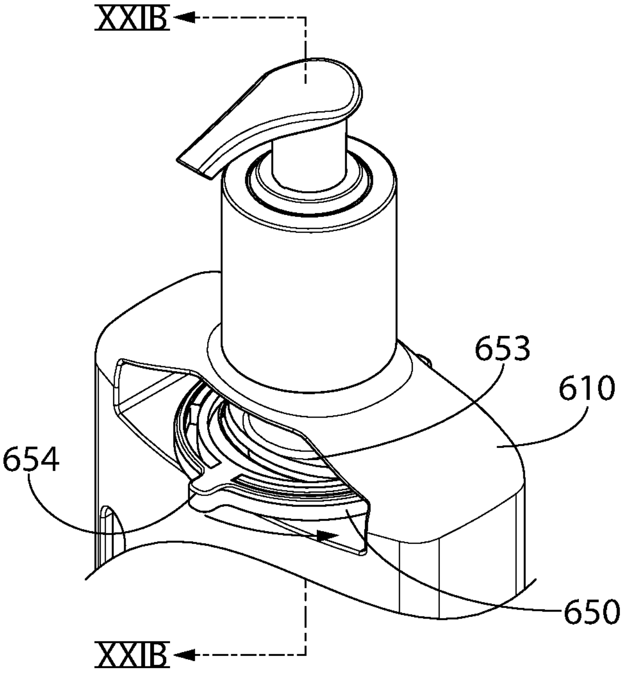
FIG. 21A is a perspective view of a portion of the system of FIG. 14 with the refill cartridge located within a refill cavity of the dispenser body in an unlocked state.
Figure 21B:
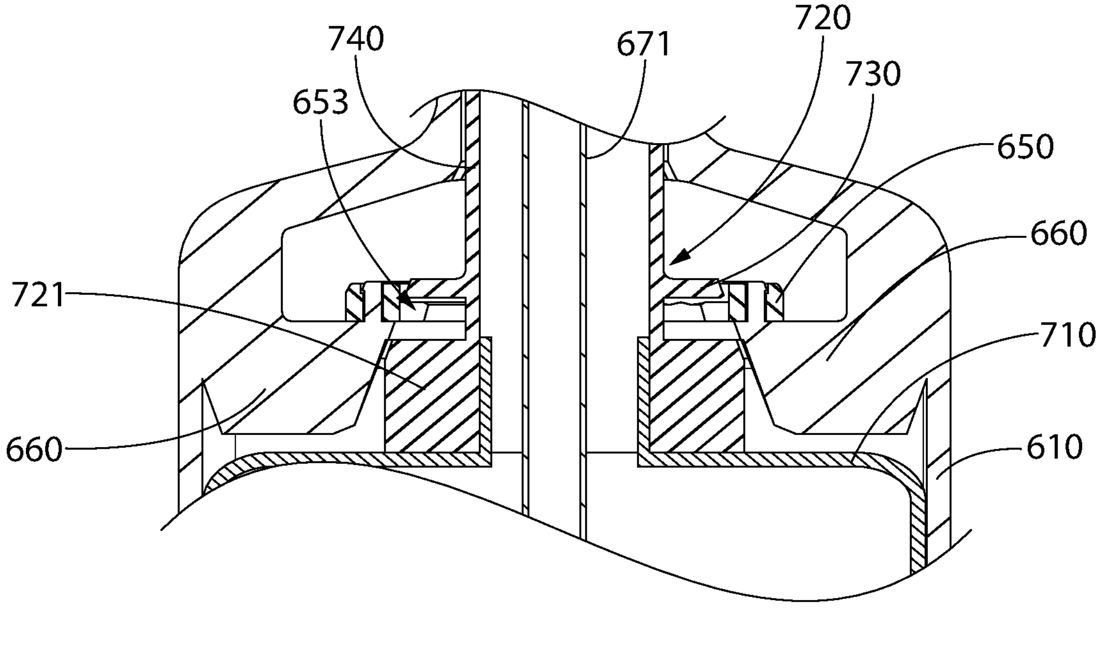
FIG. 21B is a cross-sectional view taken along line XXIB-XXIB of FIG. 21A.

Referring to FIGS. 21A and 21B, a portion of the system 3000 is illustrated in an assembled and unlocked state. Specifically, FIGS. 21A and 21B illustrate the system 3000 with the refill cartridge 700 located within the refill cavity 613 of the dispenser body 610. In this view, the neck portion 640 and the locking collar 630 of the coupling element 620 extend through the opening 653 in the locking element 650. Because the opening 653 of the locking element 650 and the locking collar 630 of the coupling element 620 are both oval in the exemplified embodiment, they must be properly aligned in order to enable the locking collar 630 to pass through the opening 653. The opening 653 and the locking collar 630 may be shapes other than oval, such as both being square, triangular, rectangular, or the like. In other embodiments, the opening 653 and the locking collar 630 may each have a different shape without limiting the function described herein. Because the locking element 650 is rotatably coupled to the dispenser body 610, the locking element 650 must be rotated to the position shown in FIGS. 21A and 21B during assembly in order to enable the locking collar 630 to fit through the opening 653. Otherwise, the locking collar 630 will bump against the locking element 650 during assembly and the refill cartridge 700 will be unable to be fully inserted into the refill cavity 613 of the dispenser body 610.

Figure 22A:
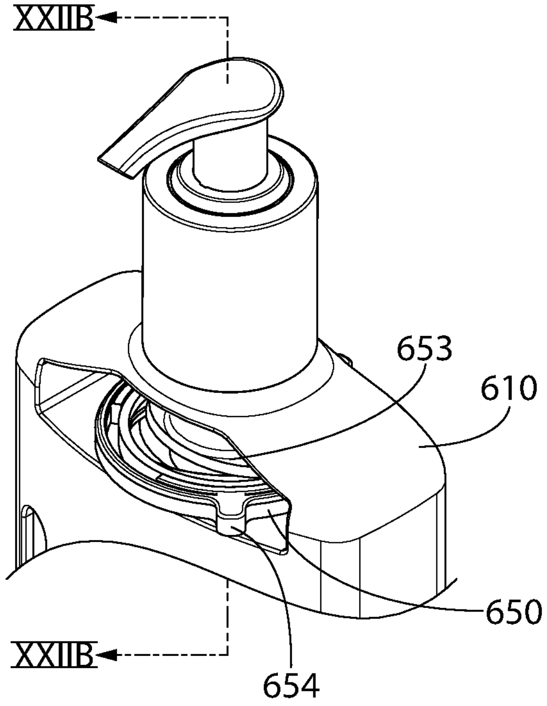
FIG. 22A is a perspective view of the portion of the system of FIG. 21A with the refill cartridge located within the refill cavity of the dispenser body in a locked state.
Figure 22B:
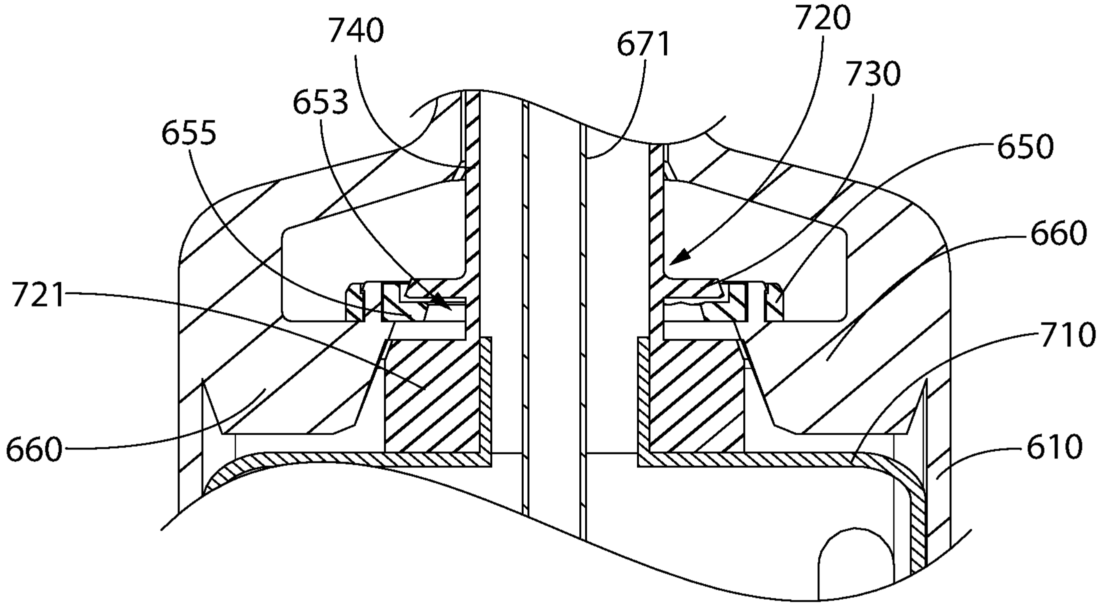
FIG. 22B is a cross-sectional view taken along line XXIIB-XXIIB of FIG. 22A.

Referring to FIGS. 22A and 22B, once the refill cartridge 700 is located within the refill cavity 613 of the dispenser body 610, the locking element 650 is rotated relative to the refill cartridge 700 and relative to the dispenser body 610 until a portion 655 of the locking element 650 engages a bottom surface of the locking collar 730, thereby preventing the refill cartridge 700 from being removed from the refill cavity 613. The locking element 650 can be rotated by a user gripping a tab portion 654 of the locking element 650 and moving the locking element 650 in a rotational direction. As best shown in FIG. 22B, the portion 655 of the locking element 650 protrudes into the space between the locking collar 730 and the alignment collar 721. As a result, the refill cartridge 700 cannot be translated axially through the open bottom end 611 of the dispenser body 610 and the refill cartridge 700 is locked within the refill cavity 613. When so locked, even if the dispenser 600 is lifted, the refill cartridge 700 will not fall out through the open bottom end 611 of the dispenser body 610 (via gravity) because it is locked in place. Rotating of the locking element 650 in the opposite rotational direction until the opening 653 of the locking element 650 is aligned with the locking collar 730 will enable the refill cartridge 700 to be removed from the refill cavity 613 of the dispenser body 610.

Figure 23:
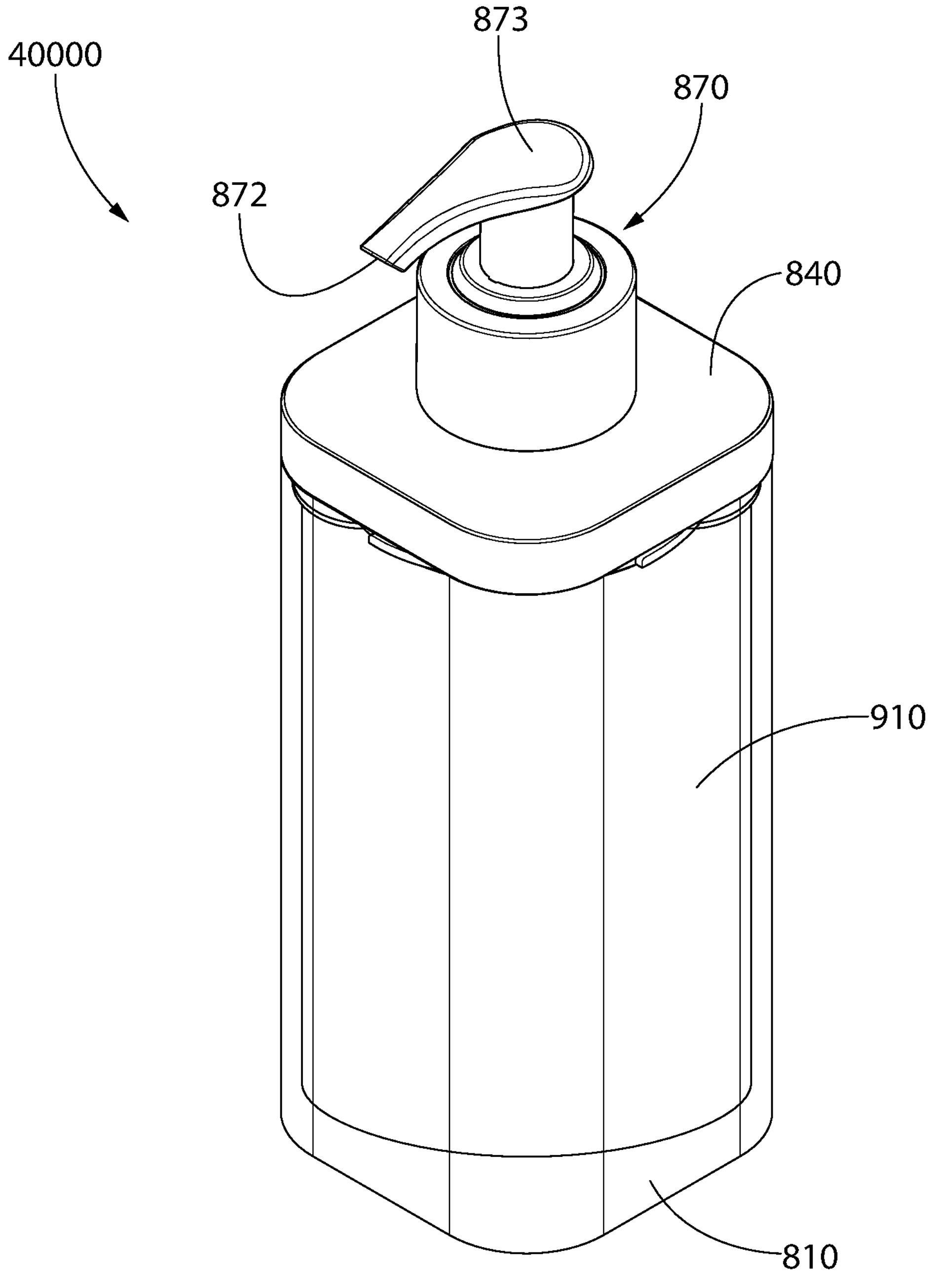
FIG. 23 is a perspective view of a system for dispensing a personal care fluid in an assembled state in accordance with still another embodiment of the present invention.
Figure 24:
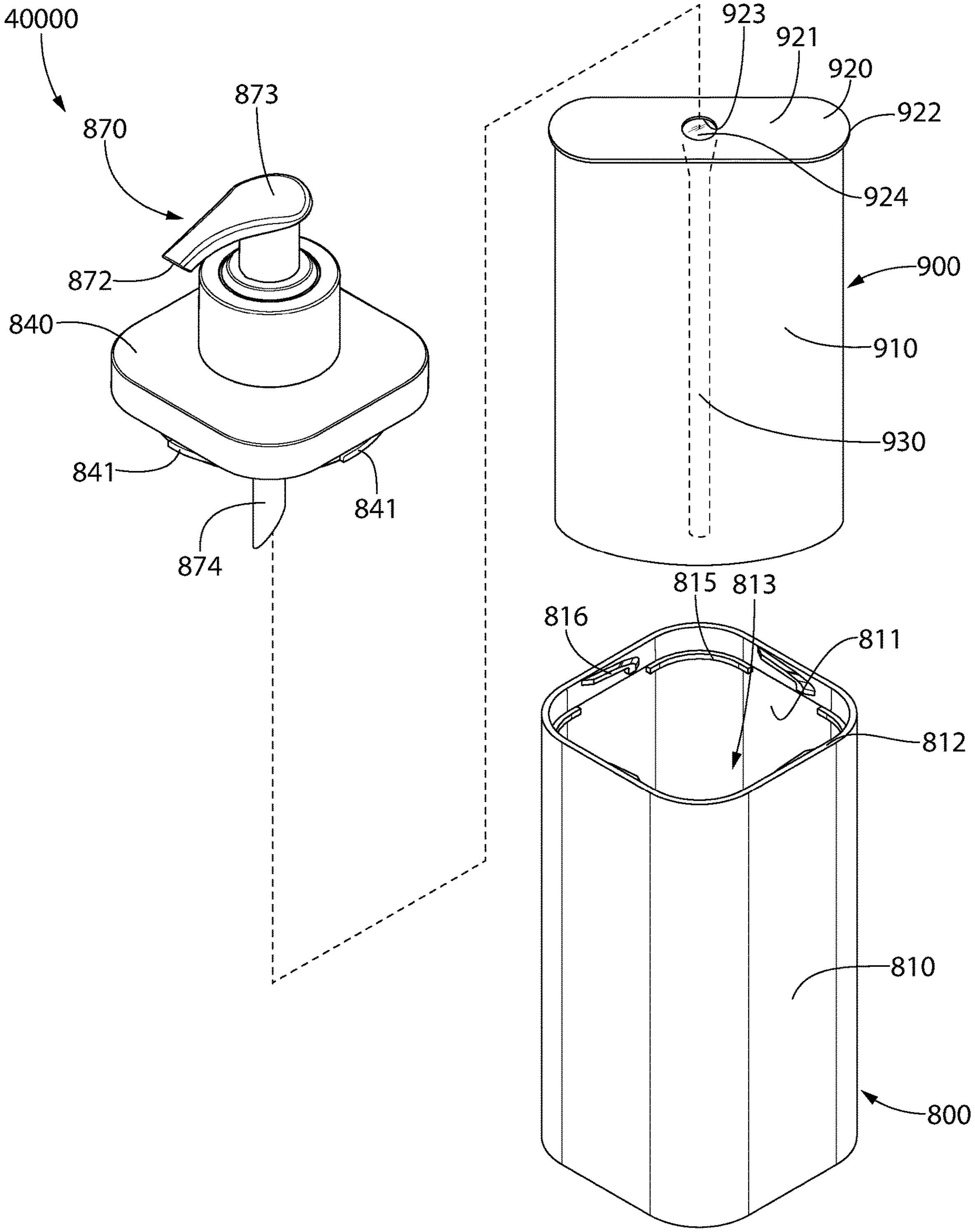
FIG. 24 is a perspective view of the system of FIG. 23 in a disassembled state illustrating a dispenser body, a refill cartridge, and a dispenser lid.

Referring to FIGS. 23 and 24, a system 40000 for dispensing a personal care fluid is illustrated in accordance with another embodiment of the present invention. The system comprises a dispenser 800 and a refill cartridge 900. The dispenser 800 comprises a dispenser body 810 comprising an inner surface 811 that defines a refill cavity 813 having a top end 812, a dispenser lid 840 detachably coupled to the dispenser body 810, and a pump sub-system 870 mounted to the dispenser lid 840. The pump sub-system 870 comprises a first dip tube 871, a dispensing orifice 872, and an actuator or pump 873.

The dispenser body 810 comprises a plurality of protuberances 815 protruding from the inner surface 811 and a plurality of coupling elements 816 protruding from the inner surface 811. The protuberances 815 are configured to support the refill cartridge 900 within the refill cavity 813 and the coupling elements 816 are configured to mate with coupling elements 841 of the dispenser lid 840 to facilitate coupling of the dispenser lid 840 to the dispenser body 810. In the exemplified embodiment, the dispenser lid 840 may be coupled to the dispenser body 810 via rotation of the dispenser lid 840 relative to the dispenser body 810 to mate the coupling elements 816, 841. Of course, other techniques for coupling the dispenser lid 840 to the dispenser body 810 are also possible. The dispenser body 810 may be open in both its top and bottom ends, or it may only be open at the top end 812 and closed at the bottom end.

Figure 26:
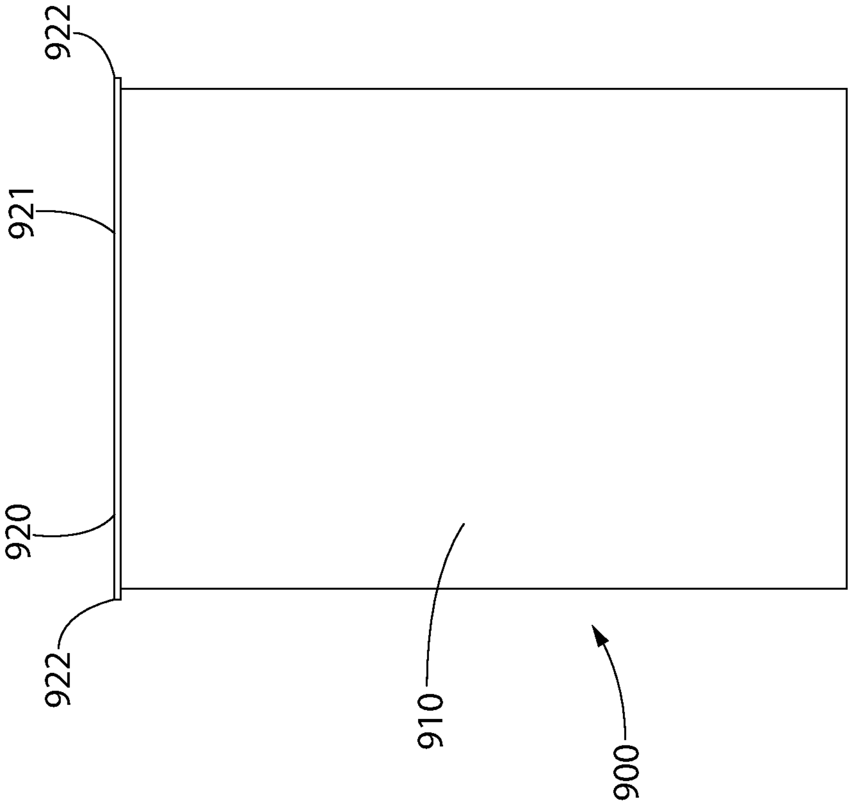
FIG. 26 is a front view of the refill cartridge of FIG. 25.
Figure 25:
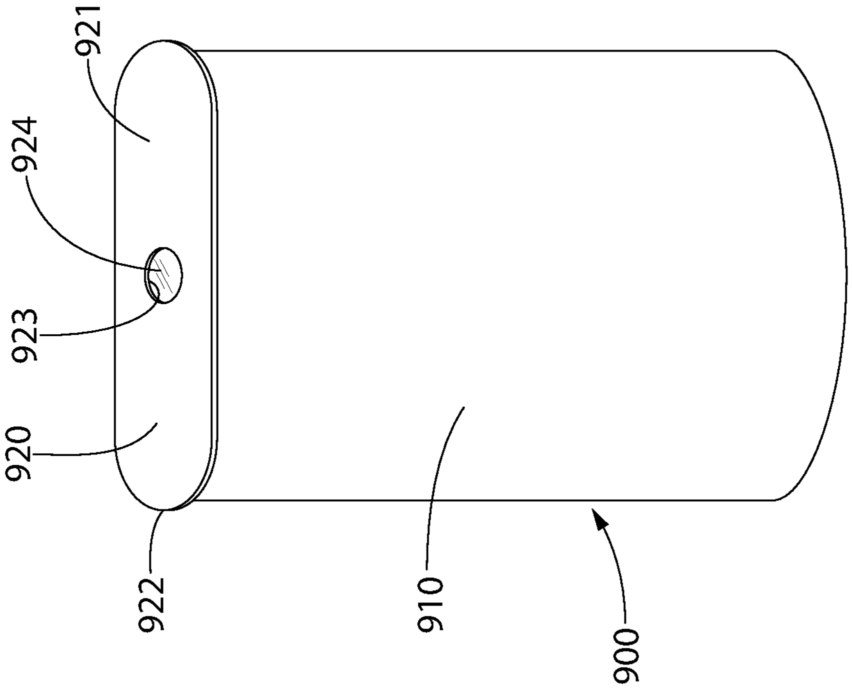
FIG. 25 is a perspective view of the refill cartridge of FIG. 24.

Referring to FIGS. 24-26, the refill cartridge 900 will be further described. The refill cartridge 900 comprises a cartridge body 910 and a cartridge lid 920 coupled to the cartridge body 910. In the exemplified embodiment, the cartridge lid 920 is fixedly coupled to the cartridge body 910 so that no relative movement between the cartridge lid 920 and the cartridge body 910 is possible. Of course, in alternative embodiments the cartridge lid 920 may be movably or detachably coupled to the cartridge body 910.

The cartridge body 910 comprises a fluid cavity that contains a store of a personal care fluid (not illustrated). In the exemplified embodiment, the cartridge body 910 is a pouch formed of a flexible or resilient material such that when the cartridge body 910 is squeezed and there is an opening providing access into the fluid cavity, the personal care fluid is dispensed from the fluid cavity. The cartridge lid 920 comprises a lid portion 921 that covers the top end of the cartridge body 910 and a flange portion 922 that protrudes radially from the cartridge body 910. The flange portion 922 may protrude from the cartridge body 910 around an entire circumference of the cartridge body 910 or in select locations. The lid portion 921 of the cartridge lid 920 comprises an opening 923 therein. In the exemplified embodiment, the opening 923 is covered by a puncturable film 924. In other embodiments, the opening 923 may be covered by a detachable or removable plug, lid, cover, or the like.

Figure 27:
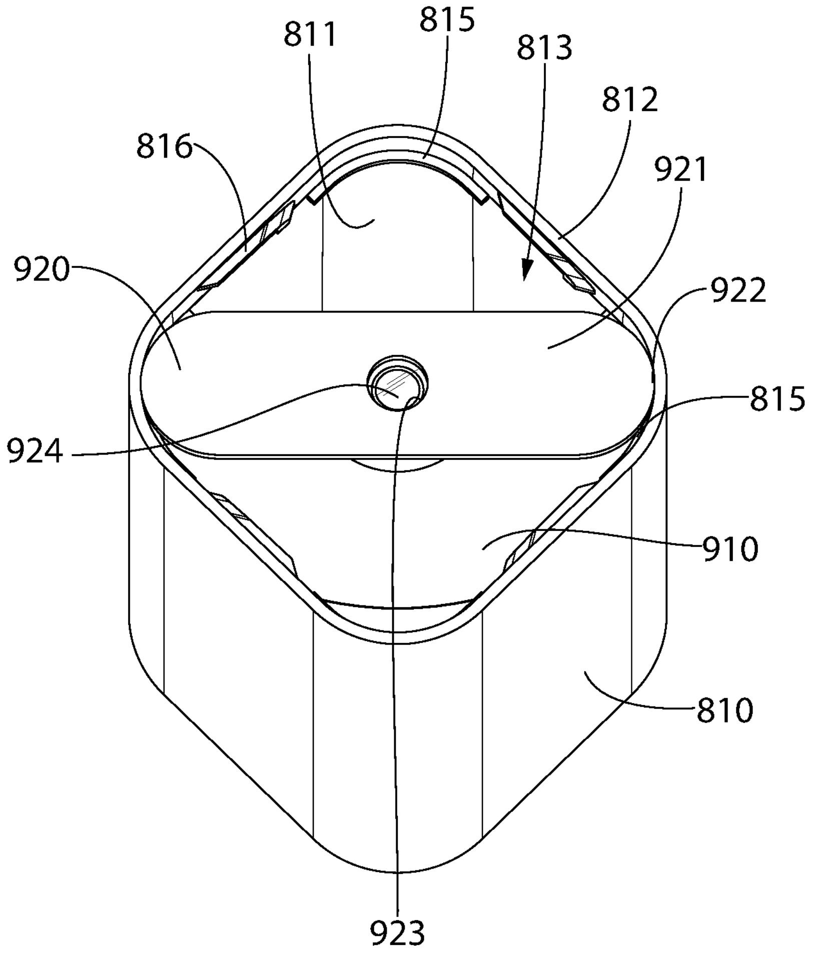
FIG. 27 is a top perspective view illustrating the refill cartridge located within a refill cavity of the dispenser body.

Referring to FIGS. 24 and 27, to assemble the system 10, the refill cartridge 900 is placed within the refill cavity 813 of the dispenser body 810 until the flange portion 922 of the cartridge lid 920 rests atop of two opposing ones of the plurality of protuberances 815 of the dispenser body 810. As a result, the refill cartridge 900 is supported within the refill cavity 813 of the dispenser body 810. Specifically, the refill cartridge 900 is suspended within the refill cavity 813 due to the contact between the protuberances 815 of the dispenser body 810 and the flange portion 922 of the cartridge lid 920 of the refill cartridge 900.

Next, the dispenser lid 840 may be coupled to the dispenser body 810 to close the open top end 812 of the dispenser body 810. To do this, the lid 840 is placed over the open top end 812 of the dispenser body 810 until the coupling elements 841 of the lid 840 contact the coupling elements 815 of the dispenser body 810. Once this contact occurs, the dispenser lid 840 is rotated relative to the dispenser body 810, which causes the coupling elements 841 of the dispenser lid 840 and the coupling elements 816 of the dispenser body 810 to interact with one another in such a manner that the dispenser lid 840 cannot be axially separated from the dispenser body 810 without first rotating the dispenser lid 840 in the opposite direction relative to the dispenser body 810. These steps will assemble the system 40000 in the manner illustrated in FIG. 23.

Referring to FIG. 24, during the coupling of the dispenser lid 840 to the dispenser body 810, the dip tube 871 of the pump sub-assembly 870 (which is pre-mounted onto the dispenser lid 840 as shown in FIG. 24) will contact the puncturable film 924 that covers the opening 923 in the cartridge lid 920. The dispenser lid 840 is pressed downwardly until the dip tube 871 punctures the puncturable film 924 so that the dip tube 871 enters into the fluid cavity of the cartridge body 910. In some embodiments, the refill cartridge 900 may include its own dip tube 930 (illustrated in dotted lines to indicate that it is located within the fluid cavity of the cartridge body 910) that is either integral with the cartridge body 910, integral with the cartridge lid 920, or a separate component that is coupled to the cartridge body 910 and/or cartridge lid 920 and located within the fluid cavity of the cartridge body 910. In such embodiments, once the dip tube 871 punctures the puncturable film 924, the dip tube 871 mates with the dip tube 930 of the refill cartridge 900. Thus, when the personal care fluid is squeezed or pumped from the fluid cavity, it will pass through the dip tube 930 and the dip tube 871 before being dispensed through the dispensing orifice 872.

Figure 28:
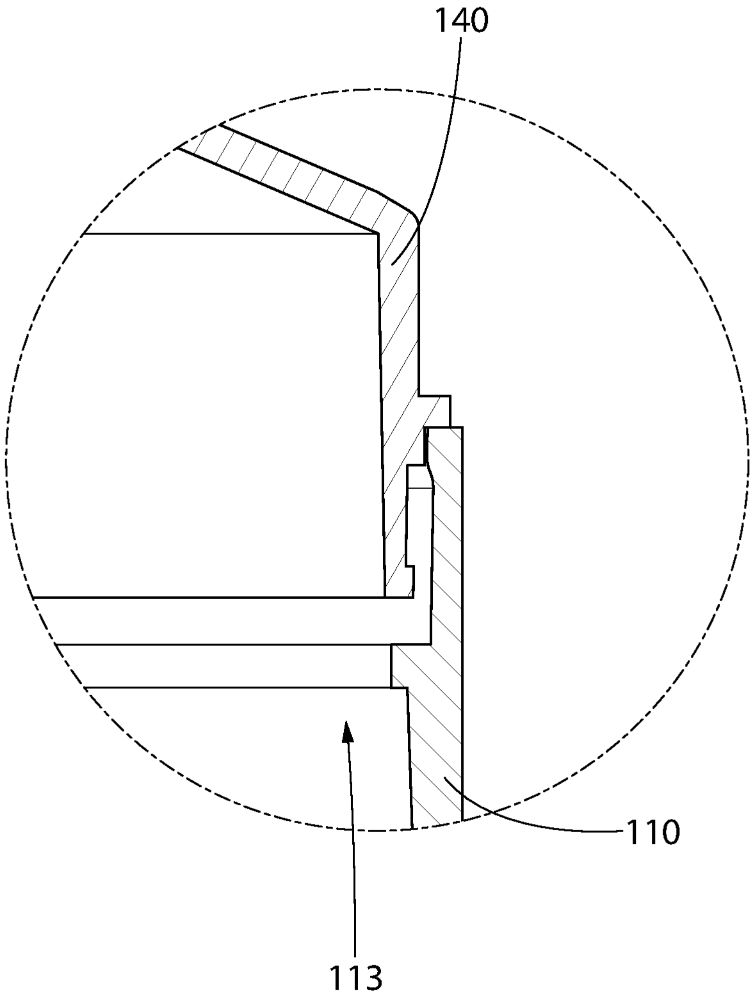
FIG. 28 is a partial cross-sectional view taken along line XXVIII-XXVIII of FIG. 1.
Figure 29:
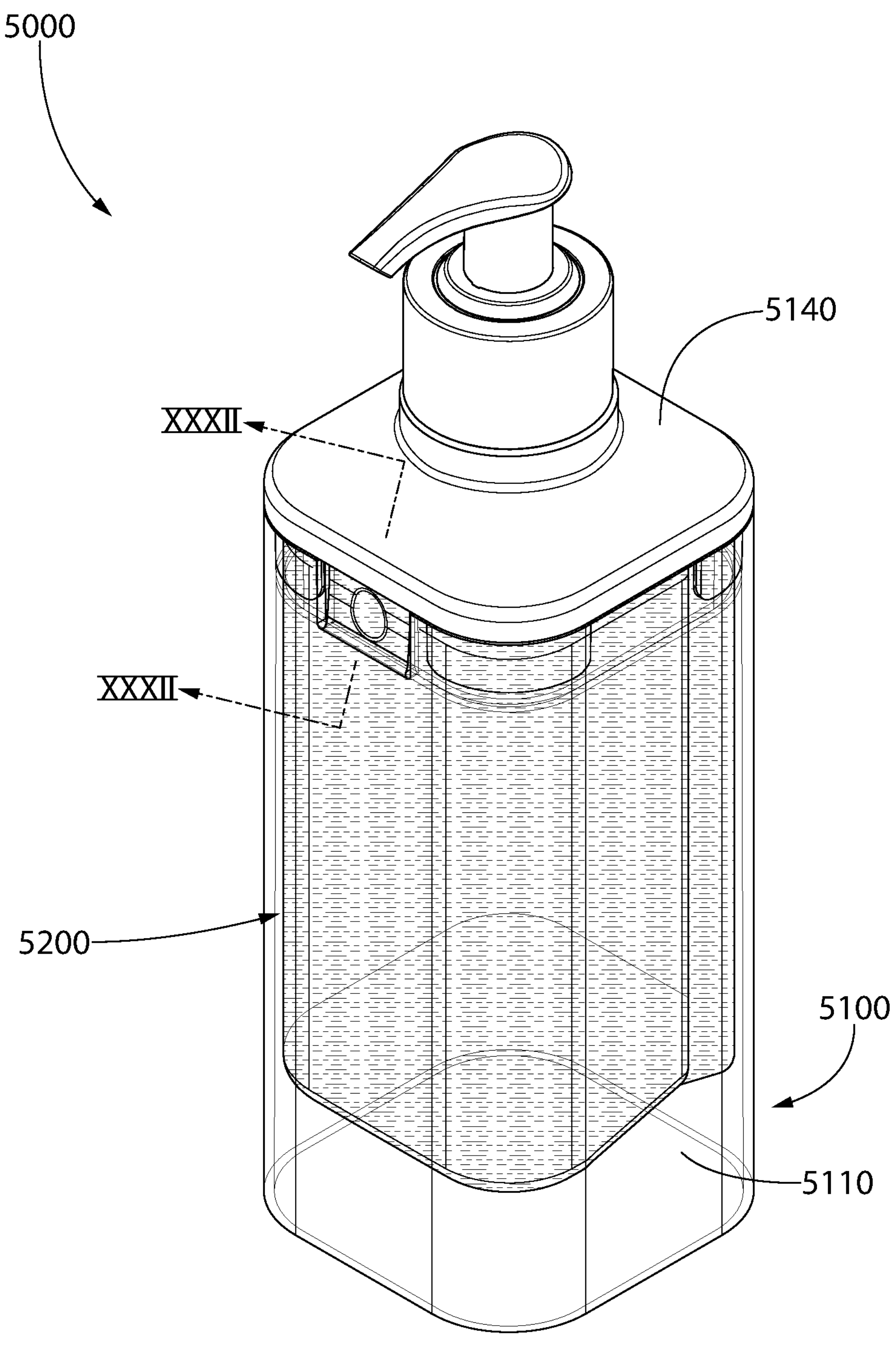
FIG. 29 is a perspective view of a system for dispensing a personal care fluid in accordance with a further another embodiment of the present invention.

Referring to FIG. 29, a partial cross-sectional view taken along the interface of the dispenser lid 140 and the dispenser body 110 is illustrated to describe the manner in which the dispenser lid 140 is coupled to the dispenser body 110. In the system 10, the dispenser lid 140 is coupled to the dispenser body 110 via a friction fit-type engagement. This means that the dispenser lid 140 and the dispenser body 110 are coupled or held together by friction that occurs due to the dispenser lid 140 being in direct contact with the dispenser body 110. Although FIG. 28 illustrates only a small portion of the dispenser lid 140 and the dispenser body 110 being in frictional contact with one another, a larger surface area of those two components may be in frictional contact in other embodiments. In some embodiments, the greater the surface area of the two components that are in contact the greater the friction therebetween. One of the dispenser lid 140 and the dispenser body 110 may include a gasket formed of a flexible material such as thermoplastic elastomer at the area of the interface between those two components to enhance the coupling between them and to prevent the ingress of water and other liquids into the refill cavity 113.

Referring to FIGS. 29-32, a system 5000 for dispensing personal care fluids is illustrated in accordance with another embodiment of the present invention. The system 5000 comprises a dispenser 5100 and a refill cartridge 5200. The dispenser 5100 comprises a dispenser body 5110 and a dispenser lid 5140 that is detachably coupled to the dispenser body 5110. The dispenser body 5110 comprises an inner surface 5111 that defines a refill cavity 5113 having an open top end 5112. The refill cartridge 5200 is slidably received within the refill cavity 5113 of the dispenser body 5110. The system 5000 is identical to the system 10 except with regard to the manner in which the dispensing lid 5140 is coupled to the dispenser body 5110. Thus, only the differences between the system 5000 and the system 10 will be described herein, it being understood that for all similar features between the systems 10, 5000 the description of the system 10 provided above is applicable.

Figure 30:
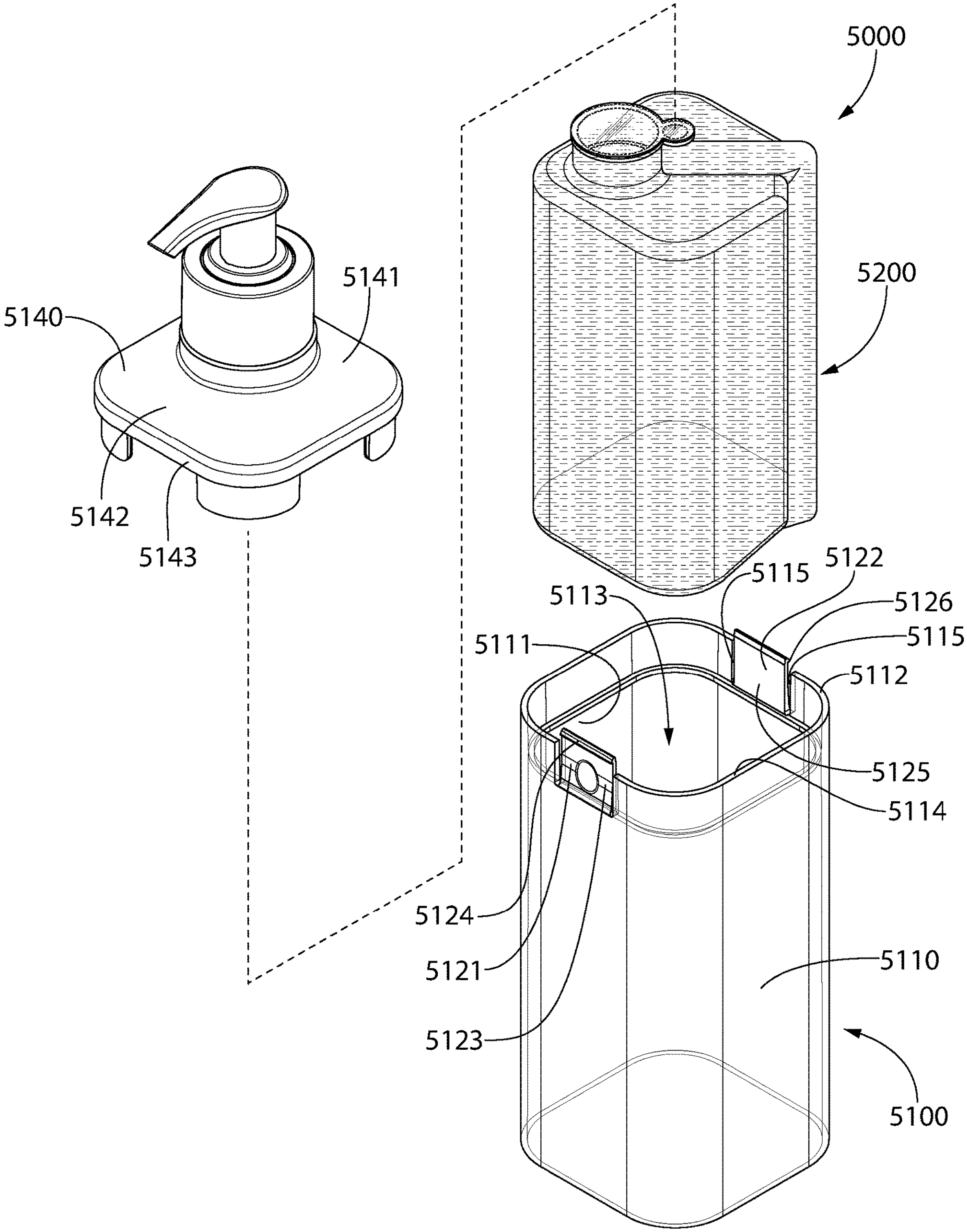
FIG. 30 is a disassembled view of the system of FIG. 29.
Figure 32:
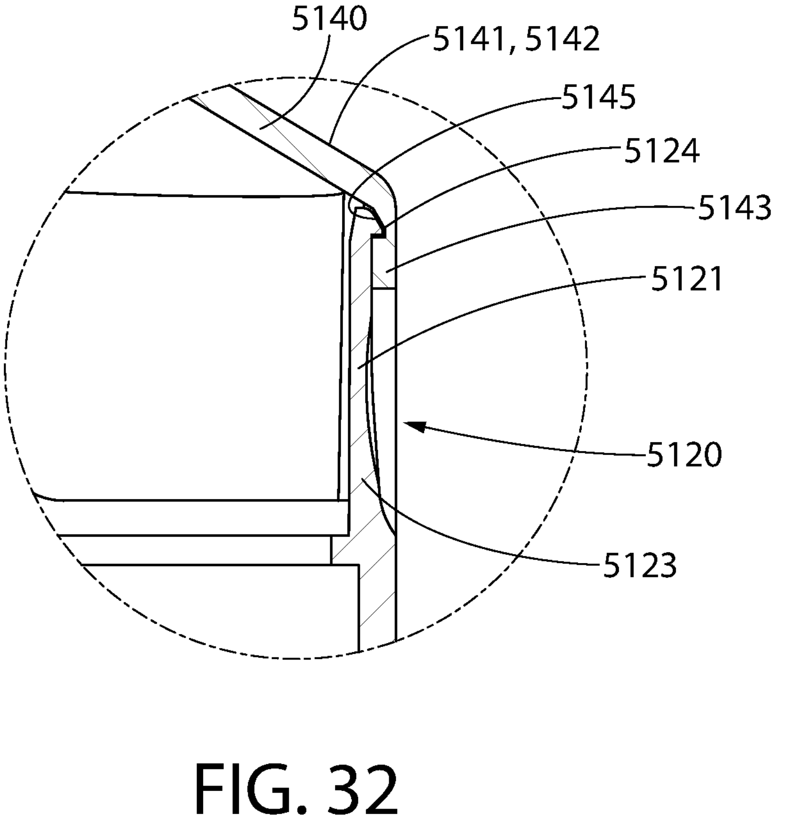
FIG. 32 is a partial cross-sectional view taken along line XXXII-XXXII of FIG. 29.

Referring to FIGS. 30 and 32, the dispenser body 5110 comprises a top section 5120 having a first resilient portion 5121 and a second resilient portion 5122. Each of the first and second resilient portions 5121, 5122 is configured to pivot about an axis inwardly towards the refill cavity 5113 and outwardly away from the refill cavity 5113. The first and second resilient portions 5121, 5122 are formed by slots 5115 that are formed into the top sections 5120 of the dispenser body 5110 and extend from a top edge 5114 of the dispenser body 5110 in a downwardly vertical direction. The first and second resilient portions 5121, 5122 are formed by the portion of the top section 5120 that is located between pairs of the slots 5115.

The first resilient portion 5121 comprises a first vertical wall 5123 and a first latch 5124 and the second resilient portion 5122 comprises a second vertical wall 5125 and a second latch 5126. The first latch 5124 is located at a distal end of the first vertical wall 5123 and extends from the first vertical wall 5123 in a direction away from the refill cavity 5113. The second latch 5126 is located at a distal end of the second vertical wall 5125 and extends from the second vertical wall 5125 in a direction away from the refill cavity 5113.

Figure 31:
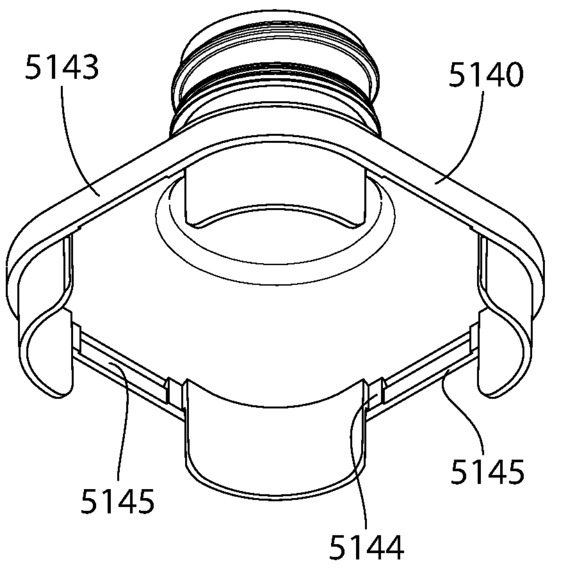
FIG. 31 is a bottom perspective view of a dispenser lid of the system of FIG. 29.

Referring to FIG. 31, the dispenser lid 5140 comprises a cover member 5141 having a top portion 5142 and a flange portion 5143 extending downwardly from the top portion 5142. The flange portion 5143 has an inner surface 5144 having a plurality of recesses 5145 formed therein. The recesses 5145 are configured to receive one of the first and second latches 5124, 5125 of the dispenser body 5110 to couple the dispenser lid 5140 to the dispenser body 5110.

Specifically, referring to FIGS. 30 and 32 concurrently, coupling of the dispenser lid 5140 to the dispenser body 5110 will be described. First, the refill cartridge 5200 is placed into the refill cavity 5113 of the dispenser body 5110 as described above with regard to the earlier described embodiments. Next, the dispenser lid 5140 is coupled to the dispenser body 5110. This is achieved by moving the dispenser lid 5140 axially towards the dispenser body 5110. As the dispenser lid 5140 gets near the dispenser body 5110, the flange portion 5143 of the dispenser lid 5140 contacts the first and second latches 5124, 5126, which causes the first and second resilient portions 5121, 5122 to flex or pivot inwardly towards the refill cavity 5113. The dispenser lid 5140 is continued to be moved axially towards the dispenser body 5110 until the first and second latches 5124, 5126 become aligned with one of the recesses 5145 of the dispenser lid 5140. At such time, the first and second resilient portions 5121, 5122 will bias back into their original position by flexing or pivoting outwardly away from the refill cavity 5113 until the first and second latches 5124, 5126 nest within one of the recesses 5145 of the dispenser lid 5140.

As a result of the above, the dispenser lid 5140 becomes attached to the dispenser body 5110. To detach the dispenser lid 5140 from the dispenser body 5110, a user must press the first and second resilient portions 5121, 5122 inwardly towards the refill cavity 5113 to disengage the first and second latches 5124, 5126 from the respective recesses 5145. Thus, FIGS. 29-32 illustrate another manner in which the dispenser lid 5140 may be coupled to the dispenser body 5110. Of course, further alternative coupling mechanisms may be used in other embodiments.

Figure 33:
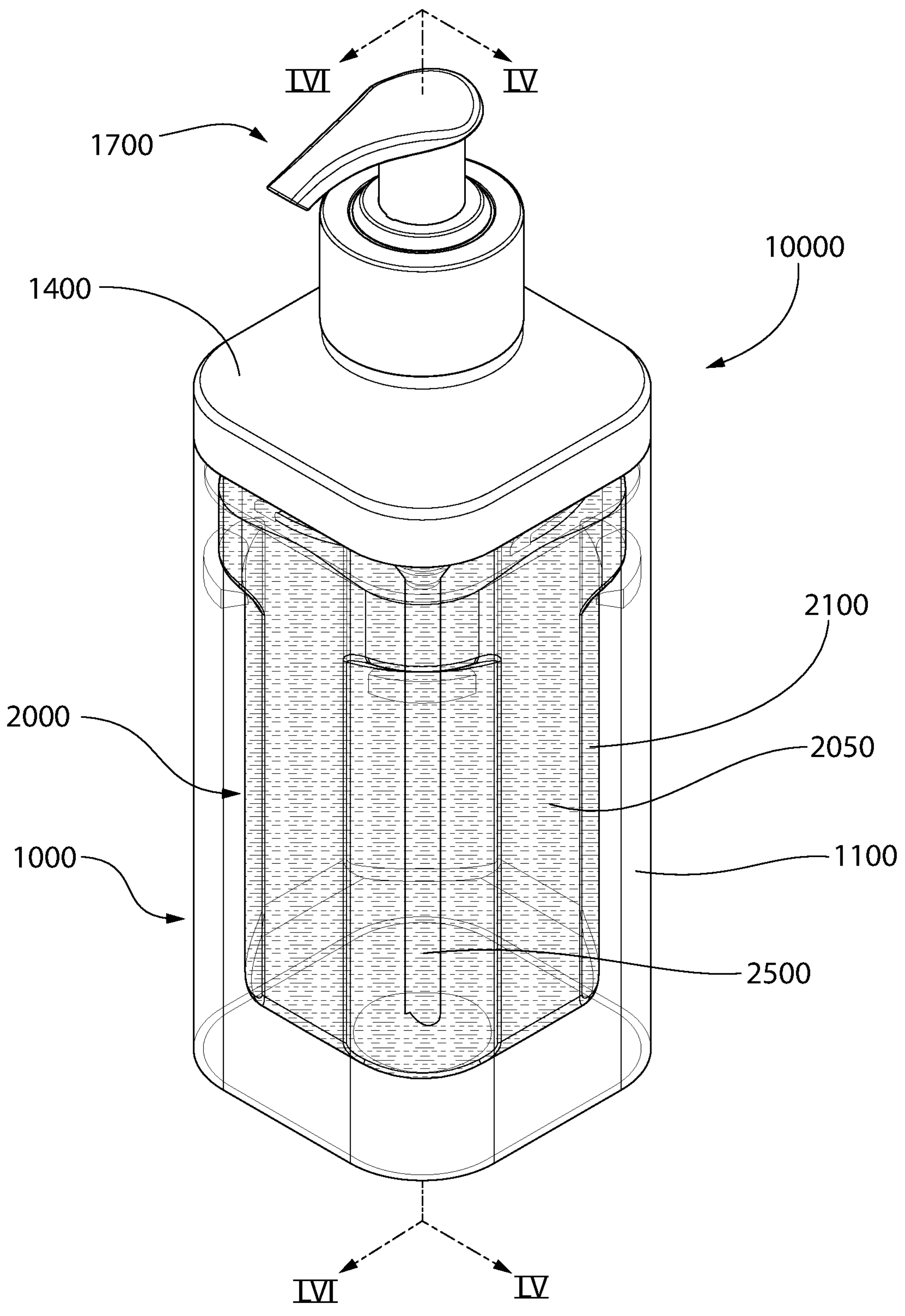
FIG. 33 is a perspective view of a system for dispensing a personal care fluid in an assembled state in accordance with an embodiment of the present invention.
Figure 34:
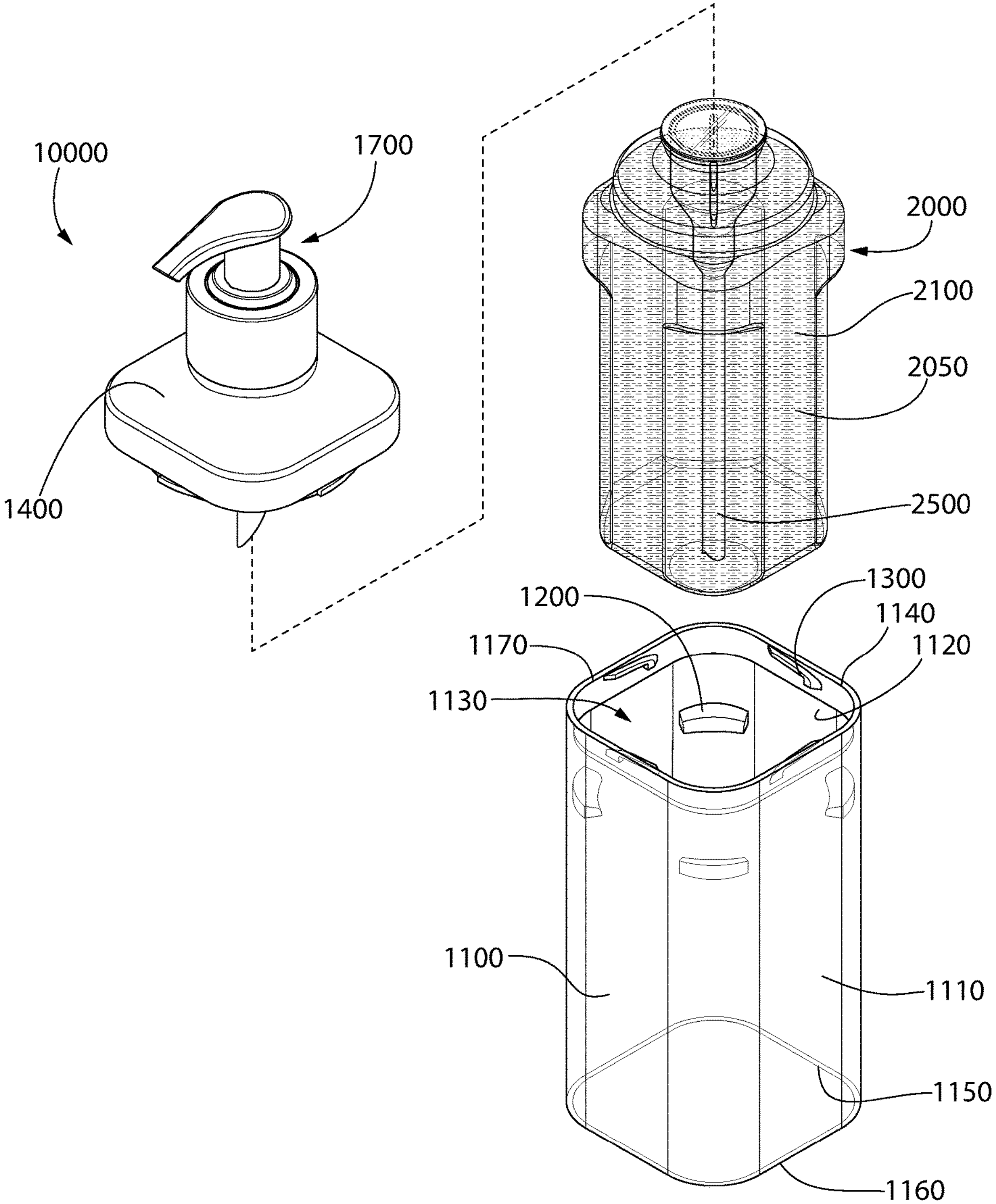
FIG. 34 is a perspective view of the system of FIG. 33 in an disassembled state with a dispenser body, a refill cartridge, and a dispenser lid/pump sub-system detached from one another.
Figure 35:
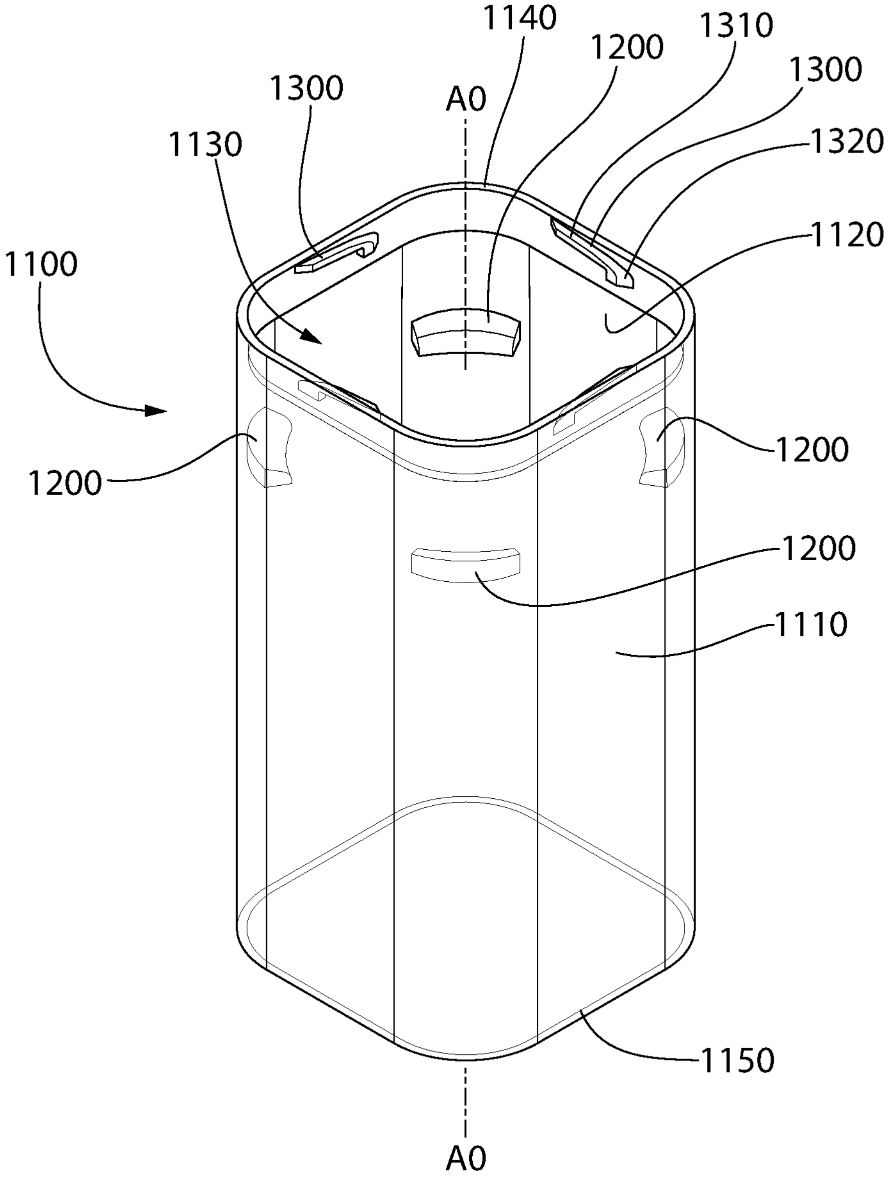
FIG. 35 is a perspective view of the dispenser body of FIG. 34.
Figure 36:
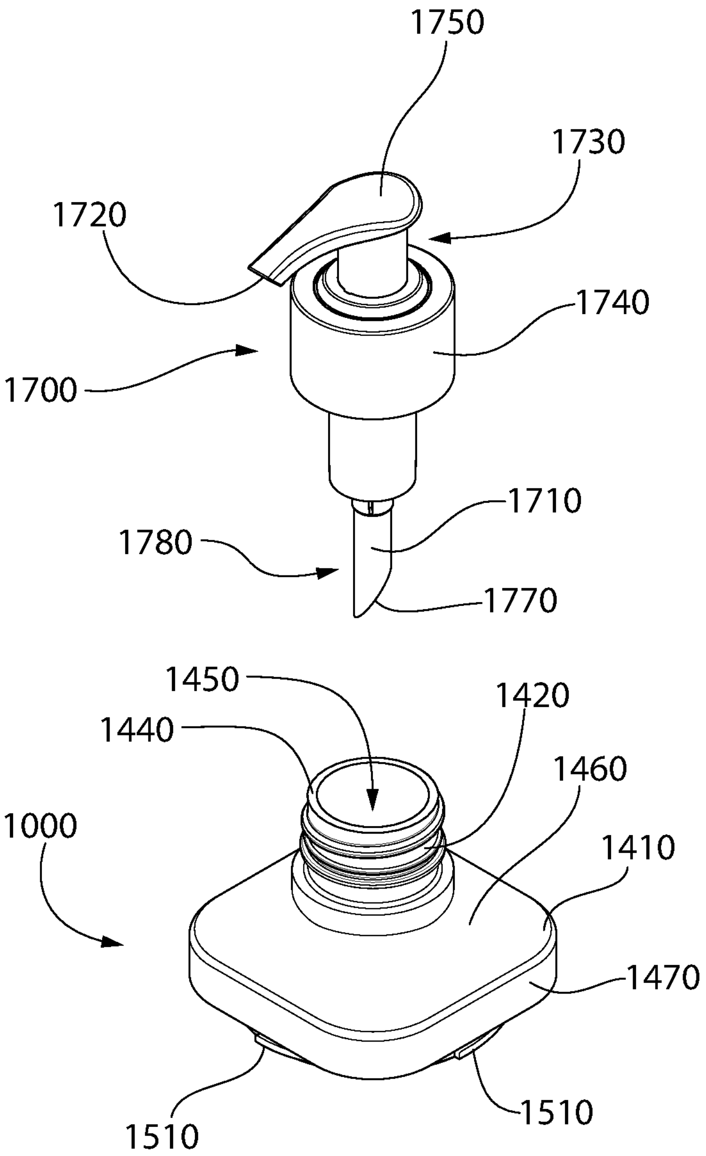
FIG. 36 is a perspective view of the dispenser lid and pump sub-system of FIG. 33 in a disassembled state.
Figure 37:
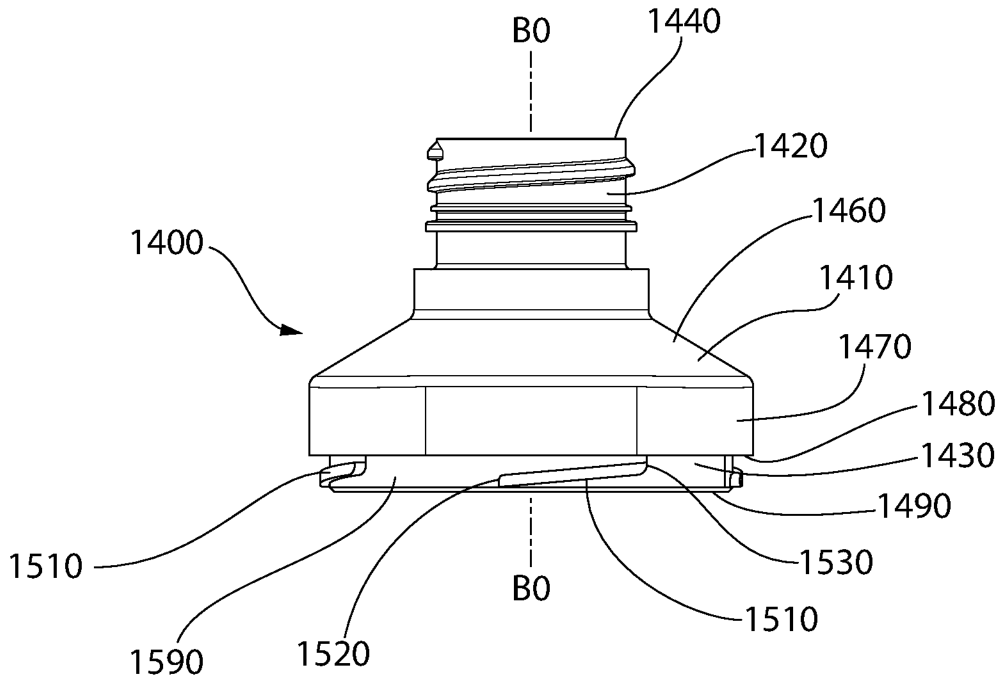
FIG. 37 is a front view of the dispenser lid of FIG. 36.
Figure 38:
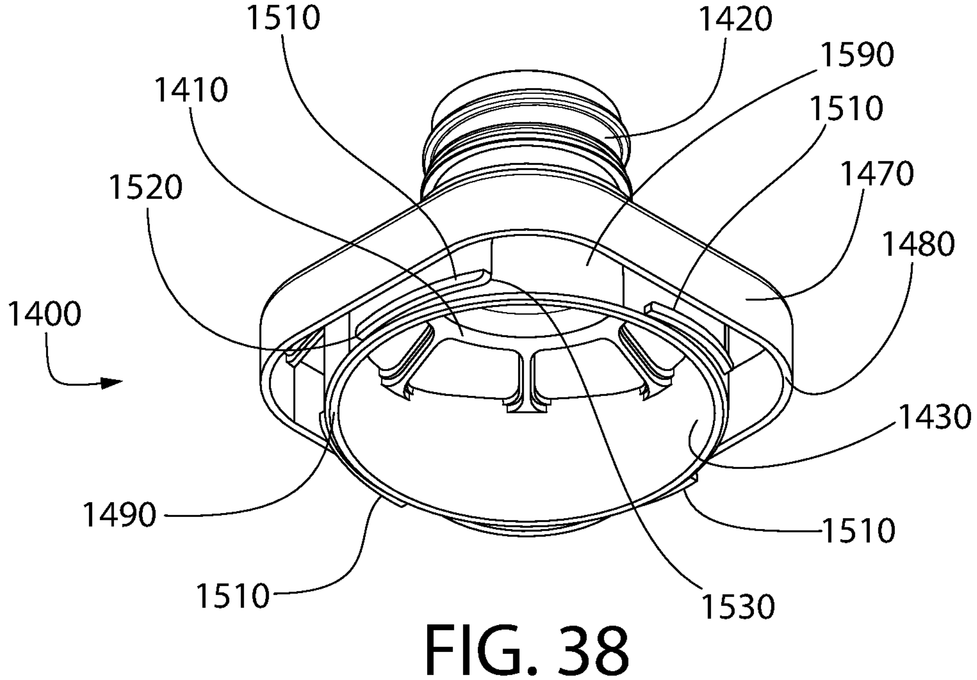
FIG. 38 is a perspective view of the dispenser lid of FIG. 36.
Figure 55:
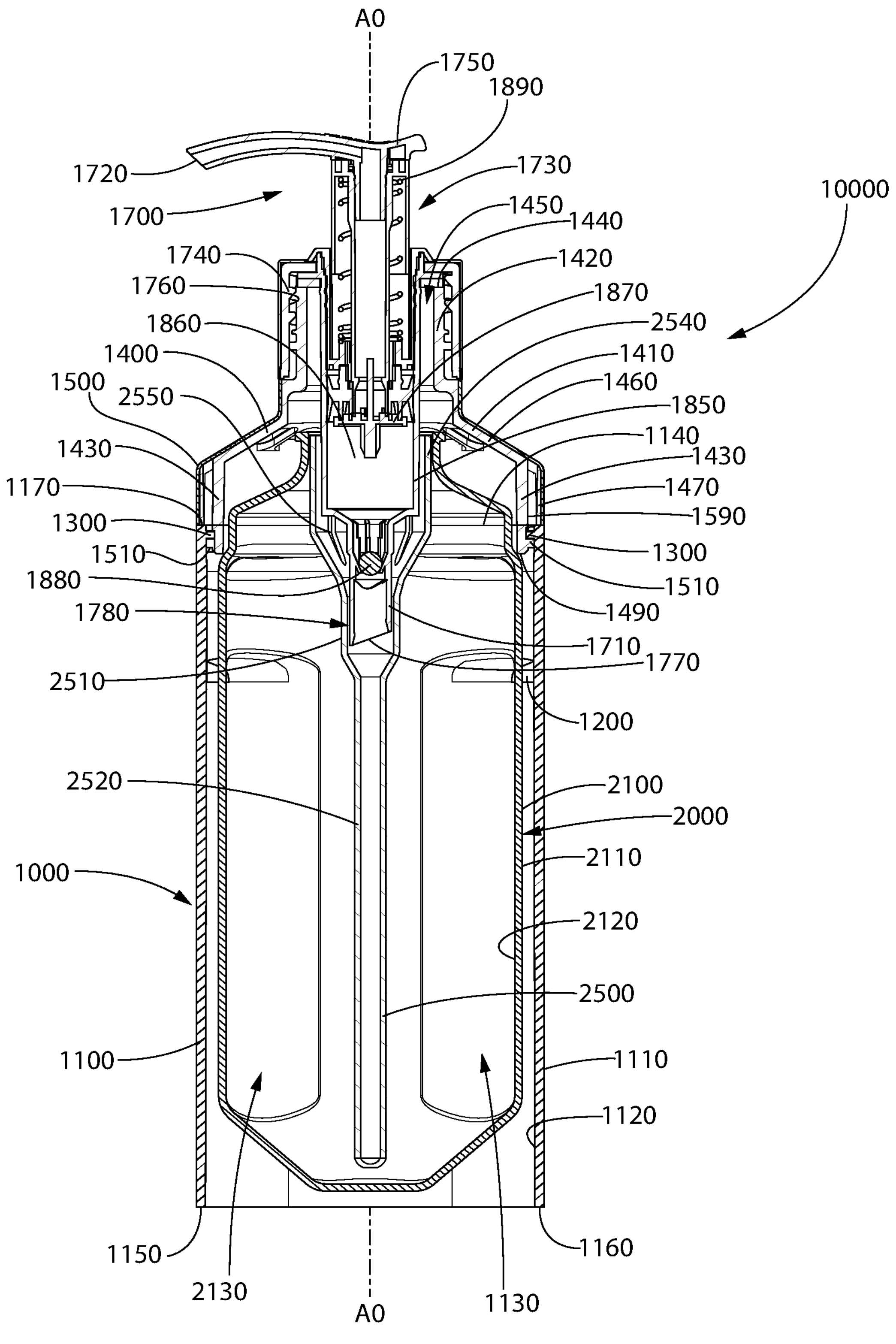
FIG. 55 is a cross-sectional view taken along line LV-LV of FIG. 33.

Referring to FIGS. 33, 34, and 55 concurrently, a system for dispensing a personal care fluid 10000 is illustrated in an assembled state (FIGS. 33 and 55) and a disassembled state (FIG. 34). The system 10000 comprises several parts or components that, when assembled, operate as a unit to dispense a personal care fluid for use by a user in a desired manner. More specifically, the system 10000 comprises a dispenser 1000 and a refill cartridge 2000. The dispenser 1000 comprises a dispenser body 1100 having a refill cavity 1130, a dispenser lid 1400, and a pump sub-system (or pump assembly) 1700. The pump sub-system 1700 comprises a first dip tube 1710, a dispensing orifice 1720, and a pump 1730. The refill cartridge 2000 comprises a cartridge body 2100 containing a store of a personal care fluid 2050 and a second dip tube 2500. When the system 10000 is fully assembled, the first and second dip tubes 1710, 2500 operably mate with one another to enable the system 10000 to dispense the personal care fluid 2050 from the dispensing orifice 1720. The personal care fluid may be hand soap, a hair application product such as shampoo, conditioner, mousse, or gel, lotion, sanitizer, dentifrice or other oral fluids used for treatment of the oral cavity, or any other fluid that a user may desire to dispense for personal use. In one embodiment, the personal care fluid may be a liquid soap without limitation to the specific type of soap or its end use.

As shown in FIG. 34, the refill cartridge 2000 is configured for slidable insertion into and removal from the refill cavity 1130 of the dispenser body 1000. The dispenser lid 1400 with the pump sub-system 1700 mounted thereon can then be placed atop of the dispenser body 1000 and the refill cartridge 2000. As described herein, in some embodiments the dispenser lid 1400 has features that mate with features of the dispenser body 1100 to couple the dispenser lid 1400 to the dispenser body 1100. The refill cartridge 2000 remains located within a cavity of the dispenser body 1100 and may be suspended within such cavity.

Thus, the dispenser body 1100 forms an outer container of the system 10000 and the refill cartridge 2000 forms an inner container of the system 10000. The refill cartridge 2000 can be replaced when the personal care fluid 2050 contained therein is depleted or when it is desired to swap the personal care fluid 2050 out for a different personal care fluid. For example, if a user no longer enjoys the scent of a particular soap, the user can remove the refill cartridge 2000 that is currently located in the dispenser body 1000 and replace it with a different refill cartridge having a different personal care fluid therein. The dispenser 1000 (including the dispenser body 1100, the dispenser lid 1400, and the pump sub-system 1700) is typically reused with multiple refill cartridges 2000. As will be discussed in greater detail below, the refill cartridge 2000 and/or the dispenser body 1100 is configured so that the refill cartridge 2000 is non-rotatable relative to the dispenser body 1100 when the refill cartridge 2000 is positioned within the refill cavity 1130 of the dispenser body 1100.

Referring to FIGS. 34, 35, 55, and 56, the dispenser body 1100 will be further described. In the exemplified embodiment, the dispenser body 1100 is formed of a transparent material. Of course, this is not required in all embodiments and the dispenser body 1100 may be opaque or translucent in other embodiments. In still other embodiments, a label may be provided on the dispenser body 1100 to provide product information to consumers, including details related to the type of product stored in the dispenser body 1100 and the company that manufactures the product. The label may also have an ornamental aspect to it, such as by comprising flowers, snowflakes, or some other visual depiction that is relevant to the scent of the product being dispensed by the system 10000.

The dispenser body 1100 comprises an outer surface 1110 and an inner surface 1120 opposite the outer surface 1110. The inner surface 1120 of the dispenser body 1100 defines a refill cavity 1130 that is sized and configured for receiving the refill cartridge 2000 therein as described in more detail herein below. In the exemplified embodiment, the refill cavity 1130 has an open top end 1140 located at a top edge 1170 of the dispenser body 1100 and an open bottom end 1150 located at a bottom edge 1160 of the dispenser body 1100. In the exemplified embodiment, the dispenser body 1100 has a square or rectangular transverse cross-sectional shape such that the top edge 1170 of the dispenser body 1100 is square or rectangular.

The dispenser body 1100 extends along a longitudinal axis A0-A0 from the top edge 1170 to the bottom edge 1160. Thus, the dispenser body 1100 of the exemplified embodiment is a tube-like container that is open on both opposing ends thereof. The refill cavity 1130 has a constant transverse cross-sectional area along its length and the transverse cross-sectional area is rectangular or square in the exemplified embodiment (although this is not required in all embodiments and variations are certainly possible). Of course, in other embodiments only the top end 1140 may be open and the bottom end 1150 may be closed. However, forming the dispenser body 1100 with the open top and bottom ends 1140, 1150 eases manufacturing of the dispenser body 1100 via an injection molding operation/process. Specifically, because the dispenser body 1100 has various functional protuberances extending from its inner surface, keeping it open on both opposing ends thereof facilitates its manufacture. Generally, the refill cartridge 2000 is inserted into (and removed from) the refill cavity 1130 via the open top end 1140, but it is certainly possible that the refill cartridge 2000 may alternatively be inserted into (and removed from) the refill cavity 1130 via the open bottom end 1150.

The dispenser body 1100 comprises a plurality of protuberances 1200 extending inward from the inner surface 1120 of the dispenser body 1100 into the refill cavity 1130 and towards the longitudinal axis A0-A0. In the exemplified embodiment, the dispenser body 1100 comprises four of the protuberances 1200 equidistantly spaced apart about the inner surface 1120 of the dispenser body 1100. Of course, more or less than four of the protuberances 1200 may be used in other embodiments. In fact, the dispenser body 1100 may include a single protuberance that is identical in size and shape to the protuberances 1200, the dispenser body 1100 may include a single protuberance that extends circumferentially around an entirety of the inner surface 1120 of the dispenser body 1100, or the dispenser body 1100 may include any other number of protuberances as may be desired to achieve the functions described herein below.

In the exemplified embodiment, each of the protuberances 1200 has a top surface that is oblique to the longitudinal axis A0-A0 and a bottom surface that is perpendicular to the longitudinal axis A0-A0. However, the top and bottom surfaces of the protuberances 1200 may be oriented at other angles in other embodiments. The protuberances 1200 protrude from the inner surface 1120 of the dispenser body 1100 a sufficient length to form a ledge that a portion of the cartridge body 2100 of the refill cartridge 2000 will rest on the top surfaces of the protuberances 1200 when positioned in the refill cavity 1130. As will be better understood from the description below, the protuberances 1200 interact with the cartridge body 2100 of the refill cartridge 2000 to suspend the cartridge body 2100 within the refill cavity 1130 and to prevent rotation of the cartridge body 2100 when it is suspended within the refill cavity 1130. In the exemplified embodiment, the protuberances 1200 are located within an upper half of an axial length of the dispenser body 1100, but they may be positioned at other locations so long as they are configured to interact with the cartridge body 2100 as described herein.

Furthermore, the dispenser body 1100 comprises a plurality of coupling elements 1300 protruding from the inner surface 1120 of the dispenser body 1100 into the refill cavity 1130 and towards the longitudinal axis A0-A0. The coupling elements 1300 are configured to mate with coupling elements on the dispenser lid 1400 to facilitate coupling of the dispenser lid 1400 to the dispenser body 1100. In the exemplified embodiment, the coupling elements 1300 are located adjacent to and just below the open top end 1130 of the dispenser body 1100. In the exemplified embodiment, each of the coupling elements 1300 is axially offset from each of the protuberances 1200, but this is not required in all embodiments.

Each of the coupling elements 1300 comprises a ramped portion 1310 and a locking portion 1320. The ramped portions 1310 are angled slightly downwardly from the open top end 1140 in a direction towards the closed bottom end 1150. As a result, the ramped portion 1310 of the coupling elements 1300 force the dispenser lid 1400 downwardly when the dispenser lid 1400 is being coupled to the dispenser body 1100 as will be described in more detail below with particular reference to FIGS. 50-54. The locking portion 1320 is a tab that extends downwardly from an end of the ramped portion 1310 in a direction towards the bottom end 1150 of the dispenser body 1100. As such, the locking portion 1320 forms a stopper such that once the coupling element on the dispenser lid 1400 engages the locking portion 1320 of the coupling element 1300, the dispenser lid 1400 is prevented from further rotation relative to the dispenser body 1100. This too will be better understood from the description below with particular reference to FIGS. 50-54.

Referring to FIGS. 36-38, 55, and 56, the dispenser lid 1400 and the pump sub-system 1700 will be further described. The dispenser lid 1400 comprises a main body 1410, a neck 1420 extending upwardly from the main body 1410, and a connection hub 1430 extending downwardly from the main body 1410. The main body 1410, the neck 1420, and the connection hub 1430 may be integrally formed as a single unitary structure such as, for example, out of a rigid plastic material formed during an injection molding procedure. In the exemplified embodiment, the dispenser lid 1400 also comprises a separate cap member 1500 that is positioned atop of the main body 1410 to create a desired aesthetic. The cap member 1500 may be coupled to the main body 1410 using an adhesive, or alternatively, using interlocking or otherwise engaging mechanical features. The cap member 1500 may be formed from a metal material to give the dispenser a more expensive appearance. The cap member 1500 may be a metal cladding. Of course, the cap member 1500 may be omitted in some embodiments.

In the exemplified embodiment, the neck 1420 is threaded and terminates in a distal end 1440 having an opening 1450 to facilitate coupling of the pump sub-system 1700 to the dispenser lid 1400. The main body 1410 has a top portion 1460 that slopes downwardly in an angled manner from the neck 1420 and a flange 1470 that extends from the top portion 1460 to a terminal edge 1480. In the exemplified embodiment, the flange 1470 has a square or rectangular shape that matches the shape of the top edge 1170 of the dispenser body 1100, although the invention is not to be so limited in all embodiments. The connection hub 1430 comprises a wall 1590 that extends downwardly from the top portion 1460 of the main body 1410 and that is spaced apart from the flange 1470 such that a gap exists therebetween. The connection hub 1430 is located inward of the flange 1470, and thus the flange 1470 surrounds the connection hub 1430. In the exemplified embodiment, the wall 1590 of the connection hub 1430 is cylindrical. Stated another way, the flange 1470 has a square/rectangular transverse cross-sectional profile and the connection hub 1430 has a circular transverse cross-sectional profile. The connection hub 1430 terminates in a terminal edge 1490 that extends below the terminal edge 1480 of the flange 1470. Thus, when viewed from the front or side, a portion of the wall 1590 of the connection hub 1430 sticks out below the terminal edge 1480 of the flange 1470 (best seen in FIG. 37).

The connection hub 1430 also comprises a plurality of coupling elements 1510 that are configured to engage/mate with the coupling elements 1300 of the dispenser body 1100 to couple the dispenser lid 1400 to the dispenser body 1100. In the exemplified embodiment, the coupling elements 1510 protrude from the wall 1590 of the connection hub 1430. However, the invention is not to be so limited in all embodiments and the configuration of the coupling elements 1510 may be modified to ensure acceptable mating with the coupling elements 1300 of the dispenser body 1100. Thus, it is possible in other embodiments for the coupling elements 1300, 1510 to be comprise engagement features such as screw threads, boss/detent, protrusion/slot, flex tabs, interference-type fit engagement, or the like.

In the exemplified embodiment, the coupling elements 1510 are located on the portion of the wall 1590 of the connection hub 1430 that extends below the terminal edge 1480 of the flange 1470. The coupling elements 1510 are positioned on the connection hub 1430 in a spaced apart manner. In the exemplified embodiment, there are four of the coupling elements 1510 provided on the wall 1590 of the connection hub 1430, but more or less coupling elements 1510 may be used in other embodiments so long as a sufficient number of coupling elements 1510 of the connection hub 1430 and coupling elements 1300 of the dispenser body 1100 are included to facilitate an acceptable coupling of the dispenser lid 1400 to the dispenser body 1100.

Figure 56:
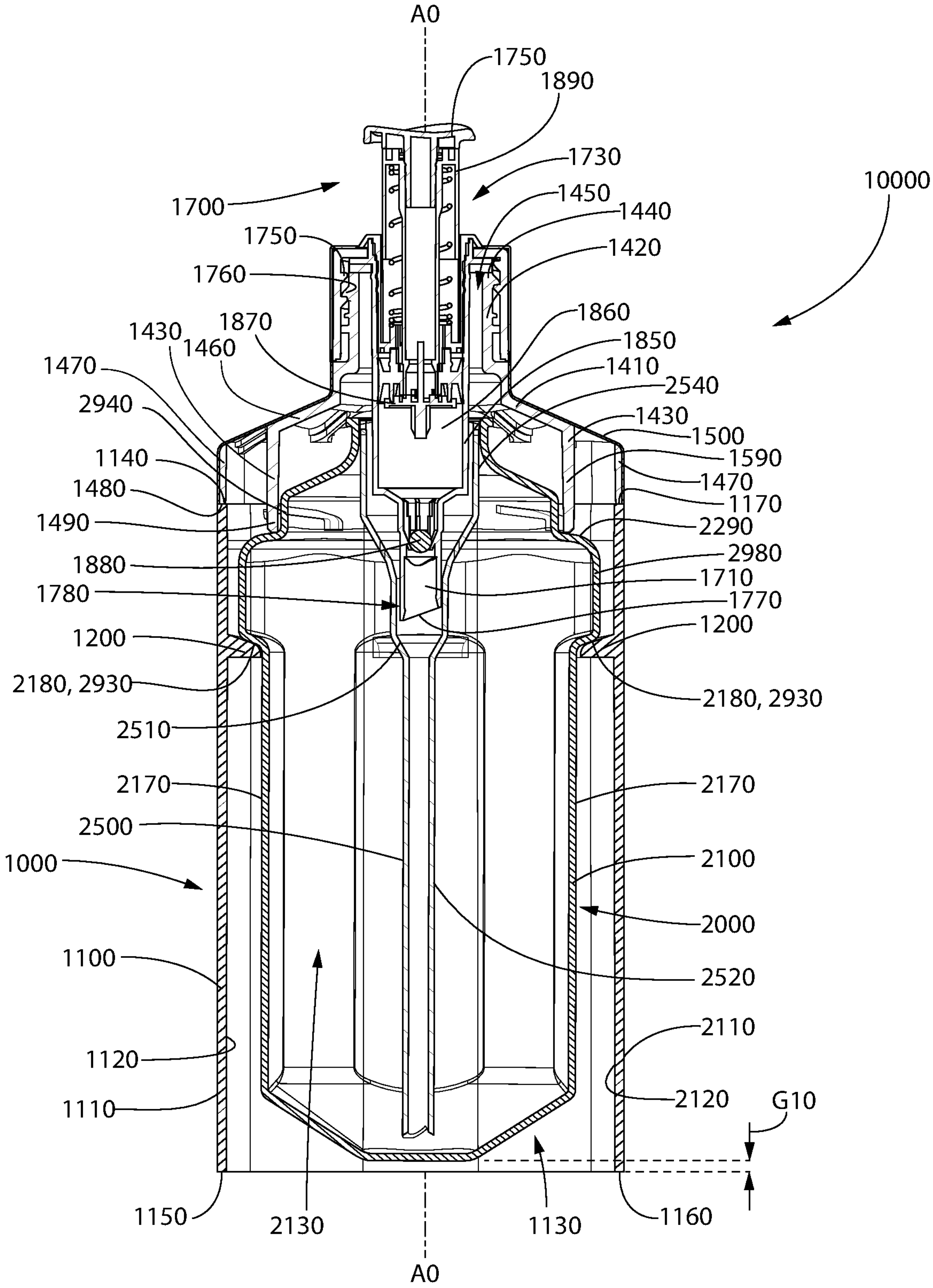
FIG. 56 is a cross-sectional view taken along line LVI-LVI of FIG. 33.

In the exemplified embodiment, each of the coupling elements 1510 is angled obliquely relative to an axis B0-B0 of the dispenser lid 1400. Specifically, the coupling elements 1510 extend from a first end 1520 that is spaced a first distance from the terminal edge 1490 of the connection hub 1430 to a second end 1530 that is spaced a second distance from the terminal edge 1490 of the connection hub 1430, the second distance being greater than the first distance. Stated another way, each of the coupling elements 1510 has a ramped portion extending between the first and second ends 1520, 1530. As a result, as the coupling elements 1510 engage the coupling elements 1300 and the dispenser lid 1400 and the dispenser body 1100 are rotated relative to one another, the dispenser lid 1400 is forced to move axially downwardly until the terminal edge 1480 of the flange 1470 is in contact with the top edge 1160 of the dispenser body 1100, as shown in FIGS. 55 and 56. Although the coupling elements 1300 of the dispenser body 1100 and the coupling elements 1510 of the dispenser lid 1400 are all illustrated as being ramped/inclined in the exemplified embodiment, this is not required in all embodiments and it is possible in alternative embodiments for either the coupling elements 1300 or the coupling elements 1510 to be ramped/inclined.

The dispenser lid 1400 is configured to be alterable between: (1) a first state in which the top end 1140 of the refill cavity 1130 is open so that the refill cartridge 2000 can be slid into the refill cavity 1130 (see FIG. 34); and (2) a second state in which the dispenser lid 1400 is coupled to the dispenser body 1100 to enclose the top end 1140 of the refill cavity 1130 (see FIGS. 33, 55, and 56). In the exemplified embodiment, altering the dispenser lid 1400 from the first state to the second state is achieved by rotating the dispenser lid 1400 relative to the dispenser body 1100 in a first rotational direction until the dispenser lid 1400 can no longer be rotated in the first rotational direction due to engagement between the coupling elements 1510 of the dispenser lid 1400 and the locking portions 1320 of the coupling elements 1300 of the dispenser body 1100. When the dispenser lid 1400 is in the second state, interaction between the coupling elements 1510 of the dispenser lid 1400 and the coupling elements 1300 of the dispenser body 1100 prevent the dispenser lid 1400 from being axially translated relative to the dispenser body 1100 without the dispenser lid 1400 being rotated relative to the dispenser body 1100 in a second rotational direction that is opposite the first rotational direction to disengage the coupling elements 1300, 1510 from each other.

Although both the coupling elements 1300 of the dispenser body 1100 and the coupling elements 1510 of the dispenser lid 1400 have been described above as having ramped portions, in some embodiments the ramped portions of one of the coupling elements 1300, 1510 may be considered a ramped surface and the ramped portions of the other one of the coupling elements 1300, 1510 may be considered a follower surface such that the follower surfaces engage the ramped surfaces as the dispenser lid 1400 is rotated relative to the dispenser body 1100. As the ramped and follower surfaces engage one another during rotation of the dispenser lid 1400 relative to the dispenser body 1100, the dispenser lid 1400 and the dispenser body 1100 are axially drawn together to achieve the second state.

As mentioned briefly above, the pump sub-system 1700 comprises the first dip tube 1710, the dispensing orifice 1720, and the pump 1730. The pump sub-assembly 1700 also comprises a collar 1740 and an actuator 1750. The collar 1740 has a threaded inner surface 1760 that is configured to mate with the threads on the neck 1420 of the dispenser lid 1400 to couple/mount the pump sub-system 1700 to the dispenser lid 1400. In that regard, the collar 1740 has a greater diameter than the neck 1420 to enable the collar 1740 to surround the neck 1420 during coupling. An outer surface of the collar 1740 may be covered with a cap or other coating that matches the cap member 1500 described previously to provide for a seamless aesthetic.

In the exemplified embodiment, the first dip tube 1710 terminates in a distal end 1770 that is angled relative to the axis A0-A0. The first dip tube 1710 has a distal section 1780 that comprises the distal end 1770. In other embodiments, the first dip tube 1710 may taper in a direction towards the distal end 1770 to form a point at the distal end 1770. This enables the first dip tube 1710 to be used to puncture a film or other cover that may be place atop the refill cartridge 2000, as described in more detail below. The first dip tube 1710 may extend further than that which is shown in the exemplified embodiment.

During assembly, the first dip tube 1710 is inserted into and through the opening 1450 in the neck 1420 of the dispenser lid 1400 until the threads of the collar 1740 engage the threads of the neck 1420. At this time, the collar 1740 is rotated relative to the neck 1420 so that the threads mate to couple the pump sub-system 1700 to the dispenser body 1400. The first dip tube 1710 extends entirely through the dispenser lid 1400 so that it can engage features of the refill cartridge 2000 as described more fully below. Once assembled, the personal care fluid can be pumped from the refill cartridge 2000 to the orifice 1720 in the pump sub-system for dispensing into a user's hand or the like by pressing downwardly on the actuator 1750 in the direction of the axis A0-A0 and then releasing the actuator 1750. This action, which is the conventional operation for dispensing containers of this type, pumps the personal care fluid to the outlet 1720, as described in greater detail below.

Figure 39:
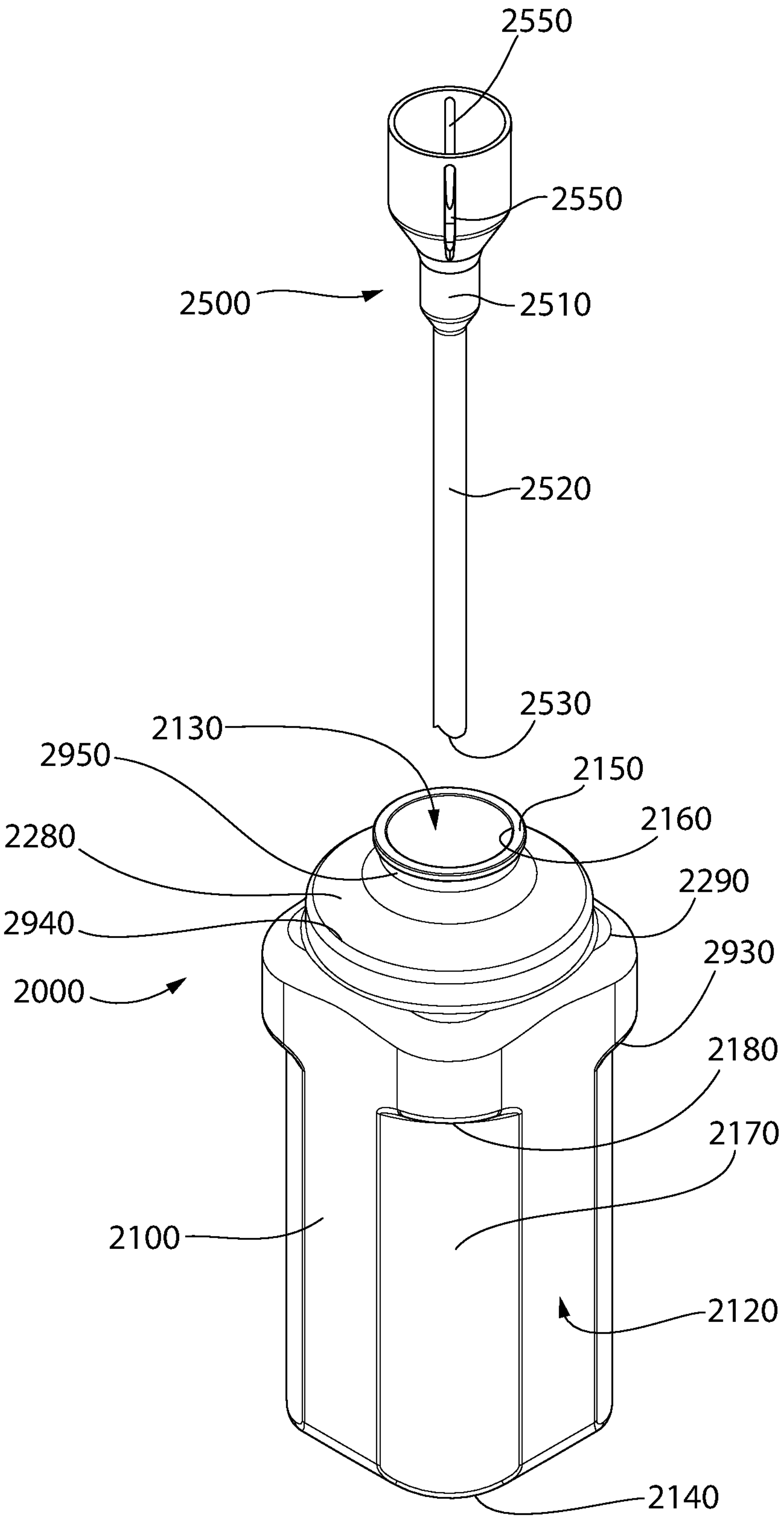
FIG. 39 is a perspective view of the refill cartridge of FIG. 34 illustrating a cartridge body thereof and a dip tube thereof in an exploded state.
Figure 41:
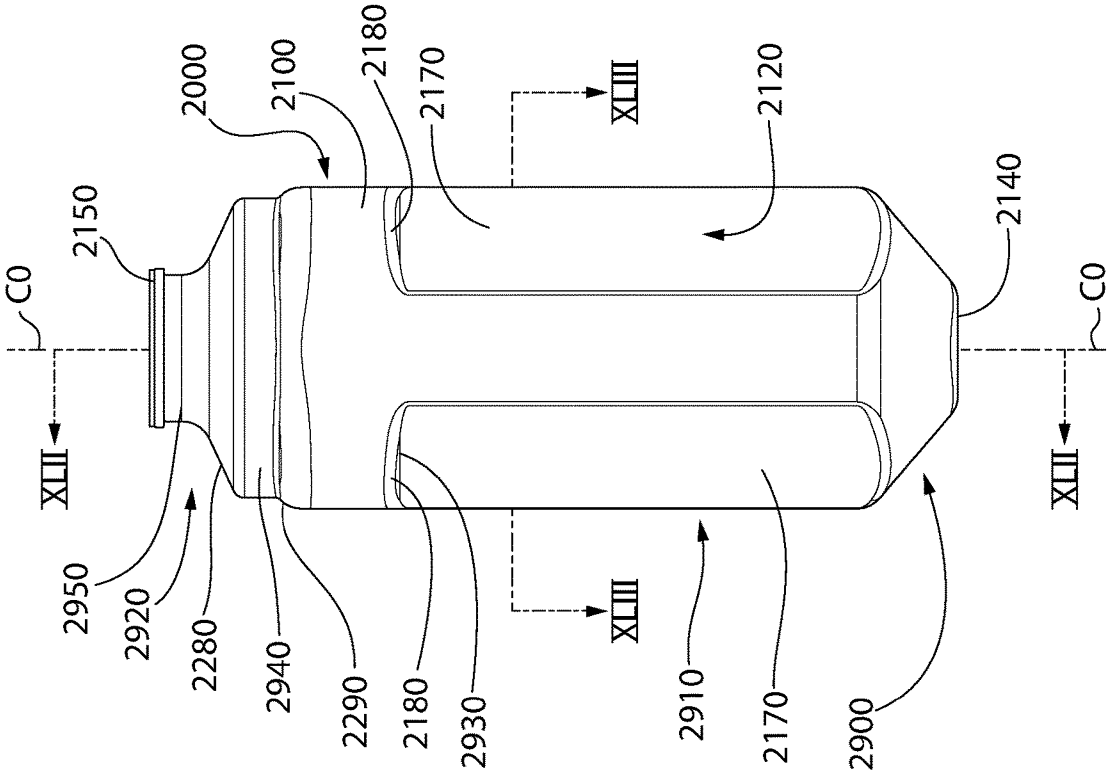
FIG. 41 is a front view of the refill cartridge of FIG. 40.
Figure 40:
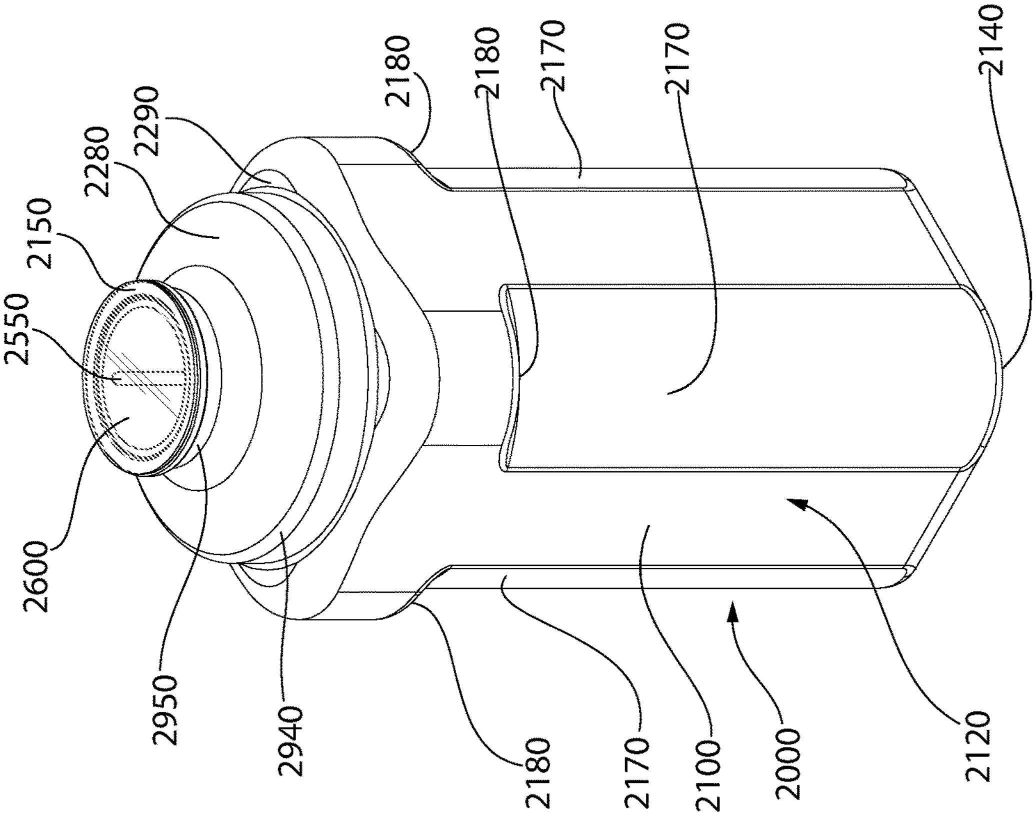
FIG. 40 is a perspective view of the refill cartridge of FIG. 39 in an assembled state.
Figure 43:
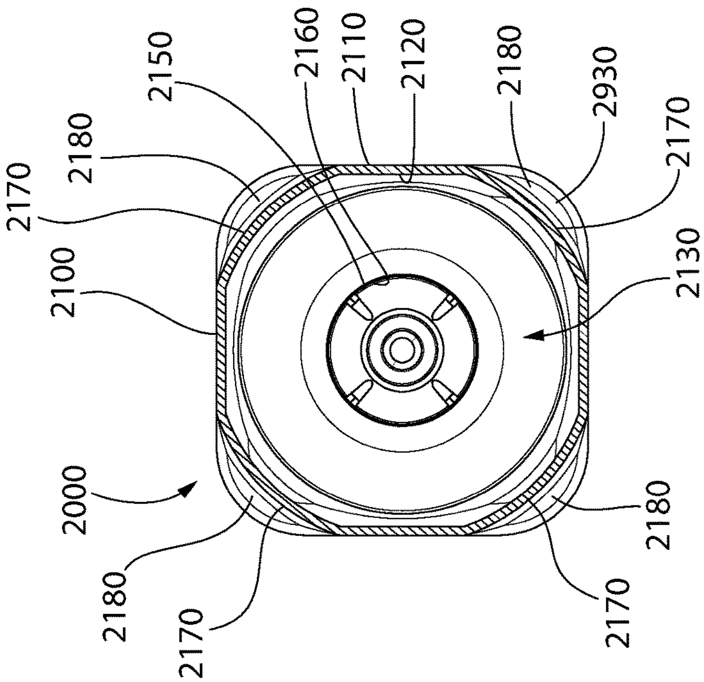
FIG. 43 is a cross-sectional view taken along line XLIII-XLIII of FIG. 41.

Referring to FIGS. 39-43, the refill cartridge 2000 and its components will be described. In FIG. 39, the refill cartridge 2000 is illustrated with the second dip tube 2500 exploded from the cartridge body 2100. In some embodiments, the second dip tube 2500 may be formed integrally with the cartridge body 2100 such that the second dip tube 2500 cannot be separated/detached from the cartridge body 2100. However, in the exemplified embodiment the second dip tube 2500 is a separate component from the cartridge body 2100. When assembled, the second dip tube 2500 may be coupled to the cartridge body 2100 in various ways, including: (1) friction fit into the neck of the cartridge body 2100; (2) trapping the second dip tube 2500 by one or more radial grooves in the neck of the cartridge body 2100 while permitting the second dip tube 2500 to freely rotate relative to the cartridge body 2100 (i.e., having an upper portion of the second dip tube 2500 rest atop of a radial groove of the cartridge body 2100); and (3) securing the second dip tube 2500 to the cartridge body 2100 via a cartridge lid 2600 (i.e., a film lidding or the like) while still permitting the second dip tube 2500 to rotate relative to the cartridge body 2100 and move axially over a limited distance relative to the cartridge body 2100. In the exemplified embodiment, the second dip tube 2500 is secured to the cartridge body 2100 via option (3) above, although other techniques may be used in other embodiments.

The cartridge body 2100 of the refill cartridge 2000 has an inner surface 2110 and an outer surface 2120 opposite the inner surface 2110. The inner surface 2110 of the cartridge body 2100 defines a fluid cavity 2130 that contains the store of the personal care fluid 2050 (shown in FIGS. 33 and 34). The cartridge body 2100 extends from a bottom end 2140 to a top end (or upper edge) 2150 along a cartridge axis C0-C0. In the exemplified embodiment, the bottom end 2140 of the cartridge body 2100 forms a closed bottom end of the fluid cavity 2130. Furthermore, an opening 2160 is formed into the top end 2150 of the cartridge body 2100.

The cartridge body 2100 comprises an upper neck portion 2920 and a lower reservoir portion 2910. The upper neck portion 2920 comprises the top end 2150 of the cartridge body and the lower reservoir portion 2910 is the portion within which the personal care fluid is stored. Furthermore, the cartridge body 2100 comprises a lower portion 2900 within the lower reservoir portion 2910, the lower portion 2900 including the bottom end 2140 of the cartridge body 2100. In the exemplified embodiment, the lower portion 2900 of the cartridge body 2100 is tapered.

The lower reservoir portion 2910 of the cartridge body 2100 extends from the bottom end 2140 to a top end 2290. The upper neck portion 2920 of the cartridge body 2100 comprises a cylindrical portion 2940 extending directly from the top end 2290 of the lower reservoir portion 2910 and a neck portion 2950 extending from a top end 2280 of the cylindrical portion 2940. The top end 2290 of the lower reservoir portion 2910 forms a shoulder that surrounds the cylindrical portion 2940 and the top end 2280 of the cylindrical portion 2940 forms a shoulder that surrounds the neck portion 2950. In this embodiment, the neck portion 2950 is free of threads or other connection features. This is because the dispenser lid 1400 is not coupled to the refill cartridge 2000, but is instead coupled to the dispenser body 1100 as described herein.

The cartridge body 2100 has a specific shape that enables the cartridge body 2100 to interact/mate with the protuberances 1200 of the dispenser body 1100 when the cartridge body 2100 is located within the refill cavity 1130 of the dispenser body 1100. This ensures that the cartridge body 2100 is properly oriented within the dispenser body 1100 and that the cartridge body 2100 is non-rotatable relative to the dispenser body 1100 when the cartridge body 2100 is located within the refill cavity 1130 of the dispenser body 1100.

In that regard, the cartridge body 2100 comprises one or more depressions 2170 formed into the outer surface 2120 in a spaced apart manner. In the exemplified embodiment, each of the depressions 2170 is elongated in a direction of the cartridge axis C0-C0 and extends from a location adjacent (but not located within) the lower portion 2900 of the cartridge body 2100 to a shoulder 2180. Specifically, in the exemplified embodiment each of the depressions 2170 is located entirely within the lower reservoir portion 2910 of the cartridge body 2100. Each shoulder 2180 is formed by a portion of the outer surface 2120 of the cartridge body 2100 that is not recessed and that is located at a top end of one of the depressions 2170. The shoulders 2180 have a shoulder surface 2930 that faces downwardly in a direction towards the bottom end 2140 of the cartridge body 2100, which facilitates suspending the container body 2100 within the refill cavity 1130, as discussed further below.

Although the depressions 2170 are elongated in the exemplified embodiment, alternative embodiments are possible whereby the depressions 2170 are smaller and/or more discrete than that which is shown in the cartridge body 2100, one example of which is described below with reference to FIGS. 45-49. The depressions 2170 are sized and shaped so that they are able to receive the protuberances 1200 of the dispenser body 1200 during insertion of the cartridge body 2100 into the refill cavity 1130 of the dispenser body 1200, as described in more detail below with reference to FIGS. 50-56. In an alternative embodiment, the depressions 2170 may be altogether omitted and the tapered lower portion 2900 of the cartridge body 2100 may rest directly atop of a protuberance of the dispenser body 1100. In such an alternative embodiment the protuberances of the dispenser body 1100 may be modified in shape relative to that which is shown in the exemplified embodiment so that the shape of the protuberances corresponds with the shape of the tapered lower portion 2900 of the cartridge body 2100 to effectively retain and suspend the cartridge body 2100 within the refill cavity 1130.

In some embodiments, the cartridge body 2100 may be manufactured by an injection stretch blow molding process. The cartridge body 2100 can take on various shapes and sizes, two alternative embodiments of which are illustrated and described herein. As described more fully herein below, the cartridge body 2100 (or more specifically the fluid cavity 2130) is either vented or the cartridge body 2100 may contain or be formed by a collapsible bag that holds the store of the personal care fluid 2050 therein to enable proper dispensing operations until the personal care fluid 2050 is substantially depleted. The cartridge body 2100 may be transparent in some embodiments, although the invention is not to be so limited and it may be translucent or opaque in other embodiments. In embodiments in which the cartridge body 2100 is transparent, the store of the personal care fluid 2050 contained in the fluid cavity 2130 of the cartridge body 2100 may comprise a color that is visible through the cartridge body 2100 and through the dispenser body 1100 to create a desired aesthetic and impart information regarding the scent or the like of the personal care fluid 2050 to a user or potential purchaser.

The second dip tube 2500 of the refill cartridge 2000 comprises a receiving section 2510 and a delivery section 2520 extending downwardly from the receiving section 2510 and terminating in a fluid inlet orifice 2530. The receiving section 2510 defines a passageway having a first transverse cross-sectional area and the delivery section 2520 defines a passageway having a second transverse cross-sectional area, the first transverse cross-sectional area being greater than the second transverse cross-sectional area. The receiving section 2510 of the second dip tube 2500 is configured to receive the distal portion 1780 of the first dip tube 1710 of the pump sub-system 1700. The second dip tube 2500 is preferably positioned within the fluid cavity 2130 of the cartridge body 2100 so that the fluid inlet orifice 2530 is spaced apart from a floor 2190 of the fluid cavity 2130. This ensures that most, if not all, of the personal care fluid 2050 in the fluid cavity 2130 will be dispensed which would not occur if the fluid inlet orifice 2530 was spaced further form the floor 2190 or in contact with the floor 2190.

Figure 42:
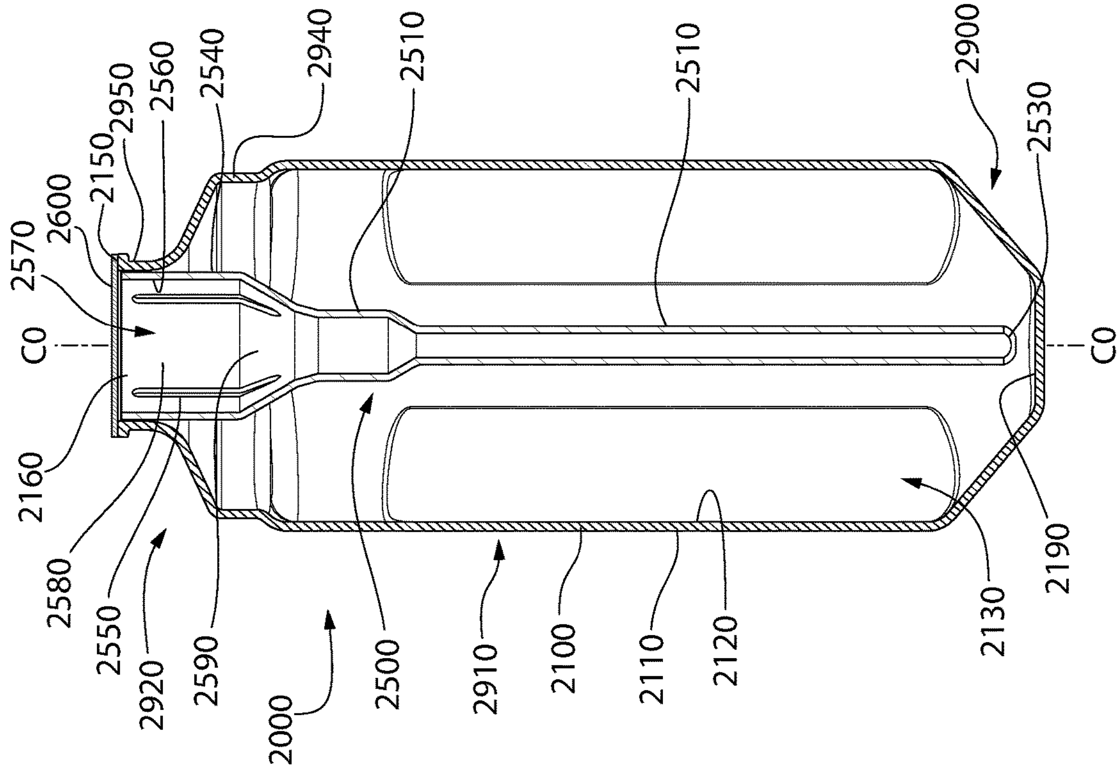
FIG. 42 is a cross-sectional view taken along line XLII-XLII of FIG. 41.

The refill cartridge 2000 also comprises a basket 2540 extending upward form the receiving section 2510 of the second dip tube 2500. In some embodiments, the basket 2540 and the second dip tube 2500 may be collectively referred to herein as a fluid delivery component of the refill cartridge 2100. The basket 2540 comprises an inner surface 2560 that defines a basket cavity 2570. In the exemplified embodiment, the basket 2540 is formed integrally with the second dip tube 2500 and the basket 2540 and the second dip tube 2500 extend along the cartridge axis C0-C0. However, the basket 2540 could alternatively be formed integrally with the cartridge body 2100 or it could be its own component separate from the second dip tube 2500 and from the cartridge body 2100. In the exemplified embodiment, the basket 2540 has a third transverse cross-sectional area that is greater than each of the first and second transverse cross-sectional areas. As will be discussed in greater detail below with reference to FIGS. 50-56, the basket 2540 is configured to align the first dip tube 1710 with the second dip tube 2500 and guide the first dip tube 1710 into the second dip tube 2500 as the dispenser lid 1400 is being coupled to the dispenser body 1100. As seen in FIG. 42, the basket 2540 is located within the upper neck section 2920 of the container body 2100 and the second dip tube 2500 is located within the lower reservoir portion 2910 of the container body 2100. In fact, an upper portion of the basket 2540 may be disposed within the opening 2160 in the top end 2150 of the cartridge body 2100.

In the exemplified embodiment, the basket 2540 comprises one or more vent openings or vent passageways 2550 that extend through the basket 2540 from the basket cavity 2570 to the fluid cavity 2130. The vent openings 2550 are in fluid communication with the external atmosphere and with the fluid cavity 2130 to vent the fluid cavity 2130 (i.e., to enable air to pass from the external atmosphere into the fluid cavity 2130). Specifically, as is well known, in order to effectuate proper and effective dispensing, when a volume of the personal care fluid 2050 is dispensed from the fluid cavity 2130, an equal volume of air must be permitted to pass into the fluid cavity 2130. The vent openings 2550 in the basket 2540 enable the flow of air into the fluid cavity 2130 as needed.

The basket 2540 comprises an entry section 2580 and an alignment section 2590, the alignment section 2590 being located between the entry section 2580 and the second dip tube 2500. A portion of the basket cavity 2570 that is defined by the alignment section 2590 of the basket 2540 has a transverse cross-sectional area that decreases with distance from the entry section 2580 towards the second dip tube 2500. Thus, the volume of the basket cavity 2570 tapers within the alignment section 2590.

The refill cartridge 2000 further comprises a cartridge lid 2600 that seals the opening 2160 located at the top end 2150 of the cartridge body 2100. The cartridge lid 2600 might also facilitate maintaining the basket 2540 and second dip tube 2500 in position within the fluid cavity 2130. In the exemplified embodiment, the cartridge lid 2600 is a puncturable film that is configured to be punctured by the first dip tube 1710 during the process of coupling the dispenser lid 1400 to the dispenser body 1100. Thus, the cartridge lid 2600 need not be removed from the refill cartridge 2000, but rather it remains positioned on the refill cartridge 2000 and it is punctured during assembly of the system 10000 as described further herein below. The cartridge lid 2600 may therefore be secured to the top end of 2150 of the cartridge body 2100 via adhesives, welding, or the like. Of course, the invention is not to be so limited in all embodiments and the cartridge lid 2600 may instead be a lid that is removed by a user prior to coupling the dispenser lid 1400 to the dispenser body 1100. For example, the cartridge lid 2600 may be a peel-off lid, a twist-off lid, or a lid that is otherwise removable by a user prior to coupling the dispenser lid 1400 to the dispenser body 1100.

It should be appreciated that the refill cartridge 2000 is entirely free of a pump. Rather, it is only by fully assembling the system 10000 such that the first dip tube 1710 of the pump sub-system 1700 of the dispenser 1000 engages the second dip tube 2500 of the refill cartridge 2000 that it becomes possible to dispense the personal care fluid 2050 from the refill cartridge 2000. Thus, the refill cartridge 2000 may be sold by itself as a personal care fluid refill container to replace one that has been depleted without having to also sell a pump along with the refill cartridge 2000 because the pump sub-system 1700, which is a part of the dispenser 1000, can be re-used to dispense the personal care fluid from the refill cartridge 2000 and any refill cartridge that it is subsequently mated with.

Figure 44:
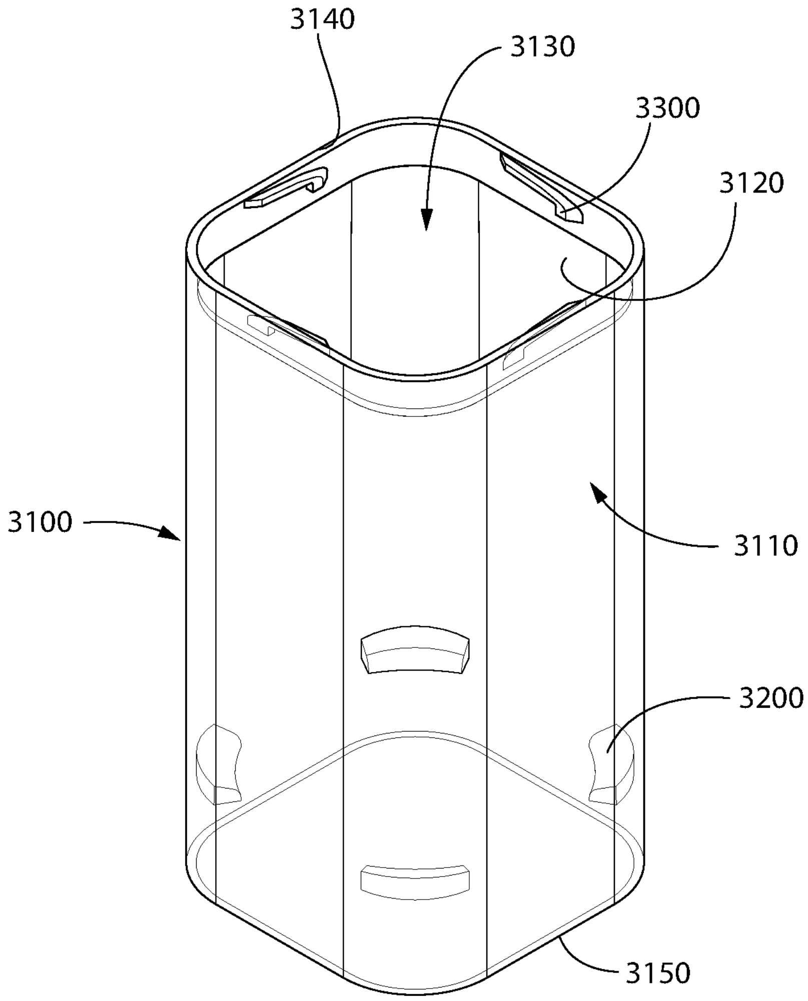
FIG. 44 is a perspective view of a dispenser body in accordance with an alternative embodiment of the present invention.
Figure 45:
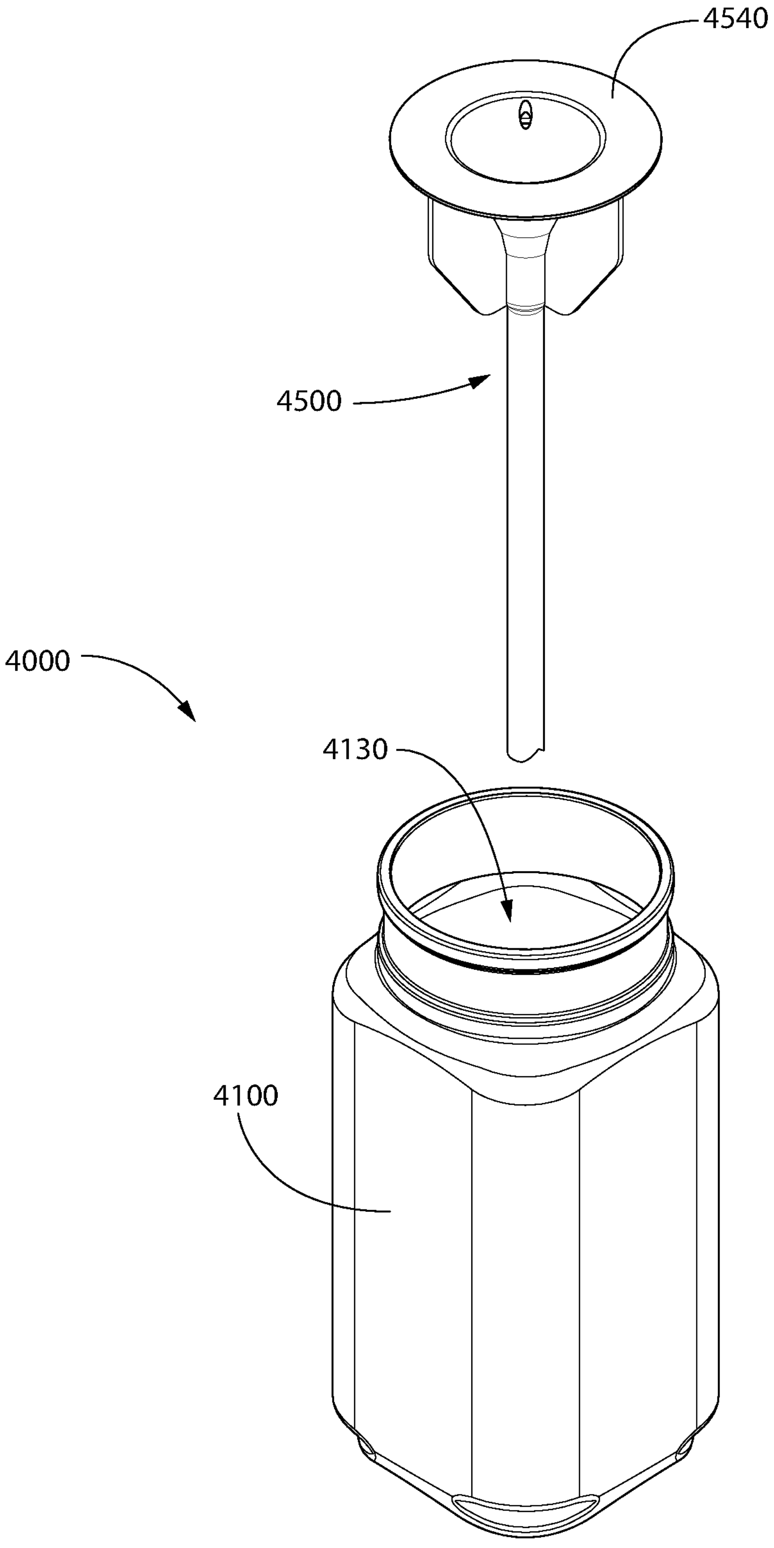
FIG. 45 is a perspective view of a refill cartridge in accordance with an alternative embodiment illustrating a cartridge body and a dip tube thereof in an exploded state.
Figure 47:
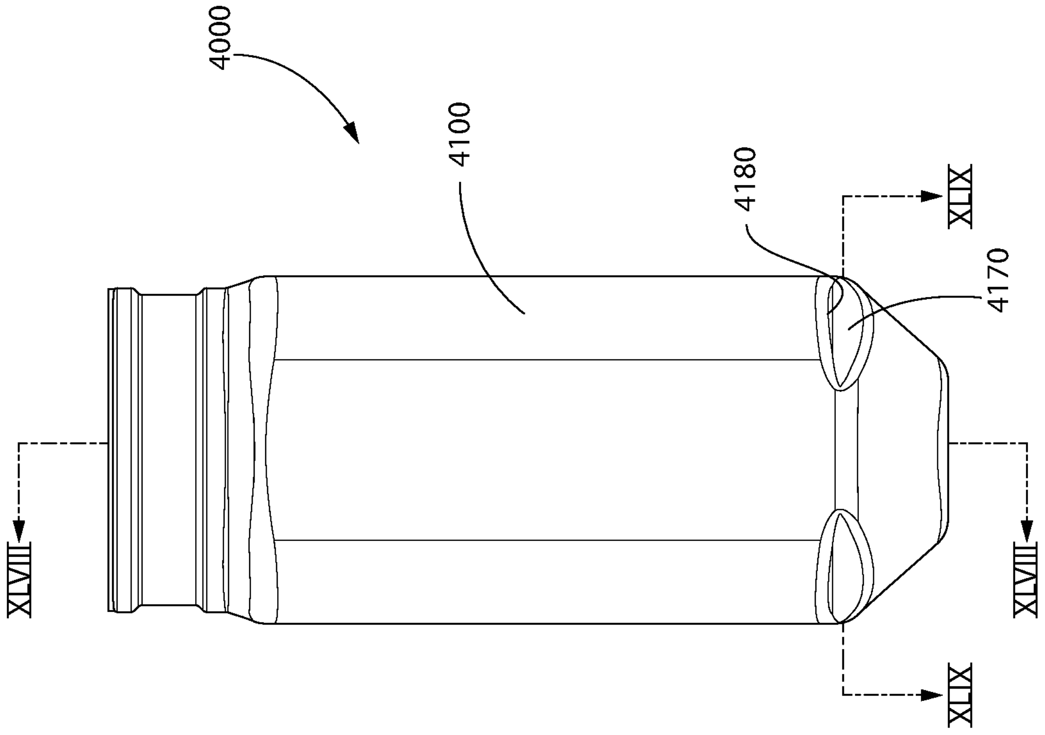
FIG. 47 is a front view of the refill cartridge of FIG. 46.
Figure 46:
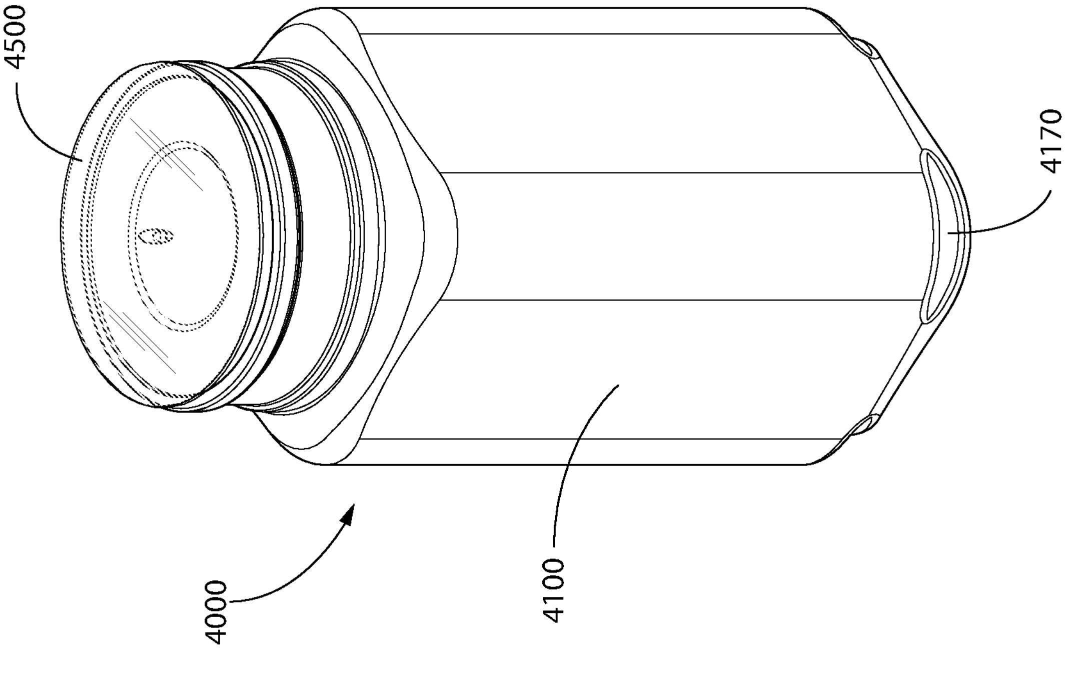
FIG. 46 is a perspective view of the refill cartridge of FIG. 45 in an assembled state.
Figure 49:
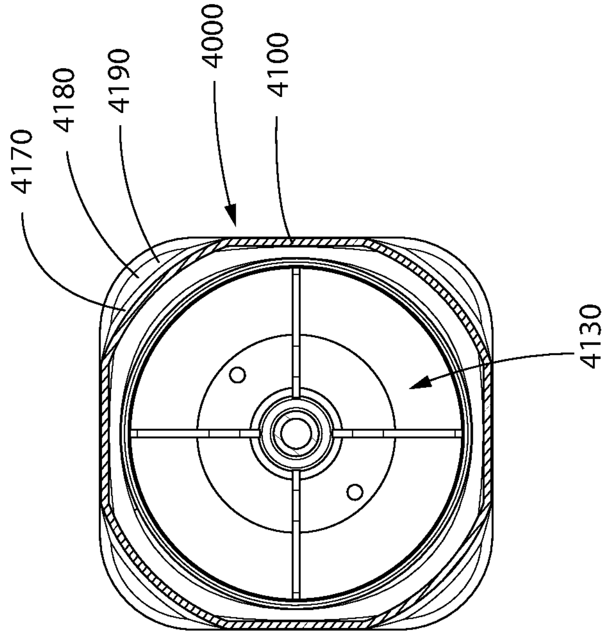
FIG. 49 is a cross-sectional view taken along line XLIX-XLIX of FIG. 47.
Figure 48:
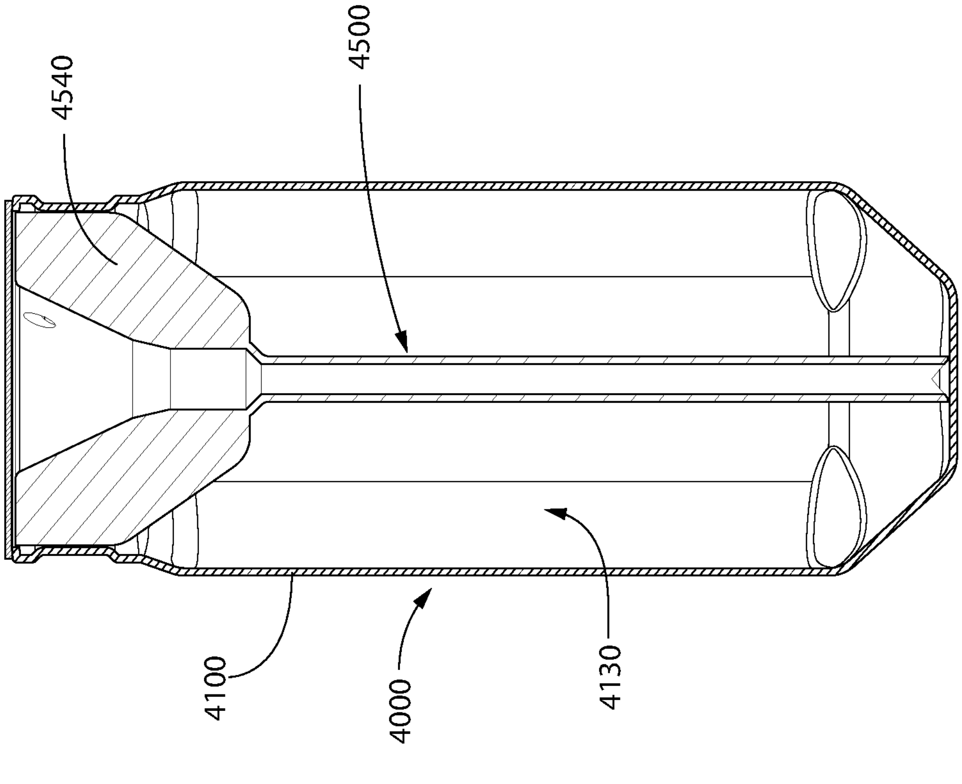
FIG. 48 is a cross-sectional view taken along line XLVIII-XLVIII of FIG. 47.

FIG. 44 illustrates an alternative embodiment of a dispenser body 3100 and FIGS. 45-49 illustrate an alternative embodiment of a refill cartridge 4000. Most of the details of the dispenser body 3100 are identical to the dispenser body 1100 and most of the details of the refill cartridge 4000 are identical to the refill cartridge 2000. Thus, the features of these components that are similar to the features previously described with reference to FIGS. 33-43 will not be repeated herein in the interest of brevity.

Referring to FIG. 44, the dispenser body 3100 comprises an outer surface 3110 and an inner surface 3120 opposite the outer surface 3110. Furthermore, the dispenser body 3100 extends from a top end 3140 to a bottom end 3150 along an axis, each of the top and bottom ends 3140, 3150 of the dispenser body 3100 being open in the exemplified embodiment. The inner surface 3120 of the dispenser body 3100 defines a refill cavity 3130. The dispenser body 3100 comprises a plurality of protuberances 3200 extending from the inner surface 3120 in a spaced apart manner and a plurality of coupling elements 3300 extending from the inner surface 3120 in a spaced apart manner. The coupling elements 3300 are generally identical to the coupling elements 1300 previously described. Furthermore, the protuberances 3200 are generally identical to the protuberances 1200 previously described except with regard to their location. While the protuberances 1200 were located near the top end 1140 of the dispenser body 1100, the protuberances 3200 are located near the bottom end 3150 of the dispenser body 3200.

Turning to FIGS. 45-49, the refill cartridge 4000 is illustrated and will be described. Again, the refill cartridge 4000 is quite similar to the refill cartridge 2000 and thus only differences between this embodiment and the one previously described will be described herein. The refill cartridge 4000 comprises a cartridge body 4100 having a fluid cavity 4130 and a second dip tube 4500 extending into the fluid cavity 4130. There is a basket 4540 coupled to (and integrally formed with) the second dip tube 4500.

The main difference between this embodiment and the refill cartridge 2000 is with regard to the depressions. The cartridge body 4100 comprises a plurality of depressions 4170 formed into its outer surface. In this embodiment, the depressions 4170 are not elongated in a direction of the cartridge body axis, but rather they are located within a bottom portion of the cartridge body 4100 near a bottom end of the cartridge body 4100. The depressions 4170 terminate in a shoulder 4180 having a shoulder surface 4190 that faces the lower end of the cartridge body 4100.

The location of the depressions 4170 is specifically chosen to ensure that the depressions 4170 in the cartridge body 4100 (and more specifically the shoulder surfaces 4190 thereof) interact with the protuberances 3200 of the dispenser body 3100 when the cartridge body 4100 is located in the refill cavity 3130 of the dispenser body 3100. More specifically, the shoulder surfaces 4190 of the shoulders 4180 of the depressions 4170 rest atop of the protuberances 3200 of the dispenser body 3100 to suspend the cartridge body 4100 within the refill cavity 3130 of the dispenser body 3100. Thus, the depressions 2170 of the cartridge body 2100 are not suited for engagement with the protuberances 3200 of the dispenser body 3100, and hence the depressions 4170 are modified relative to the depressions 2170. Other differences between the refill cartridge 4000 relative to the refill cartridge 2000 should be readily apparent to persons skilled in the art by viewing the drawings and thus these additional differences will not be described herein in detail.

Figure 50:
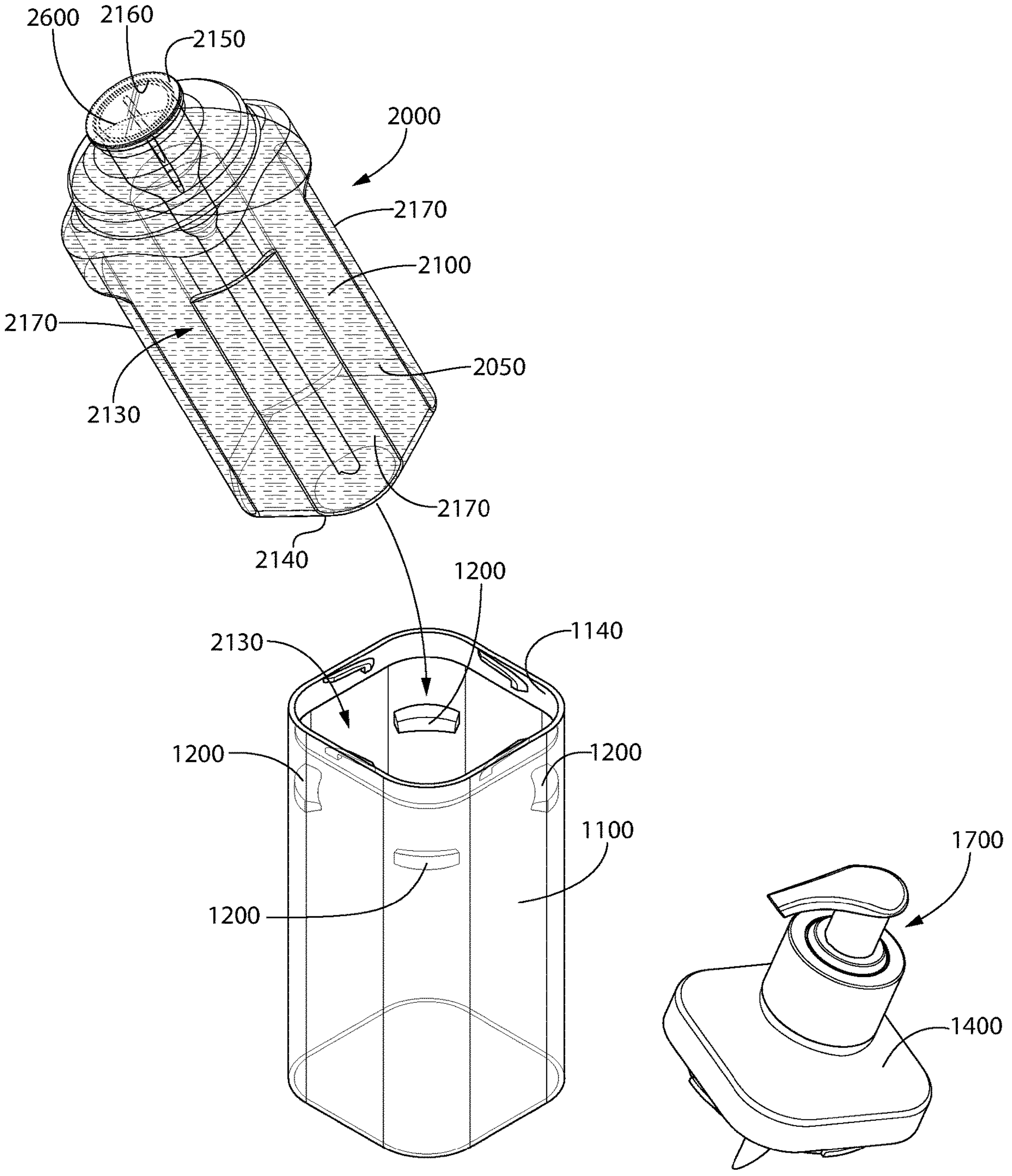
FIG. 50 is a perspective view illustrating assembly of the refill cartridge to the dispenser body.

Referring now to FIGS. 50-54 in succession, the manner in which the system 10000 is assembled will be described. FIG. 50 illustrates the dispenser body 1100 in preparation to receive the refill cartridge 2000. The fluid cavity 2130 of the cartridge body 2100 of the refill cartridge 2000 is filled with the store of the personal care fluid 2050. Furthermore, the cartridge lid 2600 is secured over the opening 2160 in the top end 2150 of the cartridge body 2100. Thus, the store of the personal care fluid 2050 will not spill out from the cartridge body 2100 because it is prevented from doing so by having the opening 2160 closed by the cartridge lid 2600. The refill cartridge 2000 may be sold as a stand-alone unit exactly as it appears in FIG. 50. In FIG. 50, the dispenser lid 1400 is in the first state in which the top end 1140 of the refill cavity 1130 of the dispenser body 1100 is open so that the refill cartridge 2000 can be slid into the refill cavity 1130. The pump sub-system 1700 is illustrated already mounted to the dispenser lid 1400 in this figure.

Prior to inserting the refill cartridge 2000 into the refill cavity 1130 of the dispenser body 1100, the depressions 2170 of the cartridge body 2100 must be aligned with the protuberances 1200 of the dispenser body 1100. Otherwise, as the refill cartridge 2000 enters the refill cavity 1130 of the dispenser body 1100, the bottom end 2140 of the refill cartridge 2000 will abut against the protuberances 1200 and prevent the refill cartridge 2000 from being fully inserted into the refill cavity 1130.

Figure 51:
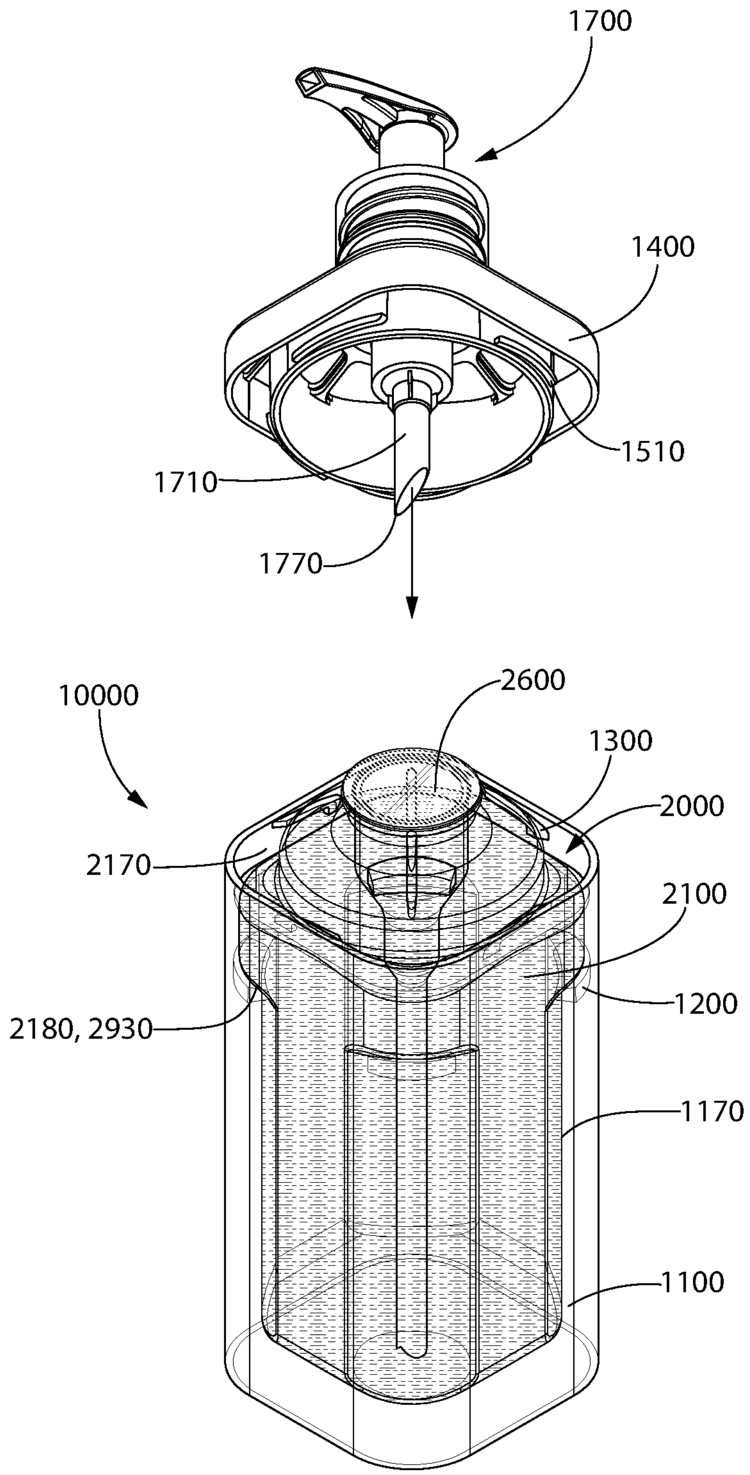
FIG. 51 is a perspective view illustrating assembly of the dispenser lid to the dispenser body.

Referring to FIGS. 51 and 24, the refill cartridge 2000 is illustrated located within the refill cavity 1130 of the dispenser body 1100. In FIG. 51 the dispenser lid 1400 has not yet been coupled to the dispenser body 1100 and in FIG. 56 the dispenser lid 1400 is illustrated coupled to the dispenser body 1100. Regardless, when the refill cartridge 2000 is located within the refill cavity 1130 of the dispenser body 1100, each of the protuberances 1200 of the dispenser body 1100 is located within one of the depression 2170 of the cartridge body 1100. Furthermore, the shoulder surfaces 2930 of the shoulders 2180 of the depressions 2170 rest atop of the protuberances 1200 of the dispenser body 1100. This results in the cartridge body 1100 of the refill cartridge 1000 being suspended within the refill cavity 1130 of the dispenser body 1100 the protuberances 1200.

Thus, the refill cartridge 2000 is supported in a suspended manner so that a space exists below the bottom surface 2140 of the cartridge body 2100 of the refill cartridge 2000 (which also forms a lower most surface of the refill cartridge 2000). When the refill cartridge 2000 is positioned within the refill cavity 1130 of the dispenser body 1100, the refill cartridge 2000 is non-rotatable relative to the dispenser body 1100 due to the interaction between the protuberances 1200 of the dispenser body 1100 and the portions of the cartridge body 2100 that are adjacent to the depressions 2170. Specifically, the protuberances 1200 of the dispenser body 1100 nest within the depressions 2170 of the cartridge body 2100 making it impossible to rotate the cartridge body 2100 relative to the dispenser body 1100. As seen in FIG. 56, a gap G1 exists between the bottom surface 2140 of the cartridge body 2100 of the refill cartridge 2000 and the bottom edge 1160 of the dispenser body 1100. Thus, if the dispenser body 1100 is positioned atop of a horizontal surface (such as a countertop or the like), the bottom surface 2140 of the cartridge body 2100 is not in contact with the horizontal surface but is instead suspended above the horizontal surface.

Figure 52:
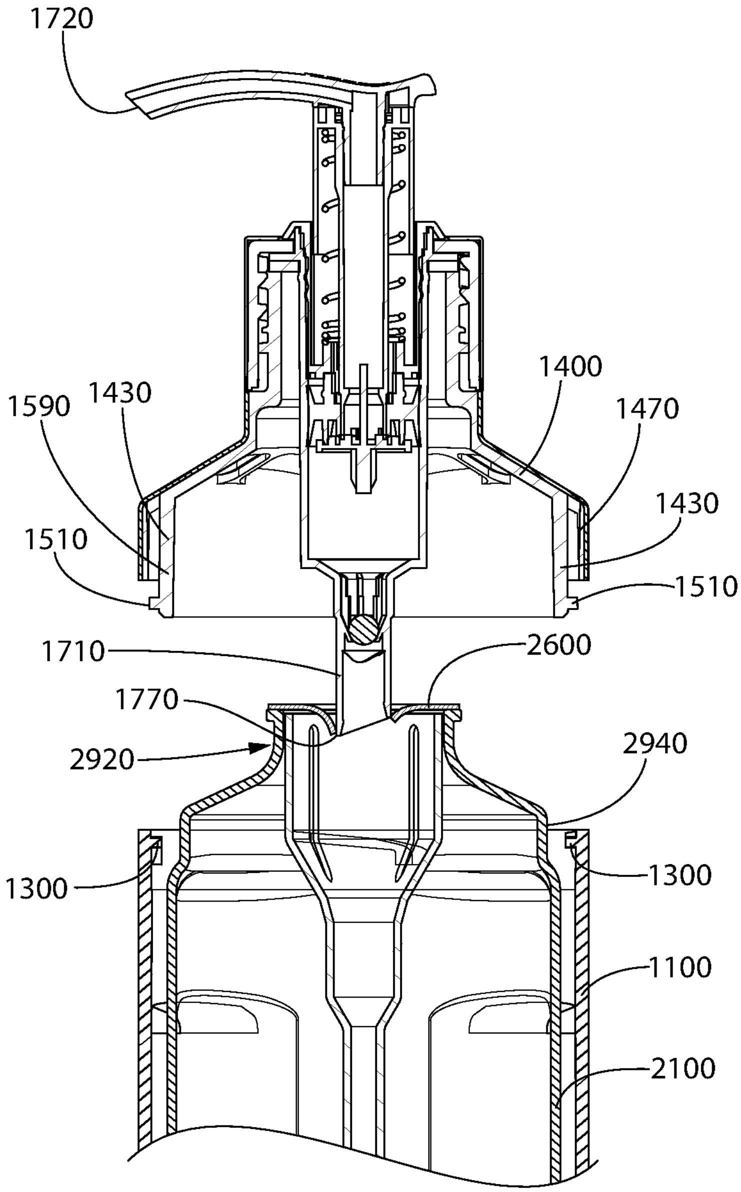
FIGS. 52 and 53 are schematic cross-sectional views illustrating assembly of the dispenser lid to the dispenser body.

Referring to FIGS. 51 and 52, once the refill cartridge 2000 is located within the refill cavity 1130 of the dispenser body 1100, the dispenser lid 1400 can be altered from the first state to the second state by coupling the dispenser lid 1400 to the dispenser body 1100. As noted previously, the pump sub-system 1700 is pre-mounted onto the dispenser lid 1400, although in other embodiments this may be an additional step that is taken before coupling the dispenser lid 1400 to the dispenser body 1100. To couple the dispenser lid 1400 to the dispenser body 1100, the distal end 1770 of the first dip tube 1710 is brought into contact with the cartridge lid 2600 and pressed axially against the cartridge lid 2600 until the distal end 1770 of the first dip tube 1710 penetrates the cartridge lid 2600 (illustrated in FIG. 52).

Figure 53:
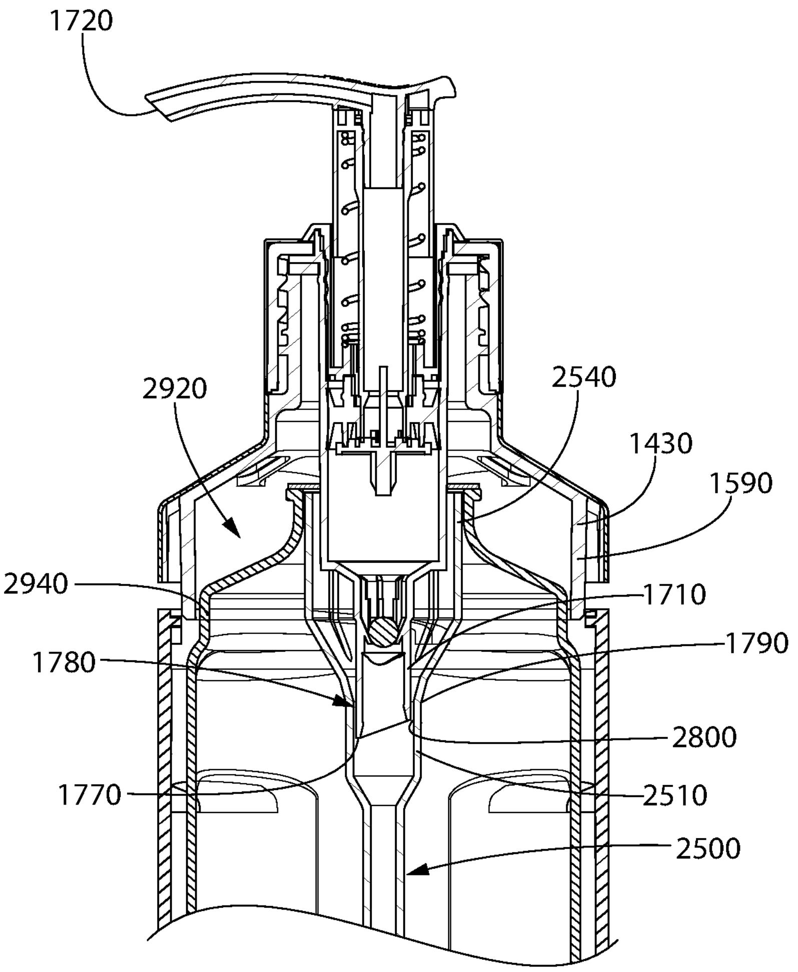

Referring to FIGS. 51 and 53, the dispenser lid 1400 is then continued to be moved axially until the first dip tube 1710 of the pump sub-system 1700 operably mates with the second dip tube 2500 of the refill cartridge 2000 so that the store of the personal care fluid 2050 can be dispensed from the dispensing orifice 1720 of the pump sub-system 1700. Specifically, the dispenser lid 1400 is moved axially until the coupling elements 1510 of the dispenser lid 1400 contact the coupling elements 1300 of the dispenser body 1100, thereby preventing further axial translation of the dispenser lid 1400 relative to the dispenser body 1100. At this time, the distal section 1780 of the first dip tube 1710 is disposed within the receiving section 2510 of the second dip tube 2500. In certain embodiments, when the first dip tube 1710 is so positioned, a hermetic seal is formed between an outer surface 1790 of the distal section 1780 of the first dip tube 1710 and an inner surface 2800 of the receiving section 2510 of the second dip tube 2500.

As has been stated previously, as the dispenser lid 1400 is translated axially (from FIG. 52 to FIG. 53), the basket 2540 guides the first dip tube 1710 into the second dip tube 2500. Furthermore, as the dispenser lid 1400 is translated axially from the position shown in FIG. 52 to the position shown in FIG. 53, the cylindrical portion 2940 of the upper neck portion 2920 of the cartridge body 2100 is guided into the region of the dispenser lid 1400 that is bounded by the wall 1590 of the connection hub 1430. Thus, when the dispenser lid 1400 is coupled to the dispenser body 1100 (or just before actual coupling therebetween), the wall 1590 of the connection hub 1430 surrounds the outer surface of the cylindrical portion 2940 of the upper neck portion 2920 of the cartridge body 2100.

Figure 54:
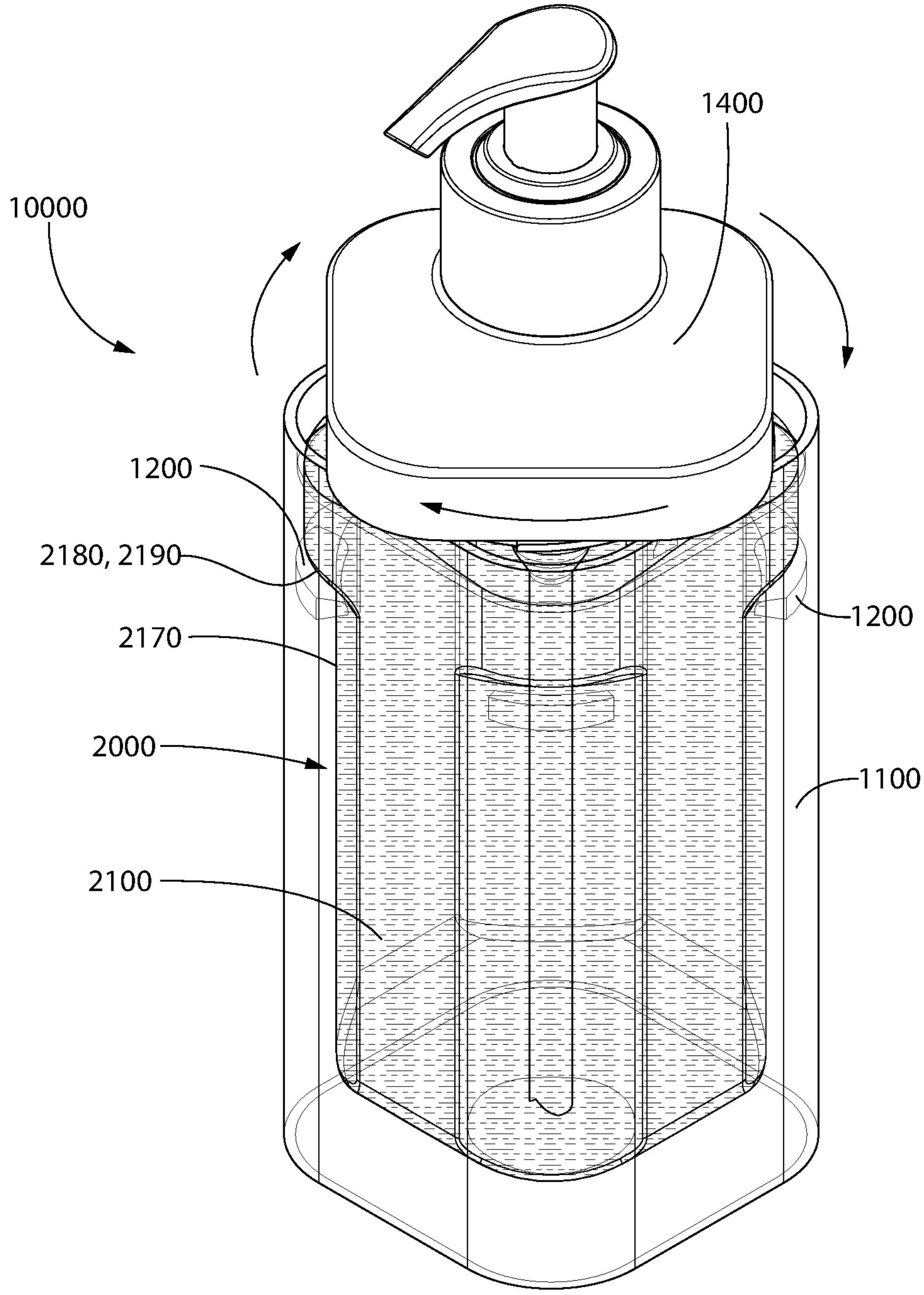
FIG. 54 is a perspective view illustrating the dispenser lid being secured to the dispenser body.

Referring to FIG. 54, once the dispenser lid 1400 is in the position shown in FIG. 53 whereby the coupling elements 1300, 1510 of the dispenser body 1100 and the dispenser lid 1400, respectively, are in contact with one another, the dispenser lid 1400 can no longer be axially translated relative to the dispenser body 1100. Thus, at this point a user must rotate the dispenser lid 1400 relative to the dispenser body 1100 in a first rotational direction, as shown in FIG. 54. This rotation causes the coupling elements 1510 of the dispenser lid 1400 to engage the coupling elements 1300 of the dispenser body 1100. As noted previously, due to the angled/inclined orientation of the coupling elements 1300, 1510, this engagement of the coupling elements 1300, 1510 to one another during rotation of the dispenser lid 1400 relative to the dispenser body 1100 causes the dispenser lid 1400 and the dispenser body 1100 to be axially drawn together to achieve the second state whereby the dispenser lid 1400 is coupled to the dispenser body 1100. In the second state (shown in FIGS. 55 and 56), the interaction between the coupling elements 1300 of the dispenser body 1100 and the coupling elements 1510 of the dispenser lid 1400 prevent the dispenser lid 1400 from being axially translated relative to the dispenser body 1100 without the dispenser lid 1400 being rotated relative to the dispenser body 1100 in a second rotational direction that is opposite the first rotational direction.

FIGS. 55 and 56 illustrate different longitudinal cross-sectional views of the assembled system 10000. In FIG. 55, the interaction between the coupling elements 1300 of the dispenser body 1100 and the coupling elements 1510 of the dispenser lid 1400 can be readily seen. In FIG. 56, the shoulders 2180 and shoulder surfaces 2930 of the depression 2170 of the cartridge body 2100 can be seen resting atop of the protuberances 1200 of the dispenser body 1100. In fact, as illustrated in FIG. 55, when fully assembled with the dispensing lid 1400 in the second state, a portion 2980 of the cartridge body 2100 located between the shoulder surfaces 2930 and the top end 2290 of the lower reservoir portion 2910 is positioned between and contacted by (i.e., sandwiched between) the protuberances 1200 of the dispenser body 1100 and retaining elements of the dispenser lid 1400. In the exemplified embodiment, the retaining elements are formed by the wall 1590 of the connection hub 1430. However, the invention is not to be so limited and the retaining elements may be formed from another wall that is distinct from the wall 1590 and from the connection hub 1430 or some other feature that contacts the portion 2980 of the cartridge body 2100. In the exemplified embodiment, the terminal edge 1490 of the wall 1590 of the connection hub 1430 contacts the top end 2290 of the lower reservoir portion 2910 and the protuberance 1200 of the dispenser body 1100 contacts the shoulder surface 2930 of the cartridge body 2100.

Thus, the dispenser lid 1400 and the protuberances 1200 of the dispenser body 1100 together retain the refill cartridge 1000 within the refill cavity 1130. Specifically, when the dispenser lid 1400 is in the second state and coupled to the dispenser body 1100, the refill cartridge 1000 is prevented from moving axially within the refill cavity 1130 and also prevented from rotating within the refill cavity 1130. As a result, when assembled the entire system 10000 can be lifted off of a horizontal support surface (i.e., countertop or the like) and the system 1000 will remain intact with the refill cartridge 2000 located within the refill cavity 1130 of the dispenser body 1100. This occurs despite the bottom end 1150 of the dispenser body 1100 being open (although, as set forth above, it need not be open in all embodiments).

Still referring to FIGS. 55 and 56, when the system 10000 is fully assembled, actuation of the actuator 1750 of the pump sub-system 1700 will result in dispensing of the personal care fluid 2050 via the dispensing orifice 1720. In that regard, the pump sub-system 1700 comprises a dosage housing 1850 comprising a dosage chamber 1860. The dosage housing 1850 nests within the basket 2540 when the dispensing lid 1400 is in the second state. The first dip tube 1710 extends downward from the dosage housing 1850 and into the receiving section 2510 second dip tube 2500.

To dispense the personal care fluid 2050, a user will press downwardly on the actuator 1750 to actuate the actuator 1750. The actuator 1750 is operably coupled to a plunger 1870 such that when the actuator 1750 is actuated, any of the personal care fluid 2050 located within the dosage chamber 1860 will be forced upwardly to the dispensing orifice 1720. This is because the downward pressure of the plunger 1870 will ensure that the valve 1880 (shown as a ball valve in the exemplified embodiment, but could be any other type of valve in other embodiments) located between the dosage chamber 1860 and the fluid cavity 2130 remains closed.

The actuator 1750 is also operably coupled to a spring 1890 such that upon release of the actuator 1750, the spring 1890 will bias the actuator 1750 back into its original non-actuated position. During this biasing of the actuator 1750, the valve 1880 opens and an amount of the personal care fluid 2050 flows from the fluid cavity 2130 into the dosage chamber 1860. The amount of the personal care fluid 2050 is then prepared for dispensing via the dispensing orifice 1720 the next time that the actuator 1750 is actuated. As mentioned previously, the basket 2540 comprises vent openings 2550 that permit the flow of air from the atmosphere into the fluid cavity 2130 to replace the amount of the personal care fluid 2050 that flows from the fluid cavity 2130 into the dosage chamber 1860. In alternative embodiments, the fluid cavity 2130 could be defined by a collapsible bag such that air is not needed to replace the lost volume of the personal care fluid 2050, but instead the collapsible bag will simply collapse thereby reducing the volume of the fluid cavity 2130 during dispensing.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. A system for dispensing a personal care fluid, the system comprising:
- a dispenser comprising:
  - a dispenser body comprising a refill cavity having a top end;
  - a dispenser lid; and
- a pump sub-system comprising a dip tube, a dispensing orifice, and a pump;
- a refill cartridge configured for slidable insertion and removal from the refill cavity via the top end of the refill cavity, the refill cartridge comprising:
  - a cartridge body comprising a fluid cavity; and
  - a store of the personal care fluid in the fluid cavity;
- wherein the dispenser body comprises a ramped portion located within the refill cavity, the ramped portion configured to engage a lid coupling element on the dispenser lid to prevent rotation of the dispenser lid relative to the dispenser body, the ramped portion formed as a protrusion extending from the dispenser body;
- wherein the ramped portion is angled downwardly from an open top end of the dispenser body; and
- wherein the ramped portion further comprises a locking portion extending from an end of the ramped portion, the locking portion forming a stopper to prevent further movement of the lid coupling element therepast.

2. The system of claim 1, wherein the cartridge body comprises an upper neck portion, a shoulder, a cylindrical portion and a tapered lower portion.

3. The system of claim 1, wherein the dispenser lid is configured to be alterable between: (1) a first state in which the top end of the refill cavity is open so that the refill cartridge can be slid into the refill cavity; and (2) a second state in which the dispenser lid is coupled to the dispenser body to enclose the top end of the refill cavity.

4. The system of claim 1, wherein the refill cartridge is supported in a suspended manner so that a space exists below a lowermost surface of the refill cartridge.

* * * * *